US012593143B2

(12) United States Patent
Kawahito

(10) Patent No.: US 12,593,143 B2
(45) Date of Patent: Mar. 31, 2026

(54) SOLID-STATE IMAGING DEVICE

(71) Applicant: NATIONAL UNIVERSITY CORPORATION SHIZUOKA UNIVERSITY, Shizuoka (JP)

(72) Inventor: Shoji Kawahito, Hamamatsu (JP)

(73) Assignee: NATIONAL UNIVERSITY CORPORATION SHIZUOKA UNIVERSITY (JP)

( * ) Notice: Subject to any disclaimer, the term of this patent is extended or adjusted under 35 U.S.C. 154(b) by 73 days.

(21) Appl. No.: 18/730,664

(22) PCT Filed: Jan. 25, 2023

(86) PCT No.: PCT/JP2023/002308
§ 371 (c)(1),
(2) Date: Jul. 19, 2024

(87) PCT Pub. No.: WO2023/145782
PCT Pub. Date: Aug. 3, 2023

(65) Prior Publication Data
US 2025/0150723 A1     May 8, 2025

(30) Foreign Application Priority Data
Jan. 28, 2022     (JP) ................................. 2022-011948

(51) Int. Cl.
*H04N 25/131*     (2023.01)
*G01C 3/06*     (2006.01)
(Continued)

(52) U.S. Cl.
CPC ............. *H04N 25/131* (2023.01); *G01C 3/06* (2013.01); *H04N 25/771* (2023.01);
(Continued)

(58) Field of Classification Search
CPC .. H04N 25/131; H04N 25/771; H04N 25/705; H04N 25/53; G01C 3/06;
(Continued)

(56) References Cited

U.S. PATENT DOCUMENTS

2016/0061941 A1* 3/2016 Guo ...................... G01S 17/894
                                                              356/4.02
2016/0181298 A1 6/2016 Wan et al.
(Continued)

FOREIGN PATENT DOCUMENTS

JP     2010-035168 A     2/2010
JP     2014-207493 A     10/2014
(Continued)

OTHER PUBLICATIONS

International Search Report mailed Apr. 18, 2023, issued in corresponding International Application No. PCT/JP2023/002308.
(Continued)

*Primary Examiner* — Mekonnen D Dagnew
(74) *Attorney, Agent, or Firm* — OSTROLENK FABER LLP

(57) ABSTRACT

A solid-state imaging device includes: a light source; a green pixel, a red pixel, and a blue pixel configured to each generate a charge corresponding to visible light; a near-infrared pixel configured to generate a charge corresponding to near-infrared light; and a gate driver circuit configured to supply, to the green pixel, the red pixel, the blue pixel, and the near-infrared pixel, a first transfer control pulse to control transfer of the charge. Each of the green pixel, the red pixel, the blue pixel, and the near-infrared pixel includes a photoelectric conversion region, a reading unit configured to receive the transfer of the charge, and a charge discharging region configured to discharge the charge from the photoelectric conversion region.

15 Claims, 45 Drawing Sheets

(51) Int. Cl.

| | |
|---|---|
| *H04N 25/771* | (2023.01) |
| *G01S 7/4863* | (2020.01) |
| *G01S 17/894* | (2020.01) |
| *H04N 25/705* | (2023.01) |

(52) U.S. Cl.
 CPC ........... *G01S 7/4863* (2013.01); *G01S 17/894* (2020.01); *H04N 25/705* (2023.01)

(58) Field of Classification Search
 CPC .... G01S 7/4863; G01S 17/894; G01S 7/4816; H10F 39/18
 See application file for complete search history.

(56) References Cited

U.S. PATENT DOCUMENTS

| | | | |
|---|---|---|---|
| 2018/0045867 A1* | 2/2018 | Kunugise | ............... G03B 11/00 |
| 2018/0367745 A1 | 12/2018 | Sugiyama | |
| 2020/0120300 A1 | 4/2020 | Sano et al. | |
| 2021/0149029 A1 | 5/2021 | Shiokawa et al. | |
| 2024/0406327 A1* | 12/2024 | Ono | ................... H04N 1/00835 |
| 2024/0430546 A1* | 12/2024 | Hirai | ...................... H04N 23/71 |

FOREIGN PATENT DOCUMENTS

| | | |
|---|---|---|
| JP | 2017-118191 A | 6/2017 |
| JP | 2020-188275 A | 11/2020 |

OTHER PUBLICATIONS

International Preliminary Report on Patentability (IPRP) mailed Aug. 2, 2024, issued in corresponding International Application No. PCT/JP2023/002308.

Extended European Search Report dated Dec. 8, 2025, issued in corresponding European Patent Application No. 23745038.2.

* cited by examiner

SOLID-STATE IMAGING DEVICE

CROSS-REFERENCE TO RELATED APPLICATIONS

The present application is a 35 U.S.C. §§ 371 national stage application of International Application No. PCT/JP2023/002308, filed Jan. 25, 2023, which claims priority to Japanese Patent Application No. 2022-011948, filed Jan. 28, 2022, the contents of which are incorporated herein by reference.

TECHNICAL FIELD

The present disclosure relates to a solid-state imaging device.

BACKGROUND ART

A technique of obtaining an image different from an image of visible light in addition to the image of visible light has been studied. The image different from the image of visible light is, for example, an image of near-infrared light. The image different from the visible light image is, for example, an image having distance information.

Patent Literature 1 and Patent Literature 2 disclose an imaging device that obtains the image of visible light and the image having distance information. A solid-state imaging device of Patent Literature 1 includes a pixel for obtaining the image of visible light and a pixel for obtaining the image having distance information. An imaging device of Patent Literature 2 performs an operation of obtaining the image having distance information after performing an operation of obtaining the image of visible light in a certain pixel.

CITATION LIST

Patent Literature

Patent Literature 1: Japanese Unexamined Patent Publication No. 2020-1887275
Patent Literature 2: Japanese Unexamined Patent Publication No. 2010-35168

SUMMARY OF INVENTION

Technical Problem

As an image different from an image of visible light, an image of near-infrared light and an image having distance information are exemplified. Both of these images are obtained by a pixel receiving near-infrared light. In the case of obtaining the image of near-infrared light, near-infrared light is emitted from a light source toward an object as auxiliary light. When the near-infrared light emitted from the light source is incident on a pixel for obtaining the image of visible light, the near-infrared light becomes a noise component.

For example, it is conceivable to use a means for performing arithmetic processing of removing an influence of near-infrared light from the image of visible light in which near-infrared light is mixed as noise afterwards. However, it is difficult to completely remove the influence of near-infrared light from the image of visible light in which near-infrared light is mixed as noise. For example, shot noise remains. As a result, in the image of visible light in which near-infrared light is mixed as noise, a so-called S/N ratio decreases.

For example, a means using a filter that prevents transmission of near-infrared light is also conceivable. When the image of visible light is captured, the filter that prevents transmission of near-infrared light is applied. When the image of near-infrared light is captured, application of the filter that prevents transmission of near-infrared light is excluded. Switching of the filter requires a little time. Therefore, it is difficult to simultaneously acquire the image of visible light and the image of near-infrared light. An additional mechanism for filter switching is required. The application of the additional mechanism is disadvantageous in manufacturing costs of a solid-state imaging device and reliability of an imaging operation.

The present disclosure describes a solid-state imaging device that simultaneously acquires an image of visible light and an image of near-infrared light, in which the solid-state imaging device is capable of acquiring the image of visible light in which an influence of near-infrared light is suppressed.

Solution to Problem

A solid-state imaging device according to an aspect of the present disclosure includes: a light source configured to generate pulsed light having a wavelength component of near-infrared light; a first pixel configured to receive first light including at least a wavelength component of visible light so as to generate, by a first pixel circuit unit, a charge corresponding to the first light; a second pixel configured to receive second light including at least the wavelength component of the near-infrared light so as to generate, by a second pixel circuit unit, a charge corresponding to the second light; and a charge transfer control unit configured to supply, to the first pixel and the second pixel, a control pulse to control transfer of the charge. Each of the first pixel circuit unit and the second pixel circuit unit includes a photoelectric conversion region configured to generate the charge, a reading unit configured to receive the transfer of the charge from the photoelectric conversion region in response to the control pulse, and a charge discharging region configured to discharge the charge from the photoelectric conversion region in response to the control pulse.

The solid-state imaging device includes a pixel that receives the first light including the wavelength component of the visible light and generates the charge, and a pixel that receives the second light including the wavelength component of the near-infrared light and generates the charge. Therefore, it is possible to simultaneously acquire an image of the visible light and an image of the near-infrared light. According to this configuration, the solid-state imaging device can perform, when the pulsed light of the near-infrared light is generated, an operation of discharging the charge generated in the pixel that generates the charge caused by the first light including the wavelength component of the visible light to the charge discharging region. Therefore, it is possible to obtain an image of the visible light in which an influence of the near-infrared light is suppressed.

The charge transfer control unit of the solid-state imaging device may be configured to supply, to the first pixel circuit unit, the control pulse to discharge the charge from the photoelectric conversion region of the first pixel circuit unit to the charge discharging region of the first pixel circuit unit in a period overlapping with an irradiation period of the pulsed light. According to this operation, it is possible to obtain an image of the visible light in which the influence of the near-infrared light is suppressed.

The reading unit of the first pixel circuit unit of the solid-state imaging device may include a first charge reading region and a second charge reading region. The charge transfer control unit may be configured to, after supplying, to the first pixel circuit unit, the control pulse to transfer the charge from the photoelectric conversion region of the first pixel circuit unit to the first charge reading region of the first pixel circuit unit in a period not overlapping with the irradiation period of the pulsed light, supply, to the first pixel circuit unit, the control pulse to transfer the charge from the photoelectric conversion region of the first pixel circuit unit to the second charge reading region of the first pixel circuit unit. According to this configuration, a dynamic range can be expanded.

In the solid-state imaging device, one of the period of the control pulse for transferring the charge from the photoelectric conversion region of the first pixel circuit unit to the first charge reading region of the first pixel circuit unit and the period of the control pulse for transferring the charge from the photoelectric conversion region of the first pixel circuit unit to the second charge reading region of the first pixel circuit unit may be shorter than the other period. According to this configuration, a dynamic range can be expanded.

The solid-state imaging device may further include an arithmetic circuit configured to obtain an image based on the charge. The arithmetic circuit may be configured to obtain at least one of a first image based on the charge accumulated in the first charge reading region or a second image based on the charge accumulated in the second charge reading region. According to this configuration, a visible light image having high sensitivity and a visible light image having low sensitivity can be obtained.

The reading unit of the second pixel circuit unit of the solid-state imaging device may include a first charge reading region and a second charge reading region. The charge transfer control unit may be configured to supply, to the second pixel circuit unit, the control pulse to transfer the charge from the photoelectric conversion region of the second pixel circuit unit to the first charge reading region of the second pixel circuit unit in the period overlapping with the irradiation period of the pulsed light. The charge transfer control unit may be configured to supply, to the second pixel circuit unit, the control pulse to transfer the charge from the photoelectric conversion region of the second pixel circuit unit to the second charge reading region of the second pixel circuit unit in the period not overlapping with the irradiation period of the pulsed light. According to this configuration, it is possible to obtain a near-infrared image in which the influence of background light is suppressed.

In the solid-state imaging device, a period of the control pulse to transfer the charge from the photoelectric conversion region of the second pixel circuit unit to the first charge reading region of the second pixel circuit unit may be equal to a period of the control pulse to transfer the charge from the photoelectric conversion region of the second pixel circuit unit to the charge discharging region of the second pixel circuit unit. According to this configuration, it is possible to obtain a near-infrared image in which the influence of background light is suppressed.

The solid-state imaging device may further include an arithmetic circuit configured to obtain an image based on the charge. The arithmetic circuit may be configured to use the charge accumulated in the second charge reading region so as to remove a component corresponding to background light included in the charge accumulated in the first charge reading region. According to this configuration, it is possible to obtain a near-infrared image in which the influence of background light is suppressed.

The light source of the solid-state imaging device may be configured to irradiate an object with the pulsed light. The reading unit of the second pixel circuit unit may include a first charge reading region and a second charge reading region. The charge transfer control unit may be configured to, after supplying, to the second pixel circuit unit, the control pulse to transfer the charge from the photoelectric conversion region of the second pixel circuit unit to the first charge reading region of the second pixel circuit unit so as to include a period during which reflected pulsed light from the object is incident, supply, to the second pixel circuit unit, the control pulse to transfer the charge from the photoelectric conversion region of the second pixel circuit unit to the second charge reading region of the second pixel circuit unit. According to this configuration, a near-infrared image having distance information can be obtained.

The reading unit of the second pixel circuit unit of the solid-state imaging device may further include a third charge reading region. The charge transfer control unit may be configured to supply, to the second pixel circuit unit, the control pulse to transfer the charge from the photoelectric conversion region of the second pixel circuit unit to the third charge reading region of the second pixel circuit unit in a period during which the reflected pulsed light from the object is not incident. According to this configuration, it is possible to obtain a near-infrared image having distance information in which the influence of background light is suppressed.

The solid-state imaging device may further include an arithmetic circuit configured to obtain an image based on the charge. The solid-state imaging device may use the charge accumulated in the first charge reading region and the charge accumulated in the second charge reading region so as to obtain a distance to the object. According to this configuration, the distance to the object can be obtained.

The reading unit of the first pixel circuit unit of the solid-state imaging device may include a first charge reading region and a second charge reading region. The charge transfer control unit may be configured to selectively perform a first operation and a second operation. The first operation may be configured to supply, to the first pixel circuit unit, the control pulse to transfer the charge from the photoelectric conversion region of the first pixel circuit unit to the charge discharging region of the first pixel circuit unit in the period overlapping with the irradiation period of the pulsed light. The first operation may be configured to supply, to the first pixel circuit unit, the control pulse to transfer the charge from the photoelectric conversion region of the first pixel circuit unit to the first charge reading region of the first pixel circuit unit, and then to transfer the charge from the photoelectric conversion region of the first pixel circuit unit to the second charge reading region of the first pixel circuit unit in a period not overlapping with the irradiation period of the pulsed light. The second operation may be configured to supply, to the first pixel circuit unit, the control pulse to transfer the charge from the photoelectric conversion region of the first pixel circuit unit to the first charge reading region of the first pixel circuit unit in the period overlapping with the irradiation period of the pulsed light. The second operation may be configured to supply, to the first pixel circuit unit, the control pulse to transfer the charge from the photoelectric conversion region of the first pixel circuit unit to the second charge reading region of the first pixel circuit unit in the period not overlapping with the irradiation period of the pulsed light. According to this configuration, a charge caused by visible light and a charge caused by near-infrared light can be selectively obtained by one pixel.

In the solid-state imaging device, the first pixel may generate a visible light charge corresponding to the first light and may also generate a near-infrared light charge corresponding to the second light. The second pixel may generate the near-infrared light charge corresponding to the second light and may also generate the visible light charge corresponding to the first light. The charge transfer control unit may be configured to supply, to the first pixel and the second pixel, the control pulse to control transfer of the visible light charge and the near-infrared light charge. The photoelectric conversion region may generate the visible light charge and the near-infrared light charge. The reading unit may include at least one visible light charge reading region configured to receive, from the photoelectric conversion region, the transfer of the visible light charge in response to the control pulse, and at least two near-infrared light charge reading regions configured to receive, from the photoelectric conversion region, the transfer of the near-infrared light charge in response to the control pulse. The charge discharging region may be configured to discharge, from the photoelectric conversion region, the visible light charge and the near-infrared light charge in response to the control pulse. The charge transfer control unit may be configured to perform a first operation of supplying, to the first pixel and the second pixel, the control pulse to distribute the near-infrared light charge from the photoelectric conversion region to each of at least two near-infrared light charge reading regions, a second operation performed after the first operation and configured to supply, to the first pixel and the second pixel, the control pulse to discharge the visible light charge and/or the near-infrared light charge from the photoelectric conversion region, and a third operation performed after the second operation and configured to supply, to the first pixel and the second pixel, the control pulse to transfer the visible light charge from the photoelectric conversion region to the visible light charge reading region.

The solid-state imaging device can obtain a distance image including distance information to an imaging subject by the first operation. The solid-state imaging device can obtain a visible light image of the imaging subject by the third operation. Therefore, the solid-state imaging device can simultaneously acquire an image of the visible light and an image of the near-infrared light. Between the first operation and the third operation, the second operation of discharging the charge generated in the photoelectric conversion region is performed. A predetermined standby time is provided between the first operation of obtaining the distance image and the third operation of obtaining the visible light image. According to the standby time, the pulsed light generated for the first operation is sufficiently attenuated until the third operation is performed. Therefore, the solid-state imaging device can obtain an image of the visible light in which an influence of the near-infrared light is suppressed.

The solid-state imaging device may further include a third pixel and a fourth pixel configured to generate the visible light charge corresponding to the first light and to generate the near-infrared light charge corresponding to the second light. The first pixel may include a first filter configured to transmit the wavelength component of the near-infrared light and to transmit only a first wavelength component among the wavelength components included in the visible light. The second pixel may include a second filter configured to transmit the wavelength component of the near-infrared light and to transmit only a second wavelength component shorter than the first wavelength component among the wavelength components included in the visible light. The third pixel may include a third filter configured to transmit the wavelength component of the near-infrared light and to transmit only a third wavelength component shorter than the second wavelength component among the wavelength components included in the visible light. The fourth pixel may include any one of the first filter, the second filter, and the third filter. Also with this configuration, the solid-state imaging device can obtain an image of the visible light in which an influence of the near-infrared light is suppressed.

The solid-state imaging device may further include a third pixel and a fourth pixel configured to generate the visible light charge corresponding to the first light and to generate the near-infrared light charge corresponding to the second light. The first pixel may include a first filter configured to transmit the wavelength component of the near-infrared light and to transmit only a first wavelength component among the wavelength components included in the visible light. The second pixel may include a second filter configured to transmit the wavelength component of the near-infrared light and to transmit only a second wavelength component shorter than the first wavelength component among the wavelength components included in the visible light. The third pixel may include a third filter configured to transmit the wavelength component of the near-infrared light and to transmit only a third wavelength component shorter than the second wavelength component among the wavelength components included in the visible light. The fourth pixel may include a near-infrared light selection filter configured to selectively transmit only light having the wavelength component of the near-infrared light. According to this configuration, since the fourth pixel selectively transmits only the light having the wavelength component of the near-infrared light caused by the pulsed light, resistance to disturbance light can be enhanced.

Advantageous Effects of Invention

According to the present disclosure, there is provided a solid-state imaging device that simultaneously acquires an image of visible light and an image of near-infrared light, in which the solid-state imaging device is capable of acquiring the image of visible light in which an influence of near-infrared light is suppressed.

BRIEF DESCRIPTION OF DRAWINGS

FIG. 12 is a timing chart illustrating a control pulse provided to the pixel array according to the second embodiment.

FIG. 19 is a diagram illustrating an operation of a solid-state imaging device according to the fourth embodiment.

FIG. 24(*b*) is a timing chart illustrating another control pulse provided to the pixel array according to the fifth embodiment.

FIG. 30 is a plan view illustrating a pixel circuit unit included in a solid-state imaging device according to a first modification.

FIG. 35 is a cross-sectional view illustrating a structure of a pixel array included in a solid-state imaging device according to a sixth modification.

DESCRIPTION OF EMBODIMENTS

Figure 1:
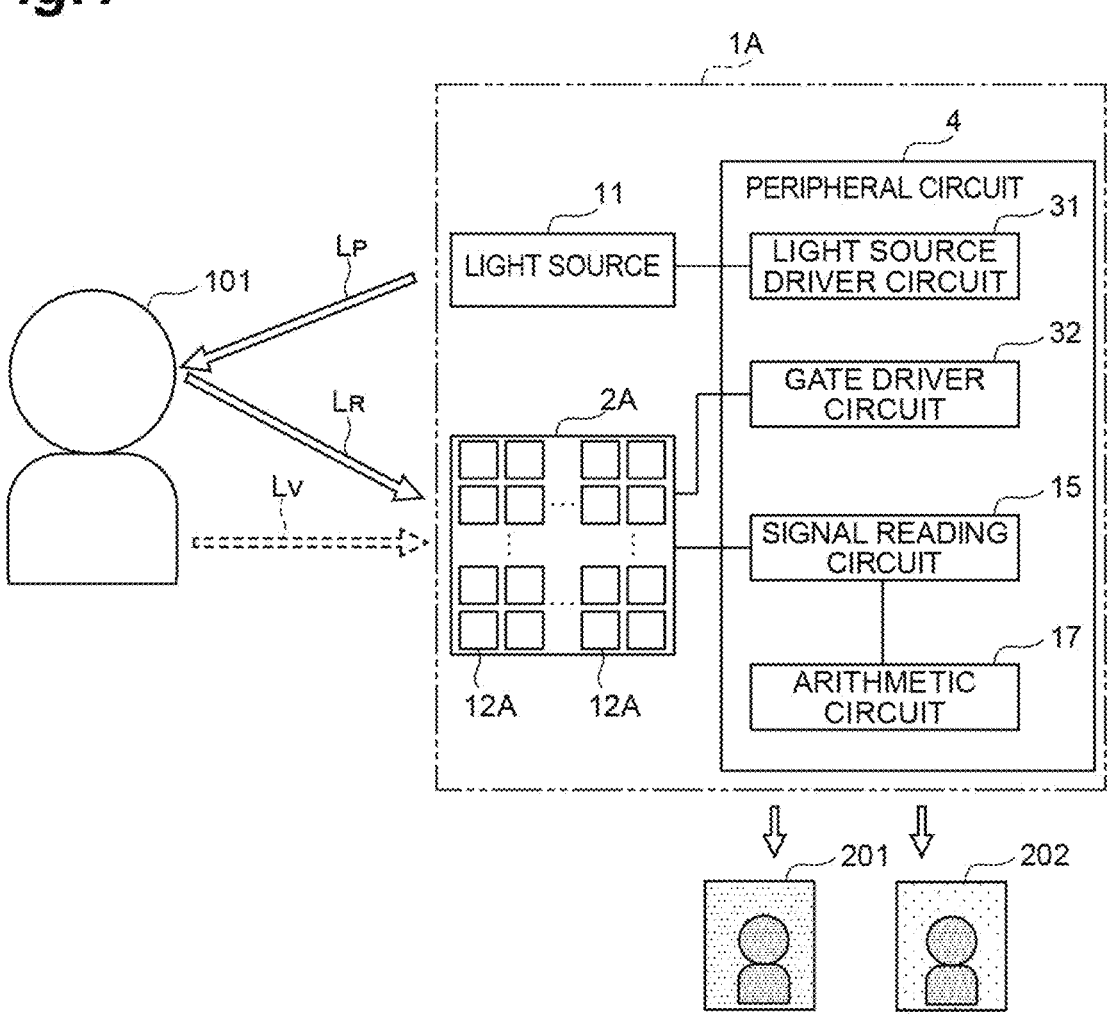
FIG. 1 is a diagram illustrating main components of a solid-state imaging device according to a first embodiment.

Hereinafter, a solid-state imaging device of the present disclosure will be described in detail with reference to the drawings. In the description of the drawings, the same or corresponding parts are denoted by the same reference numerals. Redundant description will be omitted.

First Embodiment

A solid-state imaging device 1A of a first embodiment illustrated in FIG. 1 simultaneously captures an image of visible light and an image of near-infrared light of an imaging subject 101. The image of visible light is hereinafter referred to as a "visible light image 201". The near-infrared light image is referred to as a "near-infrared light image 202". "Simultaneously capturing images" means that both the visible light image 201 and the near-infrared light image 202 are obtained in one frame.

When obtaining the near-infrared light image 202, the solid-state imaging device 1A irradiates the imaging subject 101 with irradiation pulsed light $L_P$ having a wavelength of near-infrared light from a light source 11. The solid-state imaging device 1A can output the visible light image 201 in which an influence of the irradiation pulsed light $L_P$ is suppressed. Therefore, an S/N ratio of the visible light image 201 output from the solid-state imaging device 1A is favorable.

As illustrated in FIG. 1, the solid-state imaging device 1A includes the light source 11, a pixel panel 2A, and a peripheral circuit 4.

The light source 11 generates the irradiation pulsed light $L_P$ having a wavelength in a near-infrared light region. The light source 11 includes, for example, a semiconductor light-emitting element and a drive circuit for the semiconductor light-emitting element. Examples of the semiconductor light-emitting element include a light emitting diode and a laser diode. A wavelength band of the irradiation pulsed light $L_P$ is, for example, 860±30 nanometers. Another wavelength band of the irradiation pulsed light $L_P$ is, for example, 930±30 nanometers.

The pixel panel 2A includes a plurality of pixel arrays 12A. The plurality of pixel arrays 12A are arranged in a two-dimensional array in the column direction and the row direction. The plurality of pixel arrays 12A generate a detection signal by receiving visible light Ly and reflected pulsed light $L_R$.

The peripheral circuit 4 outputs a control signal for controlling the operation of the light source 11. The peripheral circuit 4 includes a light source driver circuit 31 for the light source 11. The light source driver circuit 31 controls timing of emitting the irradiation pulsed light $L_P$ from the light source 11, intensity of the irradiation pulsed light $L_P$, a pulse width of the irradiation pulsed light $L_P$, and the like. For example, the light source driver circuit 31 repeatedly generates the irradiation pulsed light $L_P$ within a period defined as one frame at equal time intervals.

The peripheral circuit 4 outputs a control signal for controlling the operation of the pixel panel 2A. The peripheral circuit 4 includes a gate driver circuit 32 for the pixel panel 2A and a signal reading circuit 15. The peripheral circuit 4 generates the visible light image 201 and the near-infrared light image 202 using the detection signal output from the pixel panel 2A.

The peripheral circuit 4 includes an arithmetic circuit 17 for generating the visible light image 201 and the near-infrared light image 202. The arithmetic circuit 17 executes various types of processing for generating the visible light image 201 and the near-infrared light image 202 using the detection signal which is a digital value output from the signal reading circuit 15.

Figure 2:
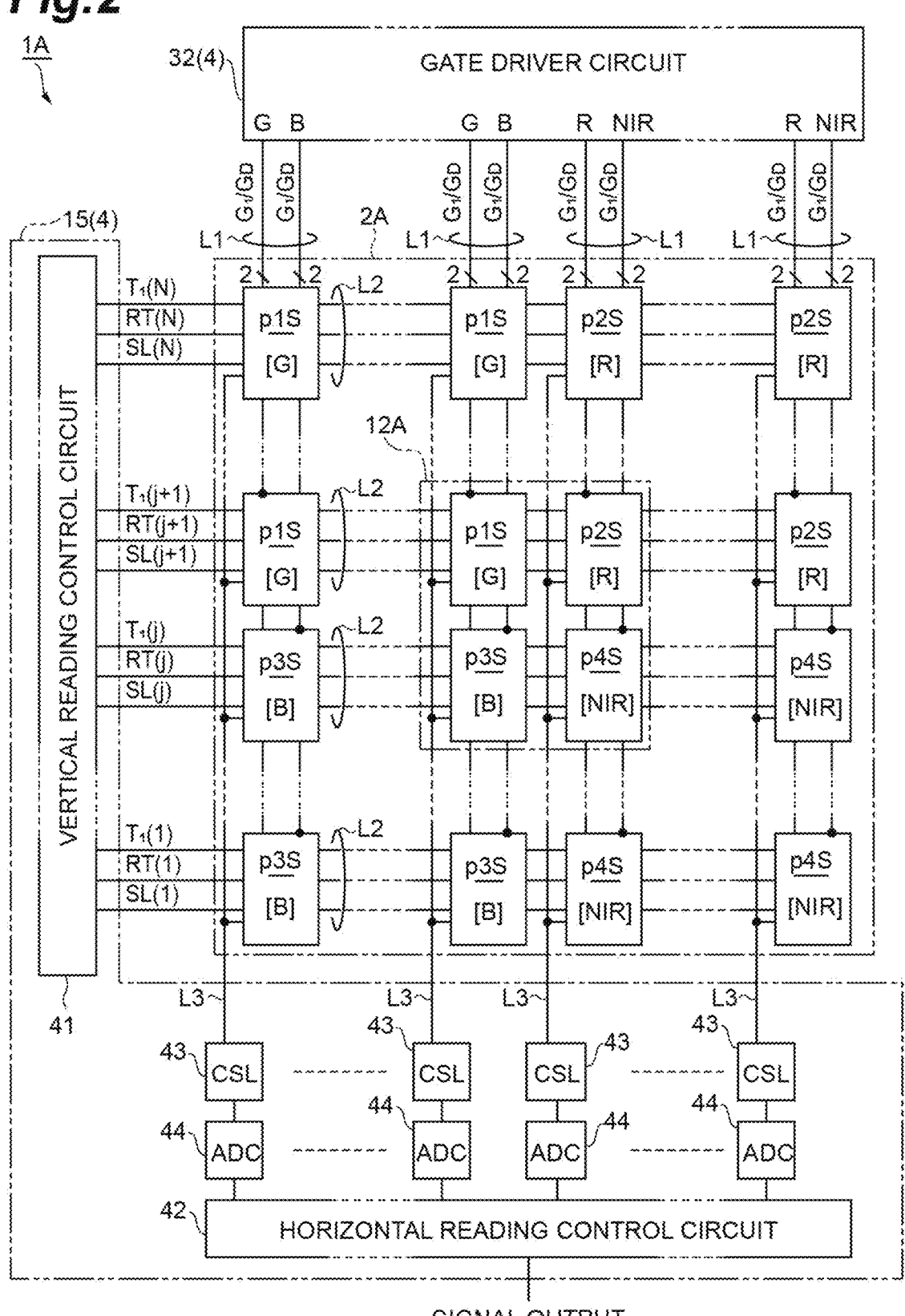
FIG. 2 is a diagram illustrating an electrical connection configuration of elements constituting the solid-state imaging device according to the first embodiment.

FIG. 2 illustrates an example of a connection configuration between the plurality of pixel arrays 12A and the peripheral circuit 4. Each of the plurality of pixel arrays 12A includes a green pixel p1S, a red pixel p2S, a blue pixel p3S, and a near-infrared pixel p4S. The green pixel p1S, the red pixel p2S, and the blue pixel p3S are "first pixels" defined in the claims. The near-infrared pixel p4S is a "second pixel" defined in the claims. The pixel array 12A includes pixels respectively corresponding to a green component (G component), a red component (R component), and a blue component (B component) constituting visible light. The pixel panel 2A includes pixels corresponding to a component of near-infrared light (NIR component).

[Gate Driver Circuit (Charge Transfer Control Unit)]

The gate driver circuit 32 generates a control signal for controlling transfer of a charge in the green pixel p1S, the red pixel p2S, the blue pixel p3S, and the near-infrared pixel p4S. The gate driver circuit 32 outputs a first transfer control pulse $G_1$ and a discharge control pulse $G_D$, which are control signals, to the green pixel p1S, the red pixel p2S, the blue pixel p3S, and the near-infrared pixel p4S via a wiring L1.

The signal reading circuit 15 includes a vertical reading control circuit 41 and a horizontal reading control circuit 42.

The vertical reading control circuit 41 outputs, via a wiring L2, a control signal to the green pixel p1S, the red pixel p2S, the blue pixel p3S, and the near-infrared pixel p4S. The vertical reading control circuit 41 outputs, for example, a first reading signal $T_1$(j), a reset signal RT (j), and a selection signal SL (j), which are control signals, to pixels arranged in the j-th row.

The horizontal reading control circuit 42 obtains, via a wiring L3, detection signals from the green pixel p1S, the red pixel p2S, the blue pixel p3S, and the near-infrared pixel p4S. The horizontal reading control circuit 42 collectively outputs the detection signals output from the respective pixels for each row to the arithmetic circuit 17 in the subsequent stage. The horizontal reading control circuit 42 receives outputs of the green pixel p1S, the red pixel p2S, the blue pixel p3S, and the near-infrared pixel p4S via a current source load (CSL) 43 and an analog-to-digital converter (ADC) 45. The current source 43 supplies a current flowing from a first voltage detection unit $26_1$ of a pixel circuit unit 13S belonging to the row selected by the vertical reading control circuit 41 to the wiring L3. The analog-to-digital converter 45 converts a detection signal, which is a voltage output from the first voltage detection unit $26_1$ of the pixel circuit unit 13S, into a digital signal.

Figure 3:
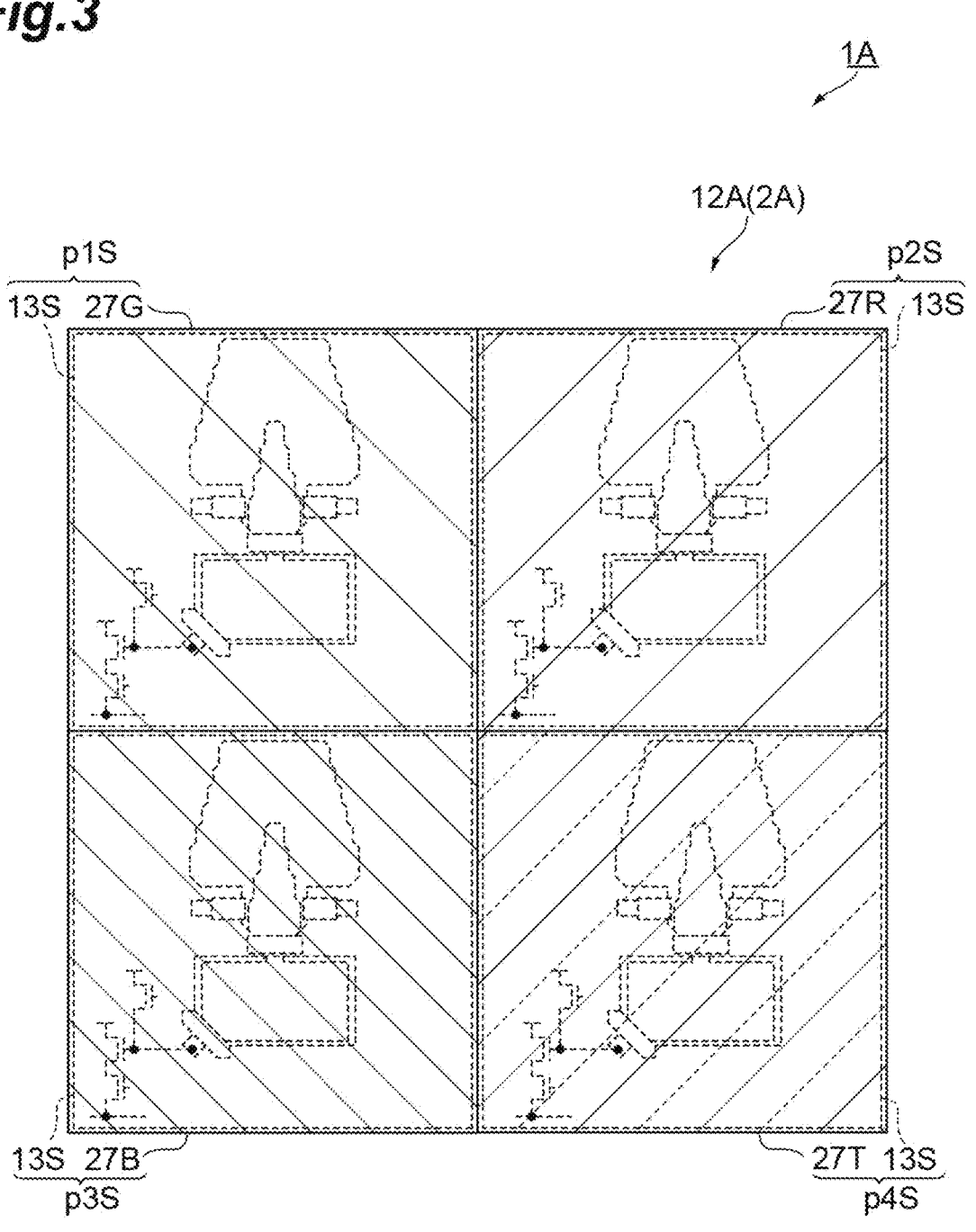
FIG. 3 is a plan view illustrating a pixel array according to the first embodiment.

FIG. 3 is a plan view of one pixel array 12A. In a certain row, the green pixel p1S and the red pixel p2S are arranged in this order along the row direction. In another row, the blue pixel p3S and the near-infrared pixel p4S are arranged in this order along the row direction. In a certain column, the green pixel p1S and the blue pixel p3S are arranged in this order along the column direction. In another column, the red pixel p2S and the near-infrared pixel p4S are arranged in this order along the column direction. The arrangement shown in FIG. 3 is exemplary. Therefore, the green pixel p1S, the red pixel p2S, the blue pixel p3S, and the near-infrared pixel p4S may be arranged differently from those in FIG. 3.

The green pixel p1S includes a wavelength selection filter 27G and the pixel circuit unit 13S (first pixel circuit unit). The red pixel p2S includes a wavelength selection filter 27R and the pixel circuit unit 13S. The blue pixel p3S includes a wavelength selection filter 27B and the pixel circuit unit 13S. The near-infrared pixel p4S includes a light transmitting member 27T and the pixel circuit unit 13S (second pixel circuit unit). The characteristics of the wavelength selection filters 27G, 27R, and 27B included in the respective pixels are different from each other. The near-infrared pixel p4S of the first embodiment does not include a wavelength selection filter. The near-infrared pixel p4S includes the light transmitting member 27T instead of the wavelength selection filter. The light transmitting member 27T does not have wavelength selectivity. The light transmitting member 27T transmits both visible light and near-infrared light.

Figure 4:
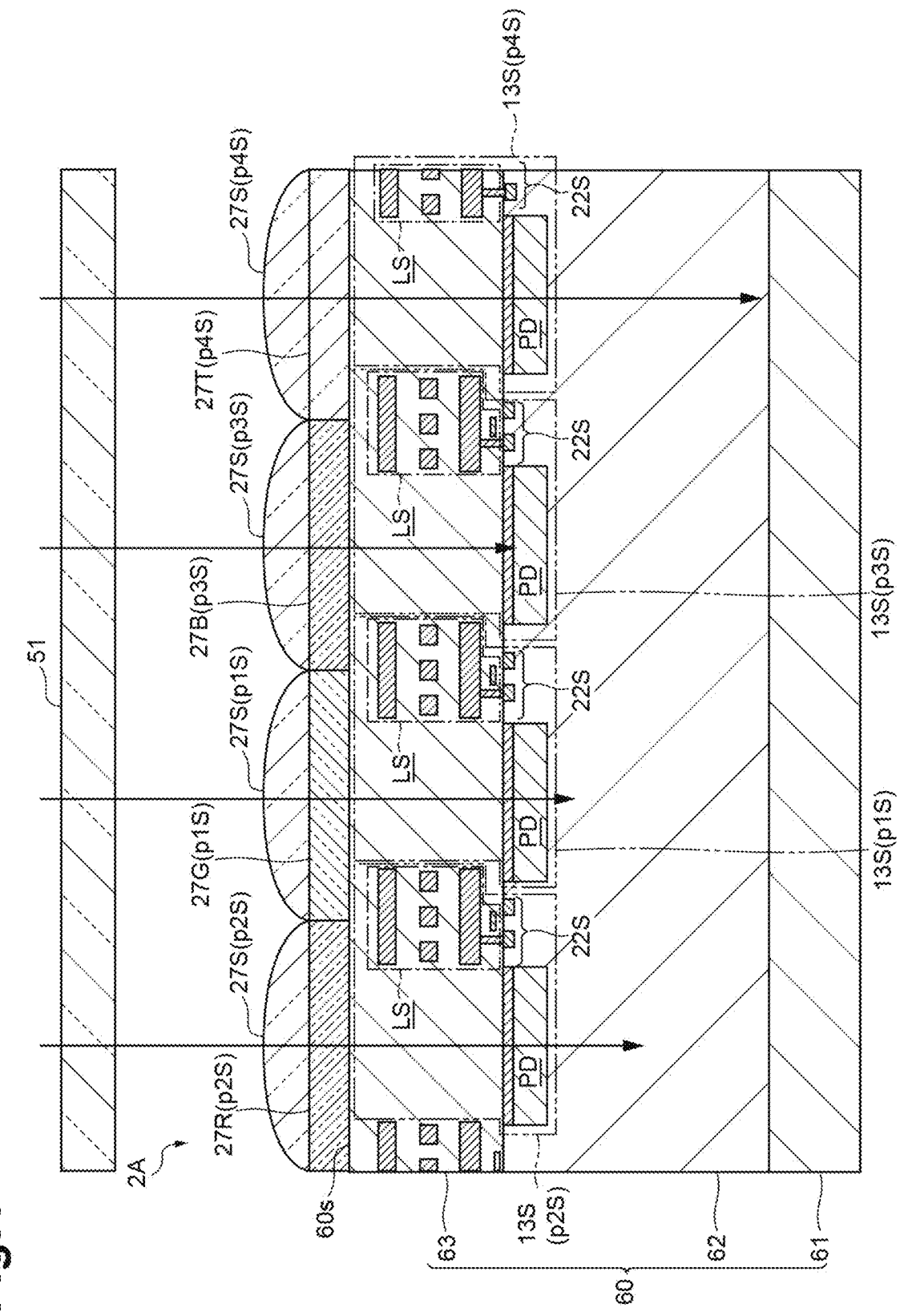
FIG. 4 is a cross-sectional view illustrating a structure of the pixel array according to the first embodiment.

FIG. 4 is a cross-sectional view illustrating a structure of the pixel panel 2A. FIG. 4 is intended to illustrate a structure for guiding light to the pixel circuit unit 13S. Therefore, the arrangement of the green pixel p1S, the red pixel p2S, the blue pixel p3S, and the near-infrared pixel p4S illustrated in FIG. 4 is different from the arrangement of the green pixel p1S, the red pixel p2S, the blue pixel p3S, and the near-infrared pixel p4S illustrated in FIG. 3.

As illustrated in FIG. 4, a cover glass 51 is disposed on the pixel panel 2A. The cover glass 51 is separated from the pixel panel 2A. For example, a lens 27S is disposed on a surface of wavelength selection filter 27R of the red pixel p2S. The red pixel p2S receives light that has passed through the lens 27S after passing through the cover glass 51. The red pixel p2S includes the wavelength selection filter 27R and the pixel circuit unit 13S. The wavelength selection filter 27R is disposed on a main surface 60s of a semiconductor multilayer substrate 60 constituting the pixel circuit unit 13S.

The cross-sectional structure of the pixel panel 2A illustrated in FIG. 4 is an example. The configuration up to the pixel circuit unit 13S is not limited to the cross-sectional structure illustrated in FIG. 4. Another example of the cross-sectional structure will be described later as fourth to sixth modifications.

The semiconductor multilayer substrate 60 includes a lower semiconductor layer 61, a middle semiconductor layer 62, and an upper semiconductor layer 63. The lower semiconductor layer 61 is p-type and is a base of the semiconductor multilayer substrate 60. The middle semiconductor layer 62 is provided on the lower semiconductor layer 61. The middle semiconductor layer 62 includes a photodiode PD constituting a photoelectric conversion region 21 to be described later. The middle semiconductor layer 62 also includes a reading unit 22S to be described later. The upper semiconductor layer 63 is provided on the middle semiconductor layer 62. The middle semiconductor layer 62 has a wiring portion LS including the wirings L1, L2, and L3.

Figure 5:
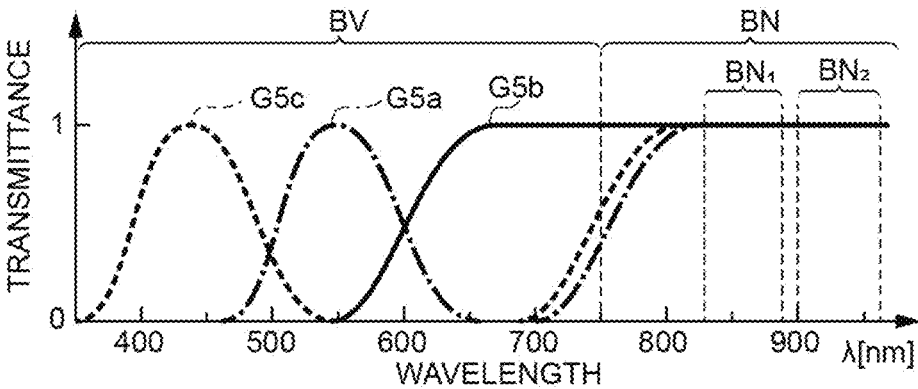
FIG. 5 is a graph illustrating characteristics of a wavelength selection filter.

FIG. 5 illustrates light transmission characteristics of the wavelength selection filters 27G, 27R, and 27B. The light transmission characteristic means transmittance with respect to a wavelength. The horizontal axis in FIG. 5 indicates the wavelength of light. In FIG. 5, the vertical axis represents light transmittance. A graph G5a indicates a light transmission characteristic of the wavelength selection filter 27G included in the green pixel p1S. According to the graph G5a, a first transmission band of the wavelength selection filter 27G included in the green pixel p1S is 550±50 nanometers. The second transmission band of the wavelength selection filter 27G included in the pixel p1S is 800 nanometers or more. A graph G5b indicates a light transmission characteristic of the wavelength selection filter 27R included in the red pixel p2S. According to the graph G5b, a transmission band of the wavelength selection filter 27R included in the red pixel p2S is 650 nanometers or more. A graph G5c illustrates a light transmission characteristic of the wavelength selection filter 27B of the blue pixel p3S. According to the graph G5c, a first transmission band of the wavelength selection filter 27B included in the blue pixel p3S is 450±50 nanometers. The second transmission band of the wavelength selection filter 27B included in the blue pixel p3S is 800 nanometers or more.

According to FIG. 5, the wavelength selection filters 27G, 27R, and 27B also have a near-infrared light band BN of 800 nanometers or more in addition to a visible light band BV corresponding to each color component. The wavelength selection filters 27G, 27R, and 27B transmit light of each color component and also transmit near-infrared light.

Figure 6:
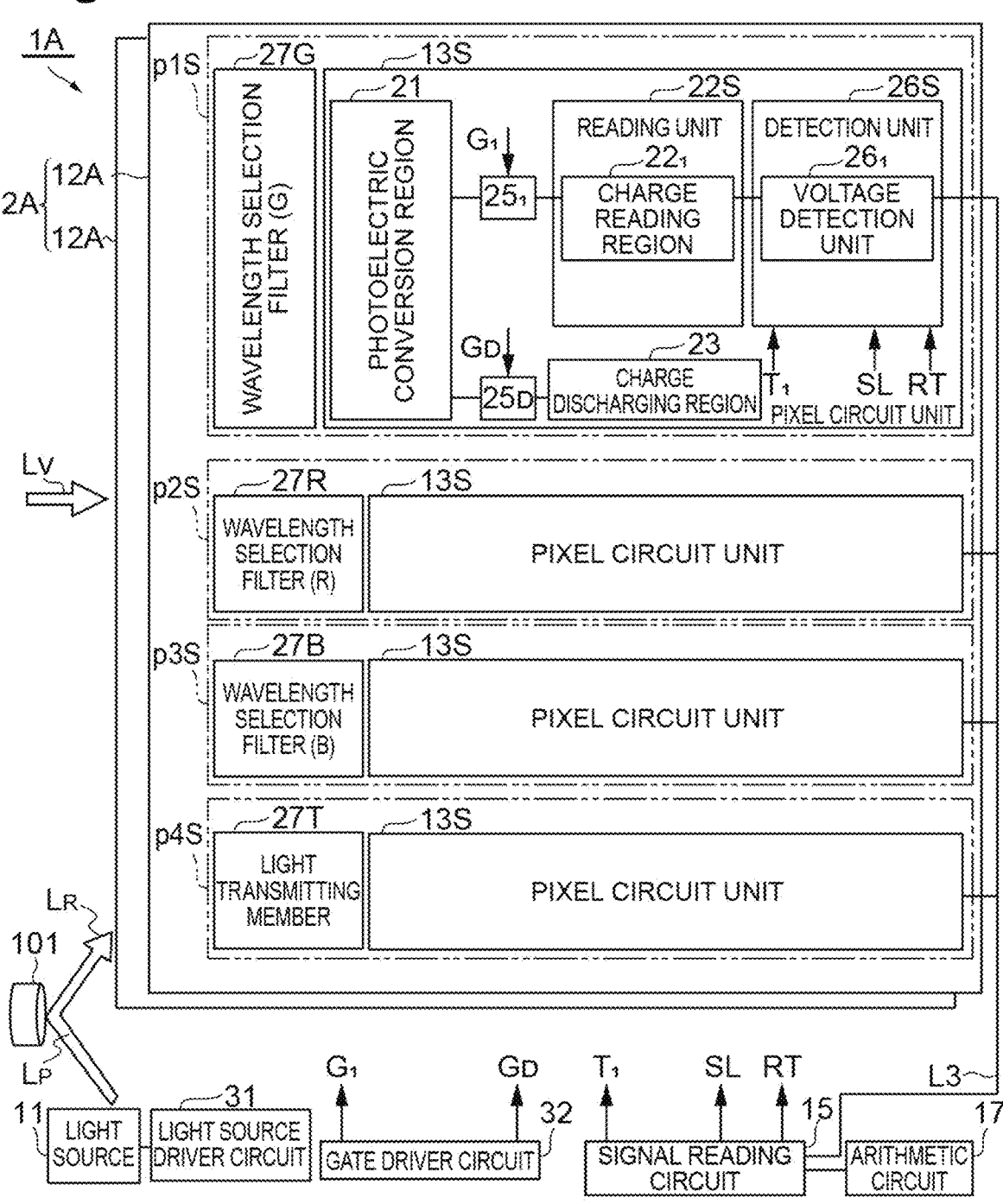
FIG. 6 is a block diagram illustrating a detailed configuration of the solid-state imaging device according to the first embodiment.

FIG. 6 is a functional block diagram focusing on the pixel circuit unit 13S. In the solid-state imaging device 1A of the first embodiment, the pixel circuit unit 13S of the green pixel p1S, the pixel circuit unit 13S of the red pixel p2S, the pixel circuit unit 13S of the blue pixel p3S, and the pixel circuit unit 13S of the near-infrared pixel p4S all have the same configuration. Hereinafter, the pixel circuit unit 13S of the green pixel p1S will be described in detail as an example.

As illustrated in FIG. 6, the pixel circuit unit 13S includes the photoelectric conversion region 21, the reading unit 22S, and a detection unit 26S. The photoelectric conversion region 21 generates a charge corresponding to the received light. The reading unit 22S receives transfer of a charge from the photoelectric conversion region 21. The reading unit 22S of the pixel circuit unit 13S has a first charge reading region $22_1$. Transfer of a charge from the photoelectric conversion region 21 to the first charge reading region $22_1$ is controlled by a first transfer control gate $25_1$. In response to a first transfer control pulse $G_1$ output from the gate driver circuit 32, the first transfer control gate $25_1$ mutually switches between permission and prohibition of transfer of a charge from the photoelectric conversion region 21 to the first charge reading region $22_1$. The detection unit 26S detects a voltage corresponding to the charge present in the reading unit 22S. The detection unit 26S of the pixel circuit unit 13S includes a first voltage detection unit $26_1$. The voltage detected by the first voltage detection unit $26_1$ is output as a detection signal to the signal reading circuit 15 via the wiring L3. A charge discharging region 23 also receives transfer of a charge from the photoelectric conversion region 21. The charge discharging region 23 is a so-called drain.

Figure 7:
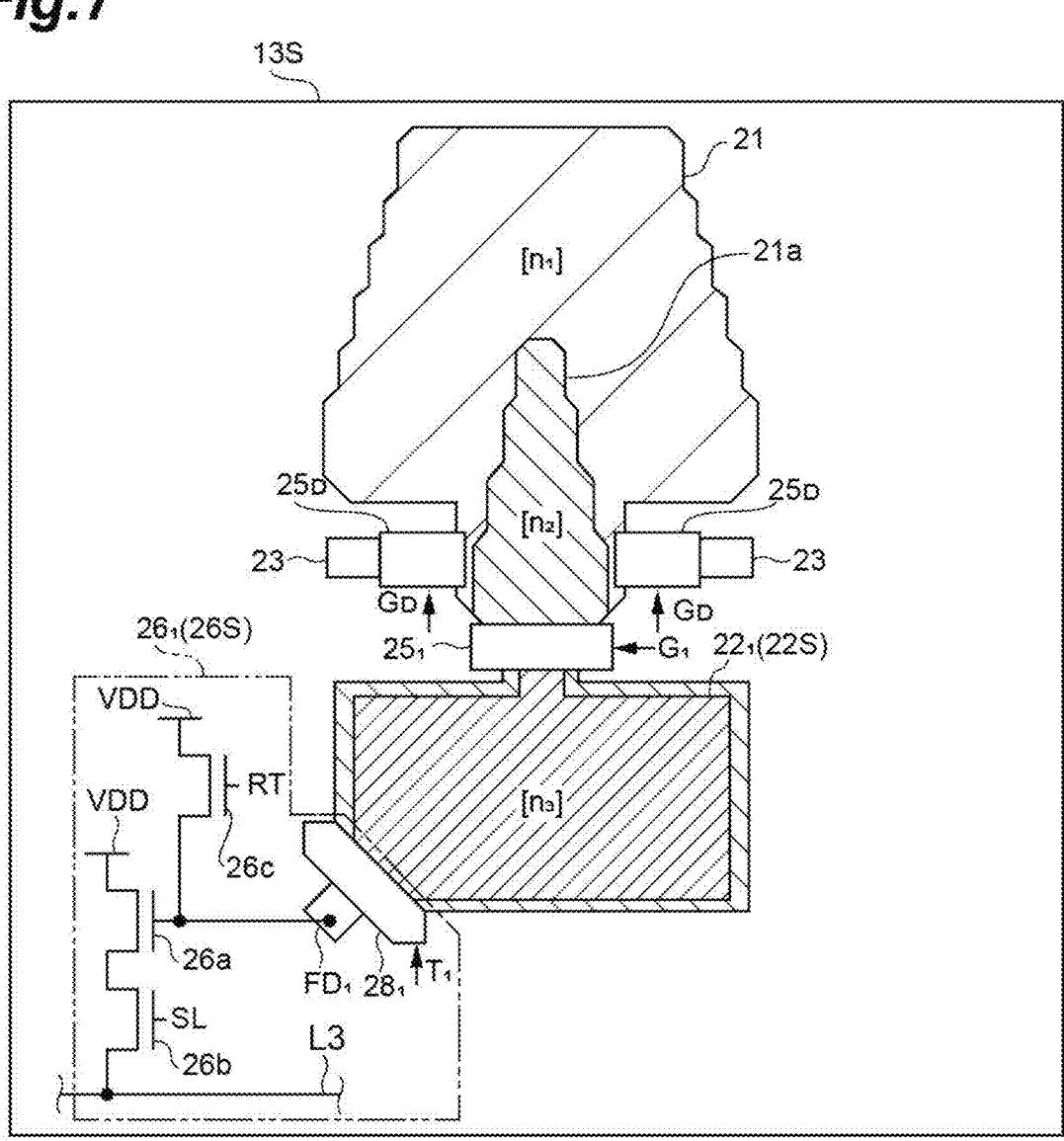
FIG. 7 is a plan view illustrating a pixel circuit unit according to the first embodiment in detail.

FIG. 7 is a plan view illustrating a more specific structure of the pixel circuit unit 13S.

The photoelectric conversion region 21 generates a charge corresponding to the received light. The photoelectric conversion region 21 only needs to be able to generate a charge corresponding to light having a wavelength to be detected. The charge moves to the reading unit 22S via a charge collection region 21a.

Transfer of a charge from the photoelectric conversion region 21 to the reading unit 22S is permitted or prohibited by the first transfer control gate $25_1$. The first transfer control gate $25_1$ is disposed between the photoelectric conversion region 21 and the reading unit 22S. The first transfer control gate $25_1$ adopts a so-called MOS gate structure. The structure of the MOS gate has excellent OFF characteristics. The structure of the MOS gate has a large potential barrier (potential barrier) at the time of OFF. In the structure of the MOS gate, so-called return charges caused by electrons existing under the gate are likely to be generated.

The first transfer control gate $25_1$ is not limited to the structure of the MOS gate. As shown in the second and third modifications to be described later, a structure based on the principle of a lateral electric field controlled charge modulator (LEFM) developed by the present inventors may be adopted.

A pair of charge discharging regions 23 is disposed between the photoelectric conversion region 21 and the reading unit 22S. More specifically, the pair of charge discharging regions 23 is disposed beside the charge collection region 21a so as to sandwich the charge collection region 21a. The charge discharging region 23 discharges a charge generated according to light that is not a detection target.

A discharge control gate $25_D$ is disposed between the charge collection region 21a and the charge discharging region 23. Transfer of a charge from the photoelectric conversion region 21 to the charge discharging region 23 is permitted or prohibited by the discharge control gate $25_D$.

The charge generated in the photoelectric conversion region 21 moves to either the charge discharging region 23 or the reading unit 22S.

The reading unit 22S receives the movement of the charge generated in the photoelectric conversion region 21. The reading unit 22S temporarily accumulates charges. The reading unit 22S has the first charge reading region $22_1$. The first charge reading region $22_1$ temporarily stores the charge transferred from the photoelectric conversion region 21. The charge may be transferred once from the photoelectric conversion region 21. The charge may move from the photoelectric conversion region 21 a plurality of times. By accepting a plurality of times of charge transfer, the charge to be accumulated can be increased.

The detection unit 26S detects a voltage corresponding to an amount of charge. The detection unit 26S includes a first floating diffusion region $FD_1$, a reading transistor 26a, a selection transistor 26b, and a reset transistor 26c.

The first floating diffusion region $FD_1$ receives movement of charges accumulated in the first charge reading region $22_1$. A first reading control gate $28_1$ is disposed between the first charge reading region $22_1$ and the first floating diffusion region $FD_1$. The first reading control gate $28_1$ permits or prohibits the movement of a charge from the first charge reading region $22_1$ to the first floating diffusion region $FD_1$.

In response to a control signal, the reading transistor 26a and the selection transistor 26b output a voltage corresponding to the amount of charges accumulated in the first floating diffusion region $FD_1$ as a detection signal. The reset transistor 26c discharges the charges accumulated in the first floating diffusion region $FD_1$.

The drain of the reading transistor 26a is connected to a power supply VDD. The gate of the reading transistor 26a is connected to the first floating diffusion region $FD_1$. The source of the reading transistor 26a is connected to the selection transistor 26b.

The drain of the selection transistor 26b is connected to the source of the reading transistor 26a. The gate of the selection transistor 26b receives a selection signal SL. The source of the selection transistor 26b is connected to the wiring L3.

The drain of the reset transistor 26c is connected to the power supply VDD. The gate of the reset transistor 26c receives a reset signal RT (j) from the signal line. The source of the reset transistor 26c is connected to the first floating diffusion region $FD_1$.

[Operation/Timing Chart]

Next, the operation of the solid-state imaging device 1A will be described with reference to a timing chart illustrated in FIG. 8. In the following description, attention is particularly paid to the operation of the pixel array 12A.

Figure 8:
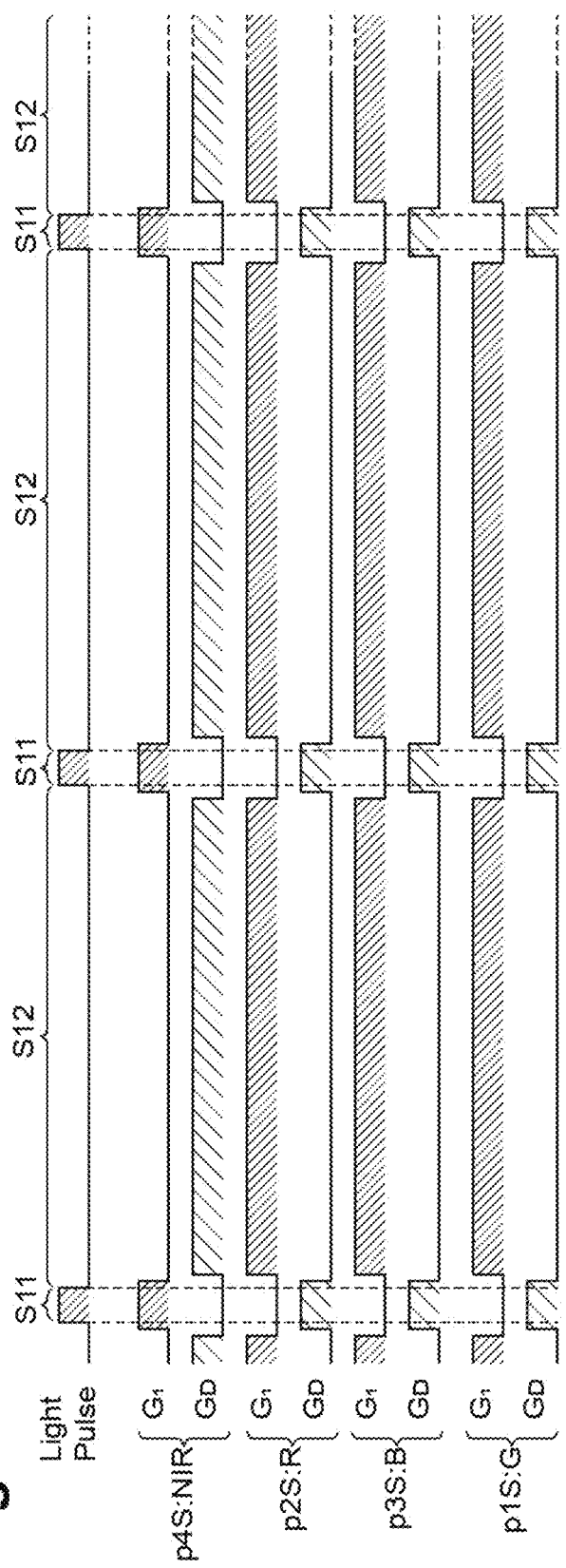
FIG. 8 is a timing chart illustrating a control pulse provided to the pixel array according to the first embodiment.

In FIG. 8, the uppermost chart shows a timing at which the irradiation pulsed light $L_P$ is emitted from the light source 11. In the chart, when the level is low (L), irradiation pulsed light $L_P$ is not emitted. This state is referred to as "irradiation stop". In the chart, when the level is high (H), the irradiation pulsed light $L_P$ is emitted. This state is referred to as "irradiation execution".

In FIG. 8, the first transfer control pulse $G_1$ is output from the gate driver circuit 32 to the first transfer control gate $25_1$ of each of the green pixel p1S, the red pixel p2S, the blue pixel p3S, and the near-infrared pixel p4S. The discharge control pulse $G_D$ is output from the gate driver circuit 32 to the discharge control gate $25_D$ of each of the green pixel p1S, the red pixel p2S, the blue pixel p3S, and the near-infrared pixel p4S. The first transfer control pulse $G_1$ and the discharge control pulse $G_D$ include low (L) and high (H) as signal levels. The first transfer control pulse $G_1$ and the discharge control pulse $G_D$ whose signal level is low (L) prohibit transfer of a charge. The first transfer control pulse $G_1$ and the discharge control pulse $G_D$ whose signal level is high (H) permit transfer of a charge.

In the operation example illustrated in FIG. 8, the light source 11 emits the irradiation pulsed light $L_P$ a plurality of times in a certain frame period. The frame period includes an irradiation period S11 during which the irradiation pulsed light $L_P$ is emitted and a non-irradiation period S12 during which the irradiation pulsed light $L_P$ is not emitted. The irradiation period S11 is set before the non-irradiation period S12. The irradiation period S11 is shorter than the non-irradiation period S12.

In the irradiation period S11, the green pixel p1S, the red pixel p2S, and the blue pixel p3S discharge charges from the photoelectric conversion region 21 to the charge discharging region 23 by the following operation.

The gate driver circuit 32 outputs a first transfer control pulse $G_1(L)$ to the first transfer control gate $25_1$ of the green pixel p1S, the red pixel p2S, and the blue pixel p3S. The gate driver circuit 32 outputs a discharge control pulse $G_D(H)$ to the discharge control gates $25_D$ of the green pixel p1S, the red pixel p2S, and the blue pixel p3S.

Specifically, the gate driver circuit 32 prohibits transfer of a charge from the photoelectric conversion region 21 of the green pixel p1S or the like to the reading unit 22S. Thereafter, the gate driver circuit 32 permits discharge of a charge from the photoelectric conversion region 21 of the green pixel p1S or the like to the charge discharging region 23. Thereafter, the light source driver circuit 31 starts irradiation with the irradiation pulsed light $L_P$. A starting period of a period during which the first transfer control pulse $G_1$ of the green pixel p1S or the like is low overlaps with the non-irradiation period S12. A starting period of a period during which the discharge control pulse $G_D$ of the near-infrared pixel p4S is high also overlaps with the non-irradiation period S12.

A timing at which the first transfer control pulse $G_1$ of the green pixel p1S or the like is switched from high to low is slightly earlier than a timing at which the discharge control pulse $G_D$ of the green pixel p1S or the like is switched from low to high.

The timing at which the discharge control pulse $G_D$ of the green pixel p1S or the like is switched from low to high is slightly earlier than a timing at which the irradiation stop is switched to the irradiation execution.

In the irradiation period S11, the near-infrared pixel p4S transfers the charge from the photoelectric conversion region 21 to the reading unit 22S by the following operation.

Specifically, the gate driver circuit 32 prohibits discharge of a charge from the photoelectric conversion region 21 of the near-infrared pixel p4S to the charge discharging region 23. Thereafter, the gate driver circuit 32 permits transfer of a charge from the photoelectric conversion region 21 of the near-infrared pixel p4S to the reading unit 22S. Thereafter, the light source driver circuit 31 starts irradiation with the irradiation pulsed light $L_P$. A starting period of a period during which the discharge control pulse $G_D$ of the near-infrared pixel p4S is low overlaps with the non-irradiation period S12. A starting period of a period during which the first transfer control pulse $G_1$ of the near-infrared pixel p4S is high also overlaps with the non-irradiation period S12.

In the irradiation period S11, the gate driver circuit 32 outputs a discharge control pulse $G_D(L)$ to the discharge control gate $25_D$ of the near-infrared pixel p4S. The gate driver circuit 32 outputs a first transfer control pulse $G_1(H)$ to the first transfer control gate $25_1$ of the near-infrared pixel p4S.

A timing at which the discharge control pulse $G_D$ of the near-infrared pixel p4S is switched from high to low is slightly earlier than a timing at which the first transfer control pulse $G_1$ of the near-infrared pixel p4S is switched from low to high.

A timing at which the first transfer control pulse $G_1$ of the near-infrared pixel p4S is switched from low to high is slightly earlier than a timing at which the irradiation stop is switched to the irradiation execution.

In the non-irradiation period S12, the green pixel p1S, the red pixel p2S, and the blue pixel p3S transfer charges from the photoelectric conversion region 21 to the reading unit 22S by the following operation.

Specifically, first, the light source driver circuit 31 stops emission of the irradiation pulsed light $L_P$. Thereafter, the gate driver circuit 32 prohibits discharge of a charge from the photoelectric conversion region 21 of the green pixel p1S or the like to the charge discharging region 23. Thereafter, the gate driver circuit 32 permits transfer of a charge from the photoelectric conversion region 21 of the green pixel p1S or the like to the reading unit 22S. In other words, the end of the period during which the first transfer control pulse $G_1$ of the green pixel p1S or the like is low overlaps with the non-irradiation period S12. The end of the period during which the discharge control pulse $G_D$ of the near-infrared pixel p4S is high also overlaps with the non-irradiation period S12.

The gate driver circuit 32 outputs the first transfer control pulse $G_1$(H) to the first transfer control gate $25_1$ of the green pixel p1S, the red pixel p2S, and the blue pixel p3S. The gate driver circuit 32 outputs the discharge control pulse $G_D$(L) to the discharge control gates $25_D$ of the green pixel p1S, the red pixel p2S, and the blue pixel p3S.

A timing at which the discharge control pulse $G_D$ of the green pixel p1S or the like is switched from high to low is slightly later than a timing at which the irradiation execution is switched to the irradiation stop.

A timing at which the first transfer control pulse $G_1$ of the green pixel p1S or the like is switched from low to high is slightly earlier than a timing at which the discharge control pulse $G_D$ of the green pixel p1S or the like is switched from high to low.

In the non-irradiation period S12, the near-infrared pixel p4S discharges a charge from the photoelectric conversion region 21 to the charge discharging region 23 by the following operation.

Specifically, first, the light source driver circuit 31 stops emission of the irradiation pulsed light $L_P$. Thereafter, the gate driver circuit 32 prohibits transfer of a charge from the photoelectric conversion region 21 of the near-infrared pixel p4D to the reading unit 22S. Thereafter, the gate driver circuit 32 permits discharge of a charge from the photoelectric conversion region 21 of the near-infrared pixel p4S to the charge discharging region 23. An ending period of a period during which the discharge control pulse $G_D$ of the near-infrared pixel p4S is low overlaps with the non-irradiation period S12. An ending period of a period during which the first transfer control pulse $G_1$ of the near-infrared pixel p4S is high also overlaps with the non-irradiation period S12.

The gate driver circuit 32 outputs the first transfer control pulse $G_1$(L) to the first transfer control gate $25_1$ of the near-infrared pixel p4S. The gate driver circuit 32 outputs the discharge control pulse $G_D$(H) to the discharge control gate $25_D$ of the near-infrared pixel p4S.

A timing at which the first transfer control pulse $G_1$ of the near-infrared pixel p4S is switched from high to low is slightly later than a timing at which the irradiation execution is switched to the irradiation stop.

A timing at which the discharge control pulse $G_D$ of the near-infrared pixel p4S is switched from low to high is slightly later than a timing at which the first transfer control pulse $G_1$ of the near-infrared pixel p4S is switched from high to low.

[Operation and Effect]

In the solid-state imaging device that acquires the visible light image 201 and the near-infrared light image 202, there has been a problem that a near-infrared component is included in a visible light component. There is also a method of removing the mixed near-infrared component by image processing. When the near-infrared component is mixed into the visible light component, shot noise remains. As a result, the S/N deteriorates. When it is desired to obtain only the visible light component, on/off of a filter is mechanically switched using a near-infrared cut filter. In this method, the near-infrared image and the visible light image cannot be simultaneously acquired. The mechanism for mechanically switching on and off the filter has problems in terms of cost increase and reliability.

What is particularly problematic when it is desired to simultaneously acquire the visible light image 201 and the near-infrared light image 202 is a component caused by strong near-infrared auxiliary light when measurement is performed using near-infrared auxiliary light. It is considered that components due to natural light and artificial disturbance light can be sufficiently reduced by devising. The natural light only needs to be considered sunlight. Assuming that the illumination is a fluorescent lamp or an LED, the artificial light contains less near-infrared components. Therefore, when measurement is performed using the near-infrared auxiliary light, auxiliary light in a 940 nm band having a small sunlight component is used. A bandpass filter that passes only auxiliary light in a 940 nm band is used. Furthermore, the pixel circuit unit 13S and a lock-in mechanism prevent the near-infrared auxiliary light from being captured in the visible light pixel. As a result, the near-infrared component of the natural light or the artificial light as a disturbance can be sufficiently reduced. Therefore, the visible light image 201 with good color reproducibility can be obtained. Furthermore, the near-infrared light image 202 having a high S/N ratio locked in with the auxiliary light can also be obtained.

The solid-state imaging device 1A includes the green pixel p1S, the red pixel p2S, and the blue pixel p3S that receive light including a wavelength component of visible light and generate a charge, and the near-infrared pixel p4S that receives light including a wavelength component of near-infrared light and generates a charge. Therefore, the visible light image 201 and the near-infrared light image 202 can be simultaneously acquired. When the irradiation pulsed light $L_P$ of the near-infrared light is generated, the solid-state imaging device 1A discharges the charges generated in the green pixel p1S, the red pixel p2S, and the blue pixel p3S that generate the charges caused by the light including the wavelength component of the visible light to the charge discharging region 23. Therefore, it is possible to obtain the visible light image 201 in which the influence of the near-infrared light is suppressed.

The solid-state imaging device 1A simultaneously acquires the near-infrared light image 202 and the color image (visible light image 201) based on the visible light component using near-infrared auxiliary light (repeated pulsed light). In each pixel, the photoelectric conversion region 21(PD) and the reading unit 22(SD) are different regions. The pixel for obtaining the detection signal caused by the visible light component has a function of eliminating sensitivity by discharging a generated photocharge to the charge discharging region 23. At a timing when the near-infrared auxiliary light (repeated pulsed light) is emitted, the charge due to the near-infrared light is not taken into the visible light image 201.

The solid-state imaging device 1A can simultaneously capture both the visible light image 201 by natural light and the near-infrared light image 202 using the near-infrared light (NIR) serving as repeated pulsed light. The solid-state imaging device 1A can also operate to acquire only one of the visible light image 201 and the near-infrared light image 202.

A plurality of pixels (optimally four pixels) of the pixel array 12A of the solid-state imaging device 1A is used as a unit. A pixel (green pixel p1S, red pixel p2S, and blue pixel p3S) for acquiring a signal of the visible light component discharges a signal charge generated in the photoelectric conversion region 21 to the charge discharging region 23 when the near-infrared light is emitted. As a result, the sensitivity can be eliminated. At this time, the charges accumulated in the reading unit 22 are retained.

When the near-infrared light is not emitted, the pixel for acquiring the signal of the visible light component permits transfer of a charge to the reading unit 22. The pixel for acquiring the signal of the visible light component prohibits discharge of a charge to the charge discharging region 23. As a result, the charge generated by the natural light is accumulated in the reading unit 22.

In the near-infrared pixel p4S that acquires a near-infrared signal caused by the near-infrared pulsed light, the first transfer control gate $25_1$ is opened in accordance with an irradiation timing of the irradiation pulsed light $L_P$. As a result, charges due to the near-infrared light pulsed light are repeatedly accumulated. As a result, it is possible to avoid mixing of the near-infrared light into the visible light pixel and simultaneously capture both the visible light image 201 and the near-infrared light image 202.

In a sensor that acquires the visible light image 201 and the near-infrared light image 202 using four pixels, all the pixels have one photoelectric conversion region 21, the first charge reading region $22_1$, and one charge discharging region 23. These pixels are individually driven. The near-infrared pixel p4S acquires a detection signal by the near-infrared auxiliary light. The visible light pixel (green pixel p1S, red pixel p2S, and blue pixel p3S) eliminates a detection signal by the near-infrared auxiliary light and acquires red, green, and blue signal components.

Second Embodiment

Figure 9:
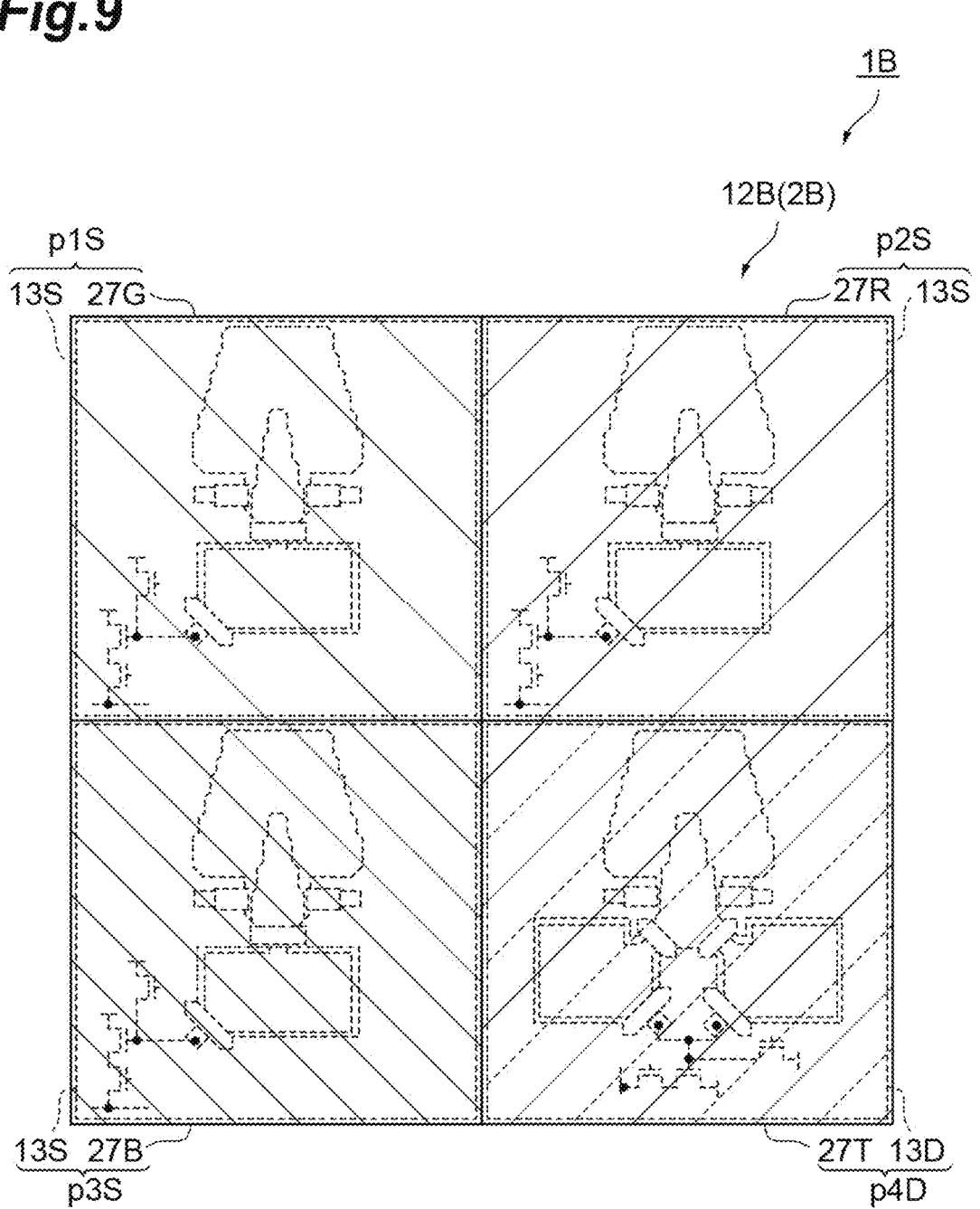
FIG. 9 is a plan view illustrating a pixel array according to a second embodiment.

A solid-state imaging device 1B of a second embodiment illustrated in FIG. 9 simultaneously captures the visible light image 201 and the near-infrared light image 202. Similarly to the first embodiment, the S/N ratio of the visible light image 201 output from the solid-state imaging device 1B is favorable. The influence of background light is suppressed in the near-infrared light image 202 output from the solid-state imaging device 1B of the second embodiment.

The solid-state imaging device 1B includes the light source 11, a pixel panel 2B, and the peripheral circuit 4. The pixel panel 2B includes a plurality of pixel arrays 12B. The arrangement of the plurality of the pixel arrays 12B is the same as that of the first embodiment.

As illustrated in FIG. 9, each of the plurality of pixel arrays 12B includes the green pixel p1S, the red pixel p2S, the blue pixel p3S, and a near-infrared pixel p4D. The green pixel p1S, the red pixel p2S, and the blue pixel p3S are the same as those in the first embodiment. The near-infrared pixel p4D is different from the near-infrared pixel p4S of the first embodiment. The near-infrared pixel p4D includes a pixel circuit unit 13D. The pixel circuit unit 13D is different from the pixel circuit unit 13S of the first embodiment.

Figure 10:
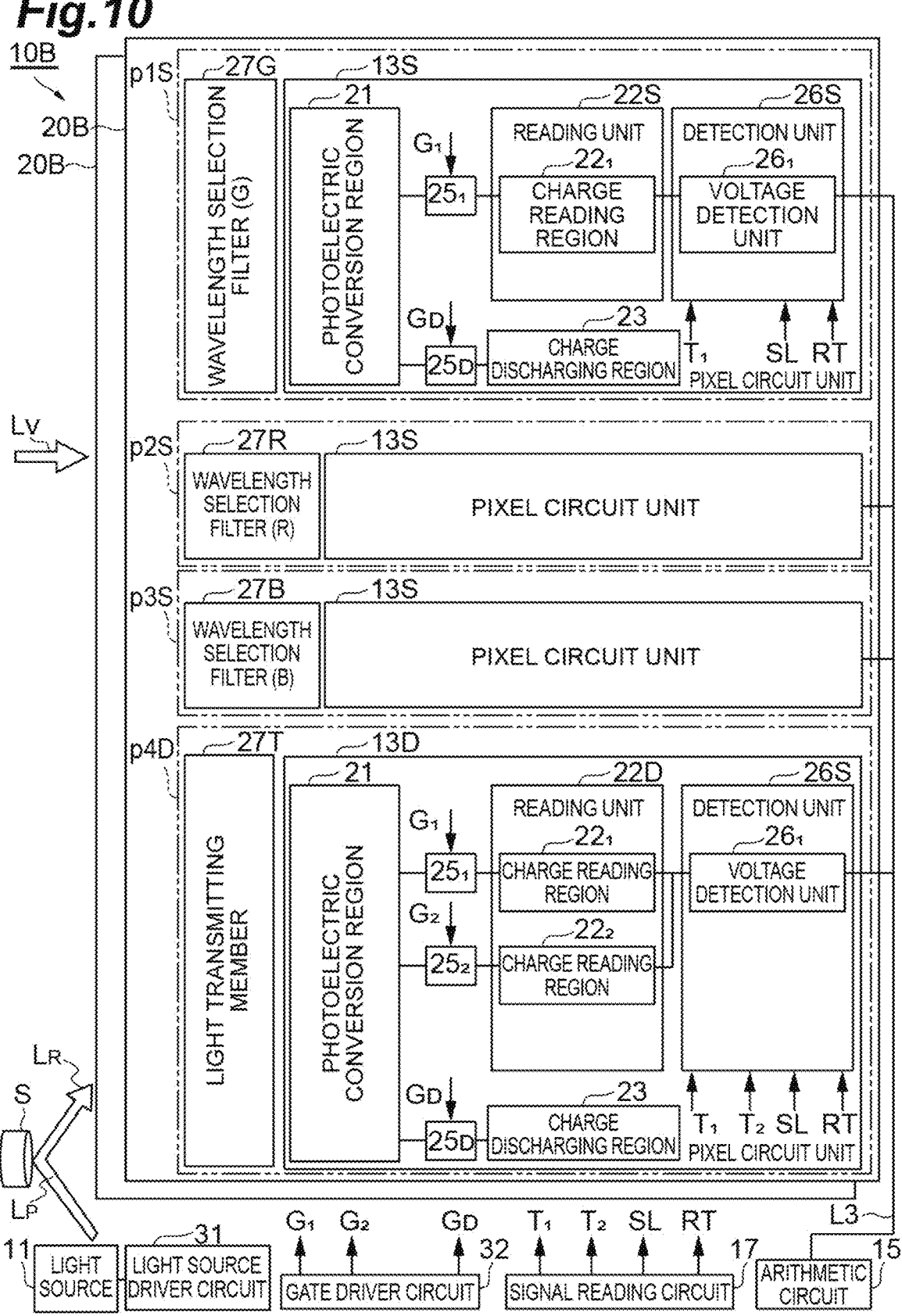
FIG. 10 is a block diagram illustrating a detailed configuration of a solid-state imaging device according to the second embodiment.

As illustrated in FIG. 10, a reading unit 22D of the near-infrared pixel p4D includes a first charge reading region $22_1$ and a second charge reading region $22_2$. The first charge reading region $22_1$ is connected to the photoelectric conversion region 21 via the first transfer control gate $25_1$. The first transfer control gate $25_1$ receives the first transfer control pulse $G_1$ from the gate driver circuit 32. The first transfer control gate $25_1$ permits or prohibits the movement of a charge from the photoelectric conversion region 21 to the first charge reading region $22_1$ according to the first transfer control pulse $G_1$. The second charge reading region $22_2$ also has the same configuration as the first charge reading region $22_1$. A second transfer control gate $25_2$ receives a second transfer control pulse $G_2$ from the gate driver circuit 32. The operation of transfer of a charge to the first charge reading region $22_1$ and the second charge reading region $22_2$ is exclusive. When transfer of a charge from the photoelectric conversion region 21 to the first charge reading region $22_1$ is permitted, the transfer of the charge from the photoelectric conversion region 21 to the second charge reading region $22_2$ is prohibited. When the transfer of the charge from the photoelectric conversion region 21 to the second charge reading region $22_2$ is permitted, the transfer of the charge from the photoelectric conversion region 21 to the first charge reading region $22_1$ is prohibited.

The light source driver circuit 31 is the same as that of the first embodiment. The gate driver circuit 32 outputs the first transfer control pulse $G_1$ and the discharge control pulse $G_D$ to the green pixel p1S, the red pixel p2S, and the blue pixel p3S, respectively. The gate driver circuit 32 outputs the first transfer control pulse $G_1$ and the discharge control pulse $G_D$ to the near-infrared pixel p4S. The gate driver circuit 32 further outputs the second transfer control pulse $G_2$ to the near-infrared pixel p4S. The signal reading circuit 15 outputs a first reading signal T1, a selection signal SL, and a reset signal RT to the green pixel p1S, the red pixel p2S, and the blue pixel p3S, respectively. The signal reading circuit 15 outputs the first reading signal T1, the selection signal SL, and the reset signal RT to the near-infrared pixel p4S. The signal reading circuit 15 further outputs a second reading signal T2 to the near-infrared pixel p4S.

Specific examples of the first transfer control pulse $G_1$, the second transfer control pulse $G_2$, and the discharge control pulse $G_D$ output from the gate driver circuit 32 of the second embodiment will be described in detail in the section of "operation/timing chart" in the subsequent stage.

Figure 11:
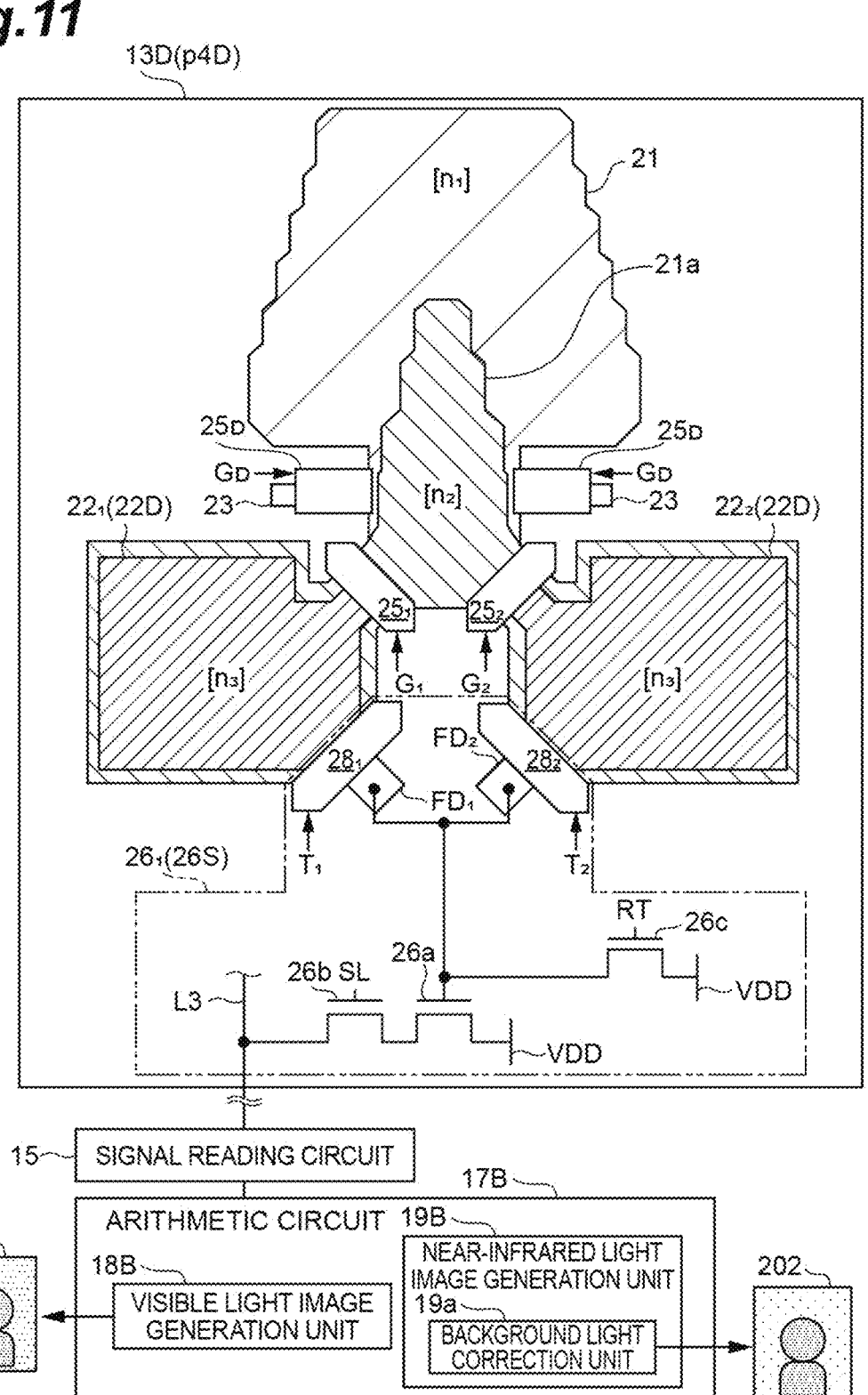
FIG. 11 is a plan view illustrating a pixel circuit unit included in a near-infrared pixel according to the second embodiment in detail.

As illustrated in FIG. 11, the first charge reading region $22_1$ is connected to the first floating diffusion region $FD_1$ via the first reading control gate $28_1$. A first input end of the detection unit 26S is connected to the first floating diffusion region $FD_1$. The second charge reading region $22_2$ also has a similar configuration. A second input end of the detection unit 26S is connected to a second floating diffusion region $FD_2$.

The first voltage detection unit $26_1$ includes the reading transistor 26a, the selection transistor 26b, and the reset transistor 26c. The first input terminal is connected to the gate of the reading transistor 26a. The first input terminal is connected to the source of the reset transistor 26c. The second input terminal is connected to the gate of the reading transistor 26a. The second input terminal is also connected to the source of the reset transistor 26c. The first charge reading region $22_1$ and the second charge reading region $22_2$ share the first voltage detection unit $26_1$.

An arithmetic circuit 17B of the second embodiment includes a visible light image generation unit 18B that generates the visible light image 201 and a near-infrared light image generation unit 19B that obtains the near-infrared light image 202. The near-infrared light image generation unit 19B includes a background light correction unit 19*a*. The background light correction unit 19*a* corrects the information based on the charge of the first charge reading region 22₁ with the information based on the charge of the second charge reading region 22₂.

For example, it is assumed that the charge of the first charge reading region 22₁ is generated in the irradiation period S11 of the irradiation pulsed light $L_P$ and the charge of the second charge reading region 22₂ is generated in the non-irradiation period S12 of the irradiation pulsed light $L_P$. The charge of the first charge reading region 22₁ includes a true component caused by the irradiation pulsed light $L_P$ and a noise component caused by the background light. The charge of the second charge reading region 22₂ includes a noise component caused by the background light. Therefore, by subtracting the information based on the charge of the second charge reading region 22₂ from the information based on the charge of the first charge reading region 22₁, a noise component caused by background light can be removed.

[Operation/Timing Chart]

Figure 12:
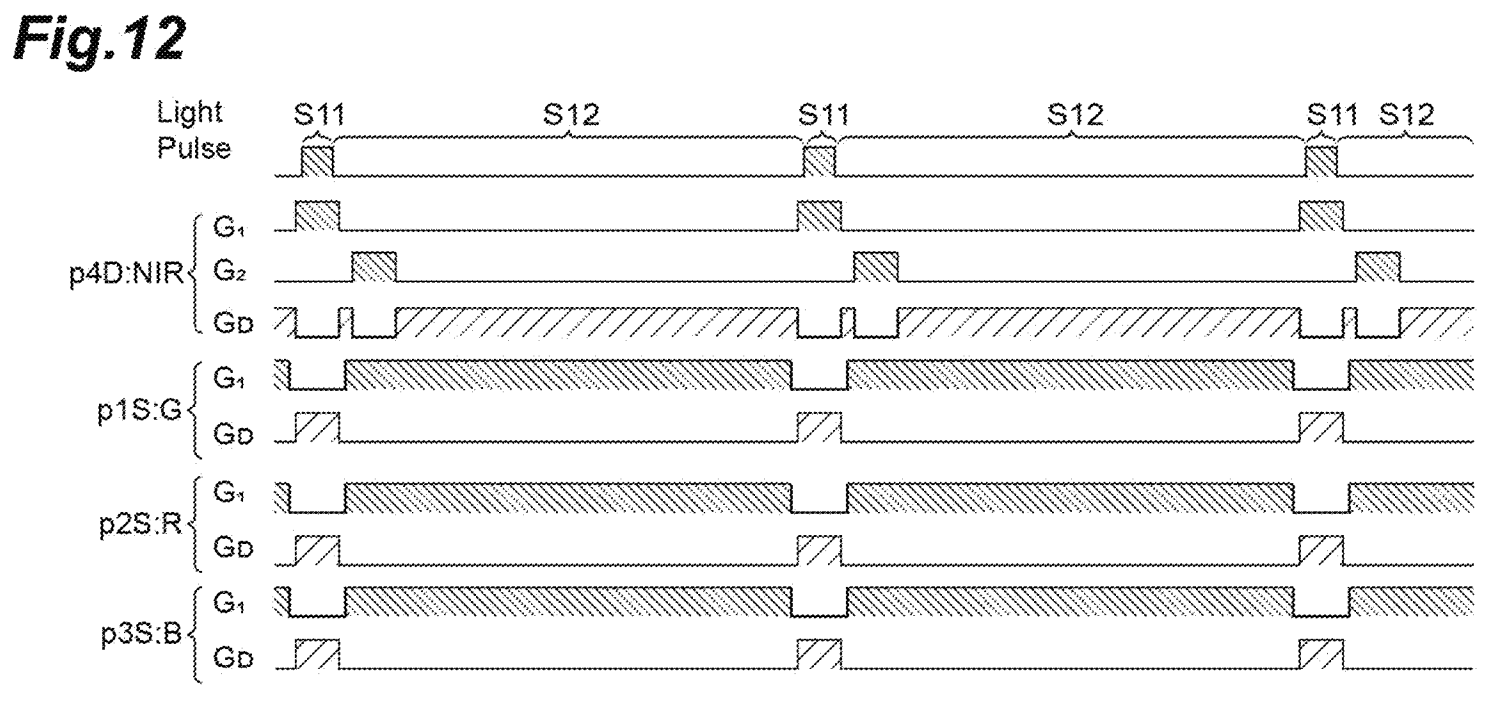

Next, the operation of the solid-state imaging device 1B will be described with reference to a timing chart illustrated in FIG. 12. Similarly to the first embodiment, in the following description, attention is particularly paid to the operation of the pixel array 12B.

The structures of the green pixel p1S, the red pixel p2S, and the blue pixel p3S of the solid-state imaging device 1B are the same as the structures of the green pixel p1S, the red pixel p2S, and the blue pixel p3S of the first embodiment. Therefore, the operations of the green pixel p1S, the red pixel p2S, and the blue pixel p3S of the solid-state imaging device 1B are the same as the operations of the green pixel p1S, the red pixel p2S, and the blue pixel p3S of the first embodiment. The first transfer control pulse $G_1$ and the discharge control pulse $G_D$ provided to the green pixel p1S, the red pixel p2S, and the blue pixel p3S illustrated in FIG. 12 are also the same as the first transfer control pulse $G_1$ and the discharge control pulse $G_D$ provided to the green pixel p1S, the red pixel p2S, and the blue pixel p3S illustrated in FIG. 8. The description of the first transfer control pulse $G_1$ and the discharge control pulse $G_D$ will be omitted.

The near-infrared pixel p4D has the first charge reading region 22₁ and the second charge reading region 22₂. Therefore, the gate driver circuit 32 outputs the first transfer control pulse $G_1$, the second transfer control pulse $G_2$, and the discharge control pulse $G_D$ to the near-infrared pixel p4D.

In the irradiation period S11, the near-infrared pixel p4D transfers a charge from the photoelectric conversion region 21 to the reading unit 22D by the following operation. Specifically, a charge is transferred from the photoelectric conversion region 21 to the first charge reading region 22₁.

Specifically, the gate driver circuit 32 prohibits discharge of a charge from the photoelectric conversion region 21 of the near-infrared pixel p4D to the charge discharging region 23. Thereafter, the gate driver circuit 32 permits transfer of a charge from the photoelectric conversion region 21 of the near-infrared pixel p4D to the first charge reading region 22₁. Thereafter, the light source driver circuit 31 starts irradiation with the irradiation pulsed light $L_P$. In other words, a starting period of a period during which the discharge control pulse $G_D$ of the near-infrared pixel p4D is low overlaps with the non-irradiation period S12. A starting period of a period during which the first transfer control pulse $G_1$ of the near-infrared pixel p4D is high also overlaps with the non-irradiation period S12.

A relationship between the timing of switching the first transfer control pulse $G_1$ and the timing of switching the discharge control pulse $G_D$ is the same as that in the first embodiment. The timing of switching the first transfer control pulse $G_1$ and the timing of switching the irradiation pulsed light $L_P$ are also the same as those in the first embodiment. The timing of switching the discharge control pulse $G_D$ and the timing of switching the irradiation pulsed light $L_P$ are also the same as those in the first embodiment. Therefore, a detailed description thereof will be omitted.

In the irradiation period S11, transfer of a charge from the photoelectric conversion region 21 to the first charge reading region 22₁ is permitted. On the other hand, in the irradiation period S11, transfer of a charge from the photoelectric conversion region 21 to the second charge reading region 22₂ is prohibited. In the irradiation period S11, the gate driver circuit 32 outputs a second transfer control pulse $G_2$(L) to the second transfer control gate 25₂ of the near-infrared pixel p4D. In the entire irradiation period S11, the signal level of the second transfer control pulse $G_2$ maintains low (L). In an entire period during which the signal level of the first transfer control pulse $G_1$ is high (H), the signal level of the second transfer control pulse $G_2$ maintains low (L). In an entire period during which the signal level of the discharge control pulse $G_D$ is low (L), the signal level of the second transfer control pulse $G_2$ maintains low (L).

In the non-irradiation period S12, the near-infrared pixel p4D executes two operations. The first operation is discharge of a charge from the photoelectric conversion region 21 to the charge discharging region 23. The second operation is transfer of a charge from the photoelectric conversion region 21 to the second charge reading region 22₂.

When the irradiation period S11 is switched to the non-irradiation period S12, the gate driver circuit 32 outputs the first transfer control pulse $G_1$(H), the second transfer control pulse $G_2$(L), and the discharge control pulse $G_D$(L) to the near-infrared pixel p4D.

After the predetermined time has elapsed, the gate driver circuit 32 outputs the first transfer control pulse $G_1$(L), the second transfer control pulse $G_2$(L), and the discharge control pulse $G_D$(H) to the near-infrared pixel p4D. The gate driver circuit 32 switches the first transfer control pulse $G_1$ from high to low. The gate driver circuit 32 maintains a signal level (L) of the second transfer control pulse $G_2$. The gate driver circuit 32 switches the discharge control pulse $G_D$ from low to high. At this time, the first operation is executed. Transfer of a charge from the photoelectric conversion region 21 to the first charge reading region 22₁ is prohibited. Transfer of a charge from the photoelectric conversion region 21 to the second charge reading region 22₂ is also prohibited. The charge is discharged from the photoelectric conversion region 21 to the charge discharging region 23.

After the predetermined time has further elapsed, the gate driver circuit 32 outputs the first transfer control pulse $G_1$(L), the second transfer control pulse $G_2$(H), and the discharge control pulse $G_D$(L) to the near-infrared pixel p4D. The gate driver circuit 32 maintains the signal level (L) of the first transfer control pulse $G_1$. The gate driver circuit 32 switches the second transfer control pulse $G_2$ from low to high. The gate driver circuit 32 switches the signal level of the discharge control pulse $G_D$ from high to low. At this time, the second operation is executed. Transfer of a charge from the photoelectric conversion region 21 to the first charge reading region 22₁ is prohibited. Transfer of a charge from the photoelectric conversion region 21 to the second charge reading region $22_2$ is permitted. Discharge of a charge from the photoelectric conversion region 21 to the charge discharging region 23 is prohibited.

The gate driver circuit 32 maintains a state of outputting the first transfer control pulse $G_1(L)$, the second transfer control pulse $G_2(H)$, and the discharge control pulse $G_D(L)$ for a predetermined time. In this state, a charge corresponding to near-infrared light not caused by the irradiation pulsed light $L_P$ is generated. The near-infrared light not caused by the irradiation pulsed light $L_P$ is background light that becomes noise. The charges accumulated in the second charge reading region $22_2$ correspond to the intensity of the background light.

After the predetermined time has further elapsed, the gate driver circuit 32 outputs the first transfer control pulse $G_1(L)$, the second transfer control pulse $G_2(L)$, and the discharge control pulse $G_D(H)$ to the near-infrared pixel p4D. At this time, the first operation is executed. Transfer of a charge from the photoelectric conversion region 21 to the first charge reading region $22_1$ is prohibited. Transfer of a charge from the photoelectric conversion region 21 to the second charge reading region $22_2$ is also prohibited. The charge is discharged from the photoelectric conversion region 21 to the charge discharging region 23.

By the above operation, the charge caused by the irradiation pulsed light $L_P$ can be accumulated in the first charge reading region $22_1$, and the charge not caused by the irradiation pulsed light $L_P$ can be accumulated in the second charge reading region $22_2$. The background light correction unit 19a of the arithmetic circuit 17B uses the charge accumulated in the second charge reading region $22_2$ to remove background noise included in the charge accumulated in the first charge reading region $22_1$.

[Operation and Effect]

In the solid-state imaging device 1B that acquires the visible light image 201 and the near-infrared light image 202 using four pixels, the near-infrared pixel p4D includes one photoelectric conversion region 21, the first charge reading region $22_1$ and the second charge reading region $22_2$, and one charge discharging region 23. The visible light pixel (green pixel p1S, red pixel p2S, and blue pixel p3S) includes one photoelectric conversion region 21, the first charge reading region $22_1$, and one charge discharging region 23. These pixels are individually driven. The near-infrared pixel p4D acquires a detection signal in which noise caused by background light is canceled with respect to near-infrared auxiliary light by lock-in. The visible light pixel (green pixel p1S, red pixel p2S, and blue pixel p3S) eliminates a detection signal by the near-infrared auxiliary light and acquires red, green, and blue signal components.

Similarly to the solid-state imaging device 1A of the first embodiment, the solid-state imaging device 1B can simultaneously capture the visible light image 201 and the near-infrared light image 202.

The solid-state imaging device 1B can obtain the near-infrared light image 202 from which background light noise has been eliminated.

Third Embodiment

The acquisition of the visible light image 201 and the measurement thereof (biometric signal measurement) may be performed in the dark or under extremely bright natural light. In this case, when the intensity of natural light is not sufficient, such as from dark to dusk, or when the intensity of light fluctuates unstably, near-infrared auxiliary light is used. On the other hand, in order to obtain a sufficiently wide dynamic range when extremely bright natural light is obtained, two charge reading regions (storage diodes) are also provided in a visible light pixel having a visible light color filter. As a result, a long-time exposure component and a short-time exposure component can be acquired.

Figure 13:
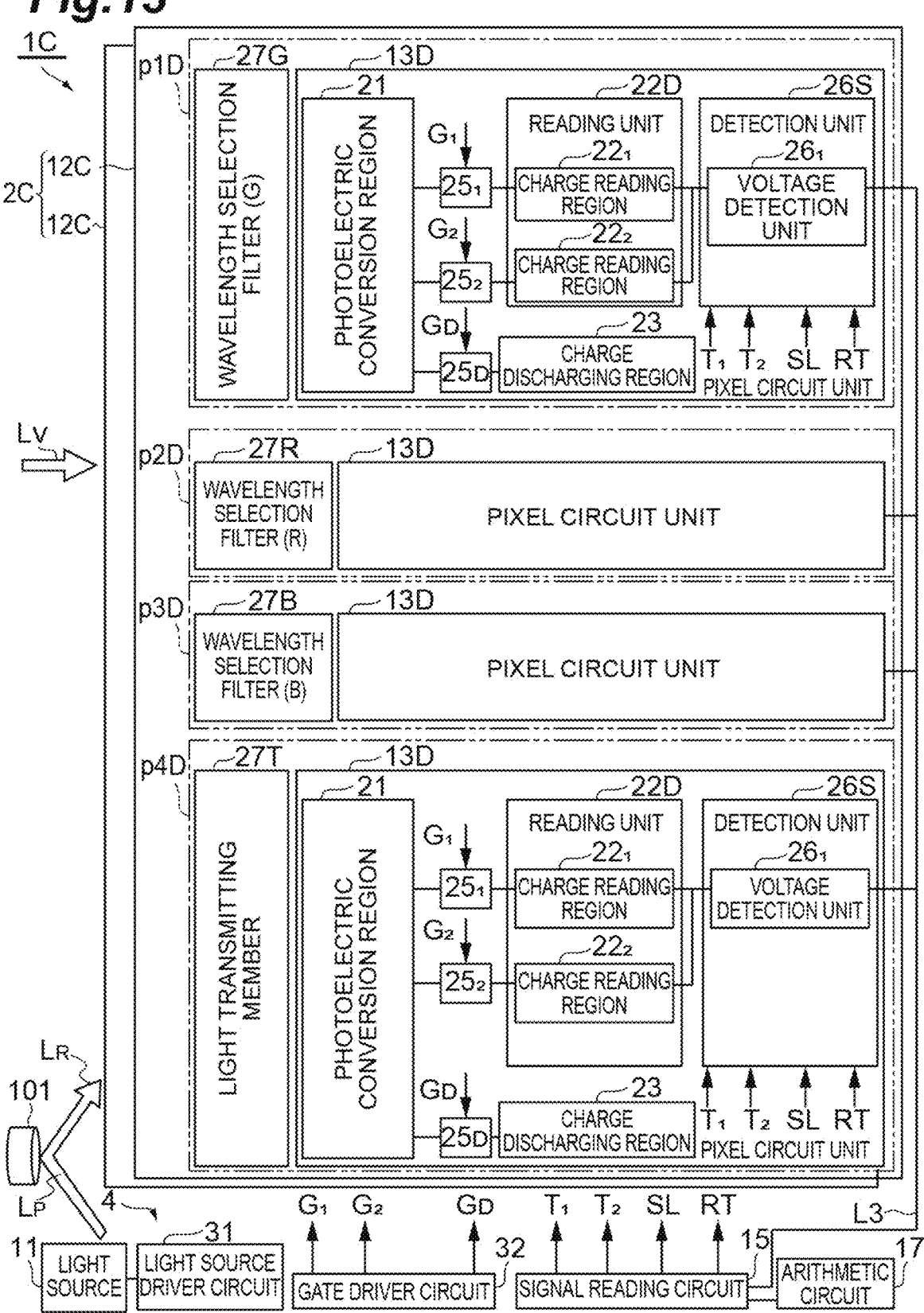
FIG. 13 is a block diagram illustrating a configuration of a solid-state imaging device according to a third embodiment in detail.

A solid-state imaging device 1C of the third embodiment illustrated in FIG. 13 simultaneously captures the visible light image 201 and the near-infrared light image 202. Similarly to the first embodiment, the S/N ratio of the visible light image 201 output from the solid-state imaging device 1C is favorable. Similarly to the second embodiment, the near-infrared light image 202 output from the solid-state imaging device 1C does not include the influence of the background light. In the solid-state imaging device 1C of the third embodiment, a dynamic range of the visible light image 201 is expanded.

As illustrated in FIG. 13, the solid-state imaging device 1C includes the light source 11, a pixel panel 2C, and the peripheral circuit 4. The pixel panel 2C includes a plurality of pixel arrays 12C. The arrangement of the plurality of pixel arrays 12C is the same as that of the first embodiment.

The near-infrared pixel p4D of the solid-state imaging device 1B of the second embodiment employs the pixel circuit unit 13D including the first charge reading region $22_1$ and the second charge reading region $22_2$. The green pixel p1S, the red pixel p2S, and the green pixel p1S of the solid-state imaging device 1B of the second embodiment adopt the pixel circuit unit 13S including the first charge reading region $22_1$.

Figure 14:
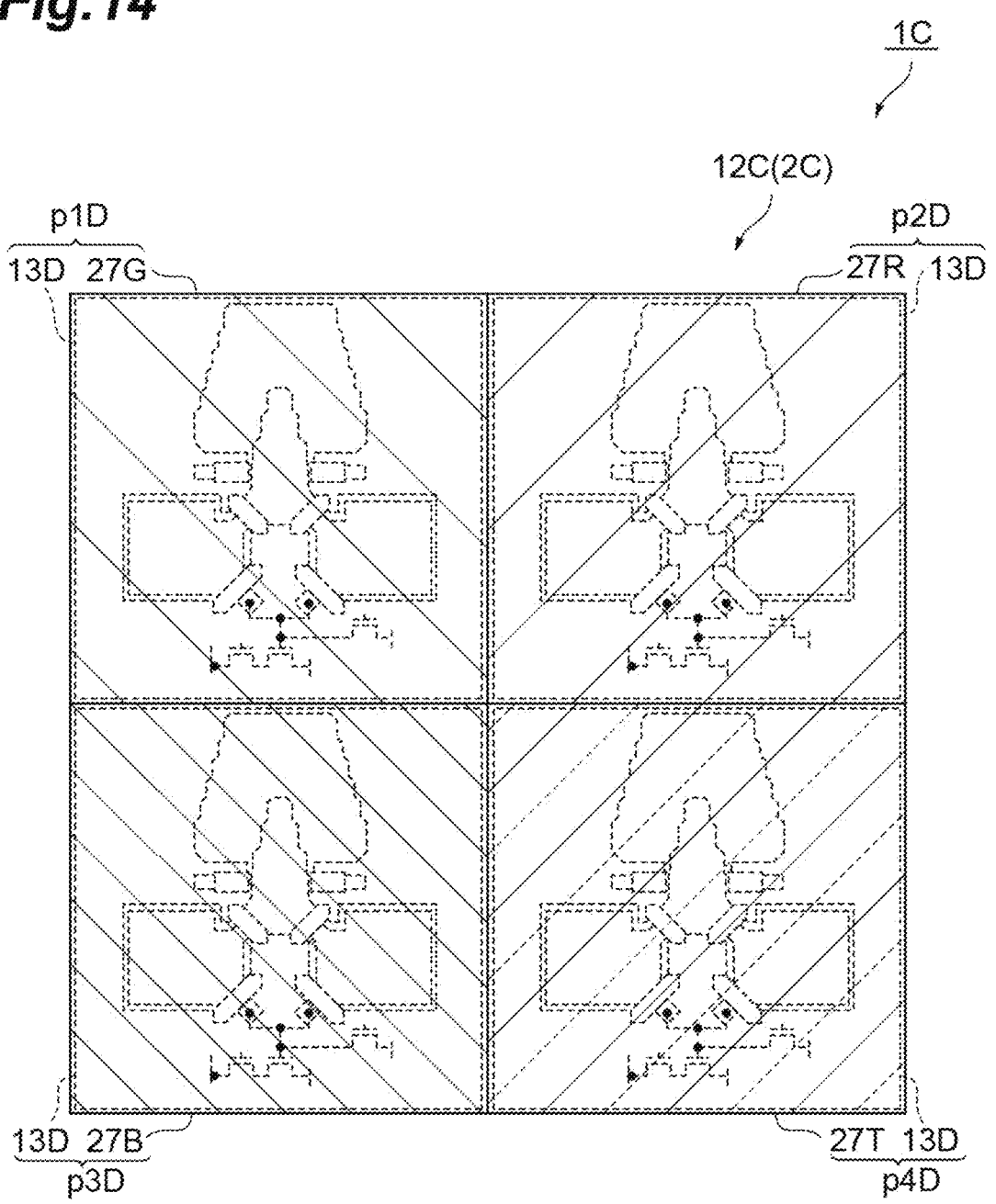
FIG. 14 is a plan view illustrating a pixel array according to the third embodiment.

As illustrated in FIG. 14, the pixel array 12C adopts the pixel circuit unit 13D including the first charge reading region $22_1$ and the second charge reading region $22_2$ also in the green pixel p1D, the red pixel p2D, and the blue pixel p3D. In the pixel array 12C of the third embodiment, the pixel circuit unit 13D including the first charge reading region $22_1$ and the second charge reading region $22_2$ is adopted in all the pixels.

Figure 15:
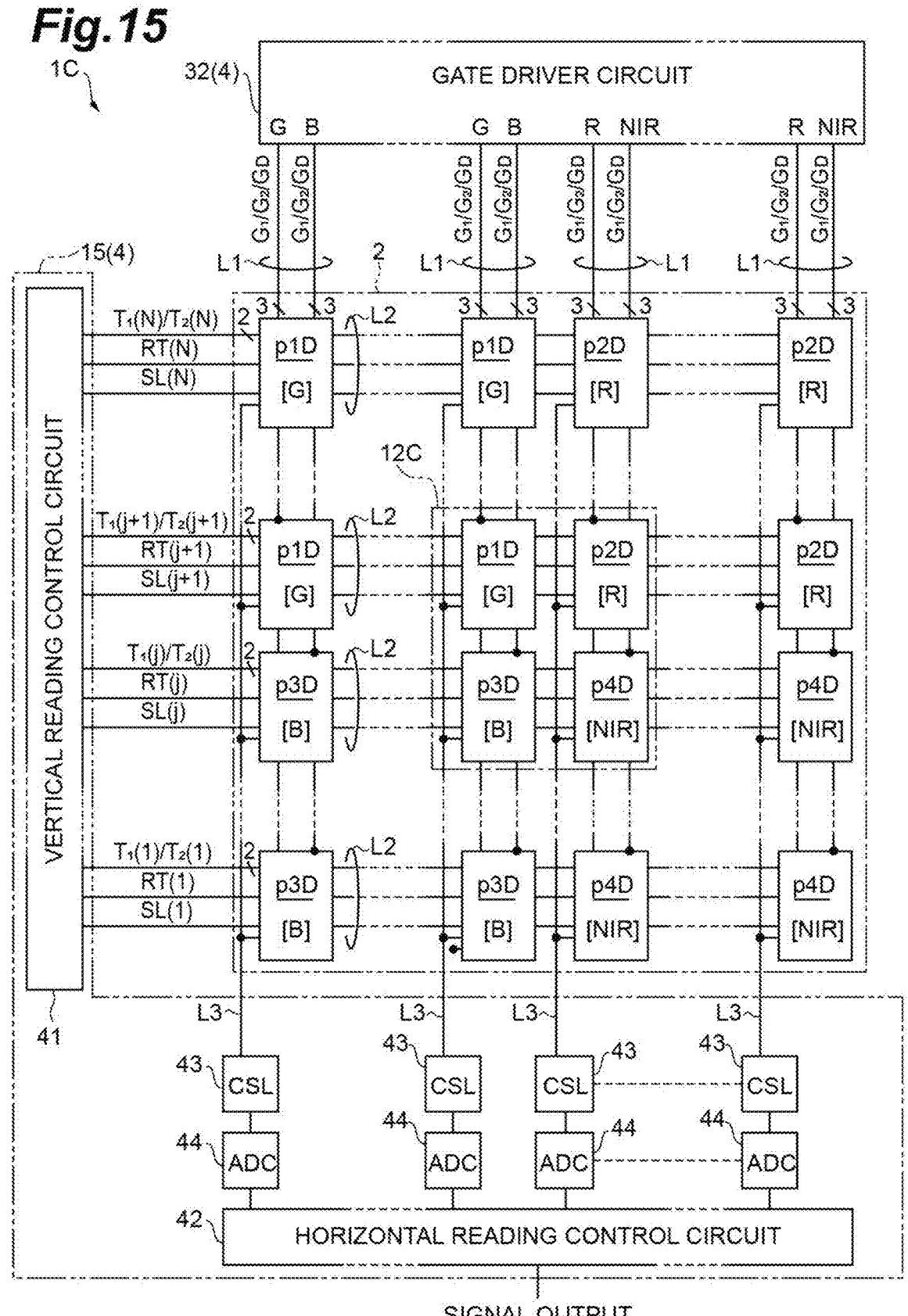
FIG. 15 is a diagram illustrating an electrical connection configuration of elements constituting the solid-state imaging device according to the third embodiment.

As illustrated in FIG. 15, the gate driver circuit 32 outputs the first transfer control pulse $G_1$, the second transfer control pulse $G_2$, and the discharge control pulse $G_D$ to the green pixel p1D, the red pixel p2D, the blue pixel p3D, and the near-infrared pixel p4D via the wiring L1. The vertical reading control circuit 41 outputs the first reading signal T1, the second reading signal T2, the reset signal RT, and the selection signal SL to the green pixel p1D, the red pixel p2D, the blue pixel p3D, and the near-infrared pixel p4D via the wiring L2.

Figure 16:
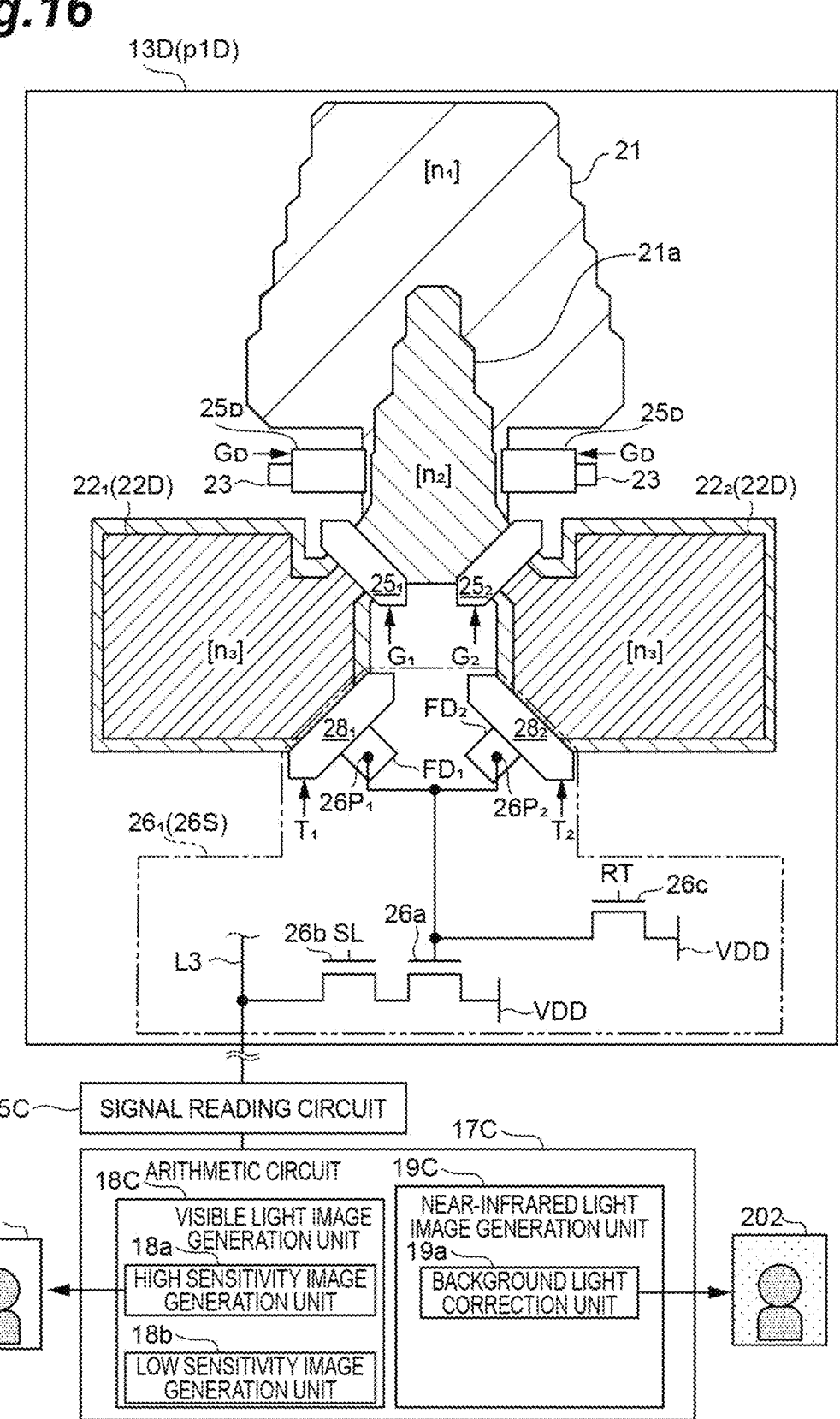
FIG. 16 is a plan view illustrating a pixel circuit unit included in a near-infrared pixel according to the third embodiment in detail.

As illustrated in FIG. 16, an arithmetic circuit 17C executes various types of processing for generating the visible light image 201 and the near-infrared light image 202 using the detection signal that is a digital value output from a signal reading circuit 15C.

The arithmetic circuit 17C of the third embodiment includes a visible light image generation unit 18C that generates the visible light image 201 and a near-infrared light image generation unit 19C that obtains the near-infrared light image 202. The visible light image generation unit 18C includes a first visible light image generation unit 18a and a second visible light image generation unit 18b. The first visible light image generation unit 18a generates the visible light image 201 based on the charges accumulated in the first charge reading region $22_1$. The second visible light image generation unit 18b generates the visible light image 201 based on the charges accumulated in the second charge reading region $22_2$. As will be described later, charges generated by long-time exposure are accumulated in the first charge reading region $22_1$. The visible light image 201 based on the charges accumulated in the first charge reading region $22_1$ is suitable in a case where the imaging subject 101 is dark. Charges generated by short-time exposure are accumulated in the second charge reading region $22_2$. The visible light image 201 based on the charges accumulated in the second charge reading region $22_2$ is suitable in a case where the imaging subject 101 is bright. Therefore, according to the visible light image generation unit 18C, a so-called dynamic range can be expanded. The near-infrared light image generation unit 19C includes a background light correction unit 19a. Therefore, similarly to the second embodiment, the near-infrared light image generation unit 19C can obtain the near-infrared light image 202 in which the background light noise is canceled.

[Operation/Timing Chart]

Figure 17:
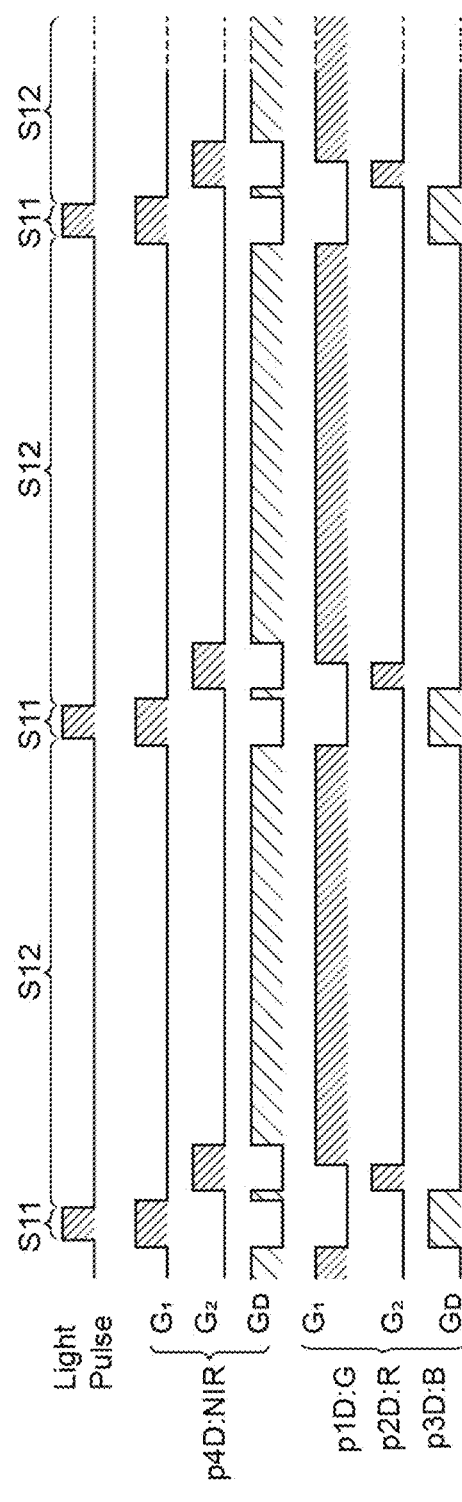
FIG. 17 is a timing chart illustrating a control pulse provided to the pixel array according to the third embodiment.

The operation of the solid-state imaging device 1C will be described with reference to a timing chart illustrated in FIG. 17. Similarly to the first embodiment, in the following description, attention is particularly paid to the operation of the pixel array 12C.

The structure of the near-infrared pixel p4D of the solid-state imaging device 1C is the same as the structure of the near-infrared pixel p4D of the second embodiment. Therefore, the operation of the near-infrared pixel p4D of the solid-state imaging device 1C is also the same as the operation of the near-infrared pixel p4D of the second embodiment. The first transfer control pulse $G_1$, the second transfer control pulse $G_2$, and the discharge control pulse $G_D$ provided to the near-infrared pixel p4D illustrated in FIG. 17 are also the same as the first transfer control pulse $G_1$, the second transfer control pulse $G_2$, and the discharge control pulse $G_D$ provided to the near-infrared pixel p4D illustrated in FIG. 12. The description of the first transfer control pulse $G_1$, the second transfer control pulse $G_2$, and the discharge control pulse $G_D$ will be omitted.

Structures of the green pixel p1D, the red pixel p2D, and the blue pixel p3D of the solid-state imaging device 1C are the same as each other. Therefore, the operations of the green pixel p1D, the red pixel p2D, and the blue pixel p3D of the solid-state imaging device 1C are also the same as each other. The operation of the green pixel p1D of the solid-state imaging device 1C will be described in detail. Detailed description of the operations of the red pixel p2D and the blue pixel p3D of the solid-state imaging device 1C will be omitted.

In the irradiation period S11, the green pixel p1D performs the following three operations. As a first operation, the green pixel p1D prohibits transfer of a charge from the photoelectric conversion region 21 to the first charge reading region $22_1$. As a second operation, the green pixel p1D also prohibits transfer of a charge from the photoelectric conversion region 21 to the second charge reading region $22_2$. As a third operation, the green pixel p1D discharges a charge from the photoelectric conversion region 21 to the charge discharging region 23. In all of the irradiation period S11, the gate driver circuit 32 maintains the first transfer control pulse $G_1$(L), the second transfer control pulse $G_2$(L), and the discharge control pulse $G_D$(H).

In the first embodiment, after transfer of a charge from the photoelectric conversion region 21 to the reading unit 22S is prohibited, discharge of a charge from the photoelectric conversion region 21 to the charge discharging region 23 is permitted. In the third embodiment, the prohibition of transfer of a charge from the photoelectric conversion region 21 to the reading unit 22D may be performed at the same time as the permission of discharge of a charge from the photoelectric conversion region 21 to the charge discharging region 23.

In the non-irradiation period S12, the green pixel p1D executes three operations. The first operation is discharge of a charge from the photoelectric conversion region 21 to the charge discharging region 23. The second operation is transfer of a charge from the photoelectric conversion region 21 to the second charge reading region $22_2$. A third operation is transfer of a charge from the photoelectric conversion region 21 to the first charge reading region $22_1$.

When the irradiation period S11 is switched to the non-irradiation period S12, the gate driver circuit 32 outputs the first transfer control pulse $G_1$(L), the second transfer control pulse $G_2$(L), and the discharge control pulse $G_D$(H) to the green pixel p1D. The signal level output in the irradiation period S11 is maintained. At this time, the first operation is executed. Transfer of a charge from the photoelectric conversion region 21 to the first charge reading region $22_1$ is prohibited. Transfer of a charge from the photoelectric conversion region 21 to the second charge reading region $22_2$ is also prohibited. The charge is discharged from the photoelectric conversion region 21 to the charge discharging region 23.

After switching from the irradiation period S11 to the non-irradiation period S12, a period during which the first transfer control pulse $G_1$(L), the second transfer control pulse $G_2$(L), and the discharge control pulse $G_D$(H) are output to the green pixel p1D overlaps with a period during which a charge is transferred from the photoelectric conversion region 21 to the first charge reading region $22_1$ in the near-infrared pixel p4D. This period also overlaps with a period during which a charge is transferred from the photoelectric conversion region 21 to the charge discharging region 23.

After the predetermined time has elapsed, the gate driver circuit 32 outputs the first transfer control pulse $G_1$(L), the second transfer control pulse $G_2$(H), and the discharge control pulse $G_D$(L) to the green pixel p1D. The gate driver circuit 32 maintains the signal level of the first transfer control pulse $G_1$. The gate driver circuit 32 switches the second transfer control pulse $G_2$ from low to high. The gate driver circuit 32 switches the discharge control pulse $G_D$ from high to low. At this time, the second operation is executed. Transfer of a charge from the photoelectric conversion region 21 to the first charge reading region $22_1$ is prohibited. Transfer of a charge from the photoelectric conversion region 21 to the second charge reading region $22_2$ is permitted. Discharge of a charge from the photoelectric conversion region 21 to the charge discharging region 23 is prohibited.

A timing at which the second transfer control pulse $G_2$ is switched from low to high may coincide with a timing at which the second transfer control pulse $G_2$ output to the near-infrared pixel p4D is switched from low to high. Similarly, a timing at which the second transfer control pulse $G_2$ is switched from low to high may coincide with a timing at which the discharge control pulse $G_D$ output to the near-infrared pixel p4D is switched from high to low.

The gate driver circuit 32 maintains a state of outputting the first transfer control pulse $G_1$(L), the second transfer control pulse $G_2$(H), and the discharge control pulse $G_D$(L) for a predetermined time. This time is a second exposure time for the second charge reading region $22_2$. The second exposure time is shorter than a first exposure time to be described later. The second exposure time is shorter than a second exposure time for the second charge reading region $22_2$ of the near-infrared pixel p4D.

After the predetermined time has further elapsed, the gate driver circuit 32 outputs the first transfer control pulse $G_1$(H), the second transfer control pulse $G_2$(L), and the discharge control pulse $G_D$(L) to the green pixel p1D. The gate driver circuit 32 switches the first transfer control pulse $G_1$ from low to high. The gate driver circuit 32 switches the second transfer control pulse $G_2$ from high to low. The gate driver circuit 32 maintains the signal level (L) of the discharge control pulse $G_D$. At this time, the third operation is executed. Transfer of a charge from the photoelectric conversion region 21 to the first charge reading region $22_1$ is permitted. Transfer of a charge from the photoelectric conversion region 21 to the second charge reading region $22_2$ is prohibited. Discharge of a charge from the photoelectric conversion region 21 to the charge discharging region 23 is prohibited.

The timing of switching the first transfer control pulse $G_1$ may be the same timing as the timing of switching the second transfer control pulse $G_2$.

When the first transfer control pulse $G_1$ is switched, the second transfer control pulse $G_2$ of the near-infrared pixel p4D maintains the signal level (H). Similarly, when the first transfer control pulse $G_1$ is switched, the discharge control pulse $G_D$ of the near-infrared pixel p4D also maintains the signal level (L). When a predetermined time elapses after the first transfer control pulse $G_1$ is switched, the second transfer control pulse $G_2$ of the near-infrared pixel p4D is switched from high to low. Similarly, the discharge control pulse $G_D$ of the near-infrared pixel p4D switches from low to high.

[Operation and Effect]

In the solid-state imaging device 1C that acquires the visible light image 201 and the near-infrared light image 202 using four pixels, all the pixels include one photoelectric conversion region 21, the first charge reading region $22_1$ and the second charge reading region $22_2$, and one charge discharging region 23. These are driven individually. The near-infrared pixel p4D acquires a detection signal in which noise caused by background light is canceled with respect to near-infrared auxiliary light by lock-in. In the visible light pixel (green pixel p1D, red pixel p2D, blue pixel p3D), control is performed so that charges are transmitted to the first charge reading region $22_1$ and the second charge reading region $22_2$ at different times. As a result, red, green, and blue signal components with a wide dynamic range are acquired.

Similarly to the solid-state imaging device 1A of the first embodiment, the solid-state imaging device 1C can simultaneously capture the visible light image 201 and the near-infrared light image 202.

Similarly to the solid-state imaging device 1B of the second embodiment, the solid-state imaging device 1C can obtain the near-infrared light image 202 from which background light noise has been removed.

The solid-state imaging device 1C can expand the dynamic range of the visible light image 201.

Fourth Embodiment

Figure 18:
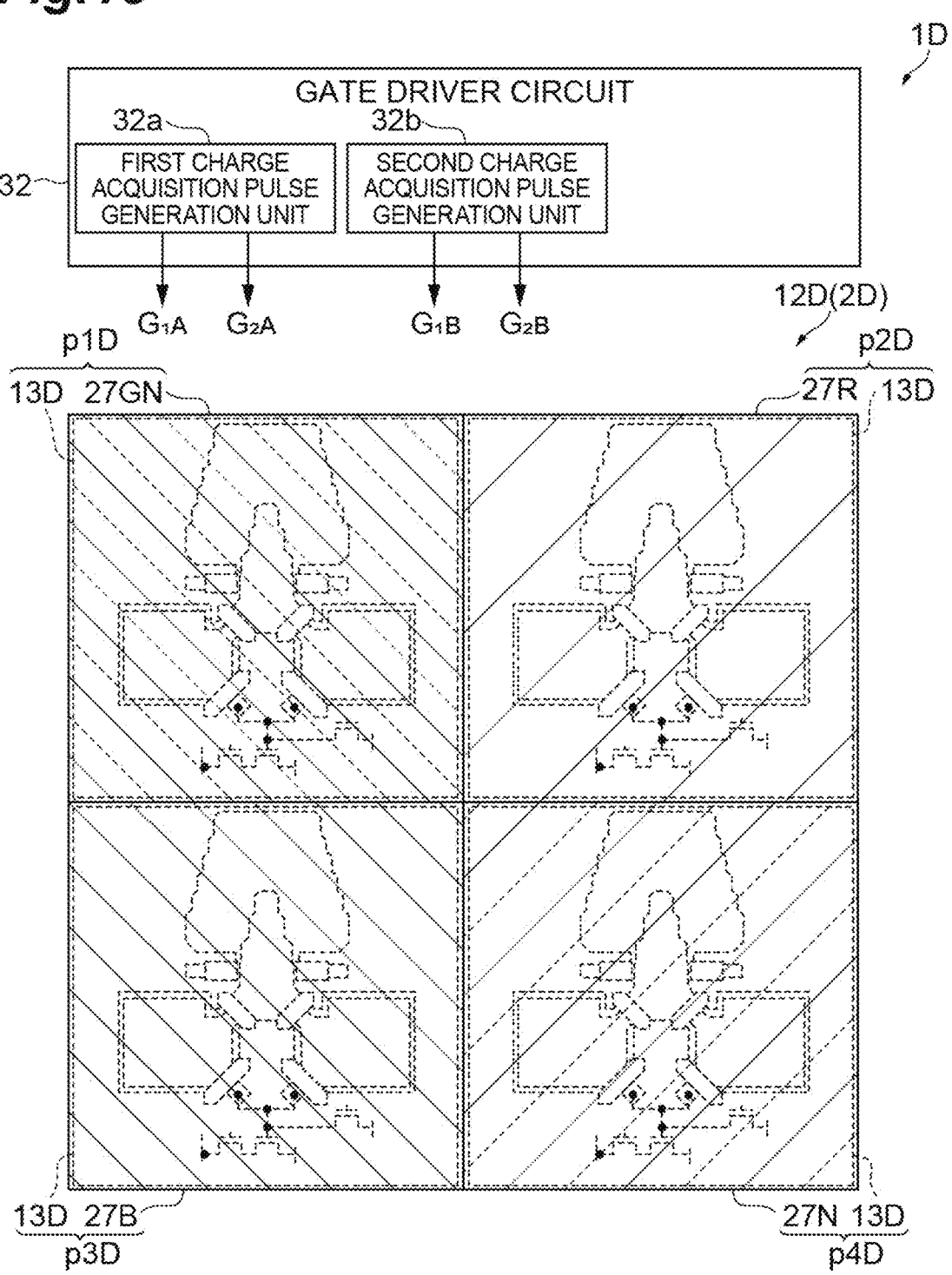
FIG. 18 is a plan view illustrating a pixel array according to a fourth embodiment.

A solid-state imaging device 1D of a fourth embodiment illustrated in FIG. 18 simultaneously captures the visible light image 201 and the near-infrared light image 202. Similarly to the first embodiment, the S/N ratio of the visible light image 201 output from the solid-state imaging device 1D is favorable. Similarly to the second embodiment, the near-infrared light image 202 output from the solid-state imaging device 1D does not include the influence of the background light. As in the third embodiment, the dynamic range of the visible light image 201 is expanded.

A physical configuration of the solid-state imaging device 1D of the fourth embodiment is the same as that of the solid-state imaging device 1C of the third embodiment. The operation of the solid-state imaging device 1D is different from that of the solid-state imaging device 1C of the third embodiment. The green pixel p1D of the solid-state imaging device 1D executes an operation of obtaining a charge based on near-infrared light (a second charge acquisition operation) in addition to an operation of obtaining a charge based on a green component of visible light (a first charge acquisition operation).

The gate driver circuit 32 switches between the first charge acquisition operation and the second charge acquisition operation. The first charge acquisition operation and the second charge acquisition operation are mutually switched by the first transfer control pulse $G_1$ and the second transfer control pulse $G_2$ output from the gate driver circuit 32. As illustrated in FIG. 18, the gate driver circuit 32 may include a first charge acquisition pulse generation unit 32a and a second charge acquisition pulse generation unit 32b. The first charge acquisition pulse generation unit 32a outputs a first transfer control pulse $G_{1A}$ and a second transfer control pulse $G_{2A}$ for the first charge acquisition operation. The second charge acquisition pulse generation unit 32b outputs a first transfer control pulse $G_{1B}$ and a second transfer control pulse $G_{2B}$ for the second charge acquisition operation.

The red pixel p2D, the blue pixel p3D, and the near-infrared pixel p4D of the fourth embodiment execute the same operations as those of the third embodiment.

[Operation/Timing Chart]

Figure 19:
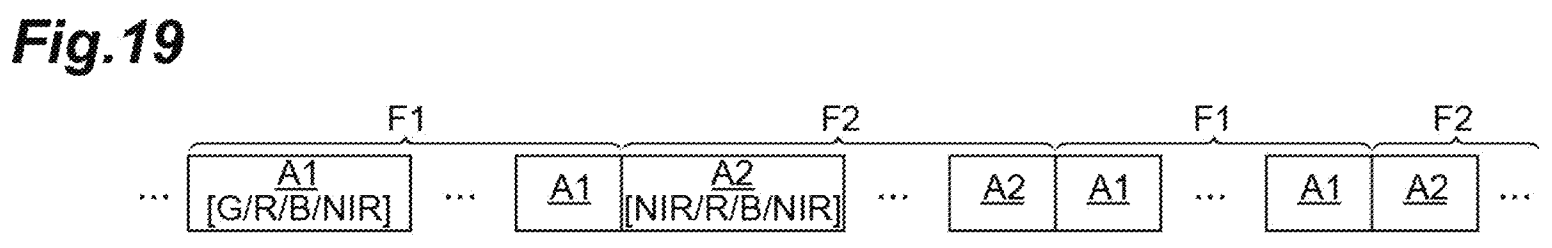

FIG. 19 is a diagram conceptually illustrating the operation of the solid-state imaging device 1D. As illustrated in FIG. 19, the solid-state imaging device 1D repeatedly executes a first charge acquisition operation A1 in a first frame F1. In the first charge acquisition operation A1, the green pixel p1D obtains a charge based on the green component of visible light. Therefore, in the first frame F1, the visible light image 201 and the near-infrared light image 202 can be simultaneously obtained.

The solid-state imaging device 1D repeatedly executes a second charge acquisition operation A2 in a second frame F2. In the second charge acquisition operation A2, the green pixel p1D obtains a charge based on near-infrared light. Therefore, in the second frame F2, the near-infrared light image 202 can be obtained. The near-infrared light image 202 obtained in the second frame F2 is based on the charges obtained from the two pixels.

Figure 20:
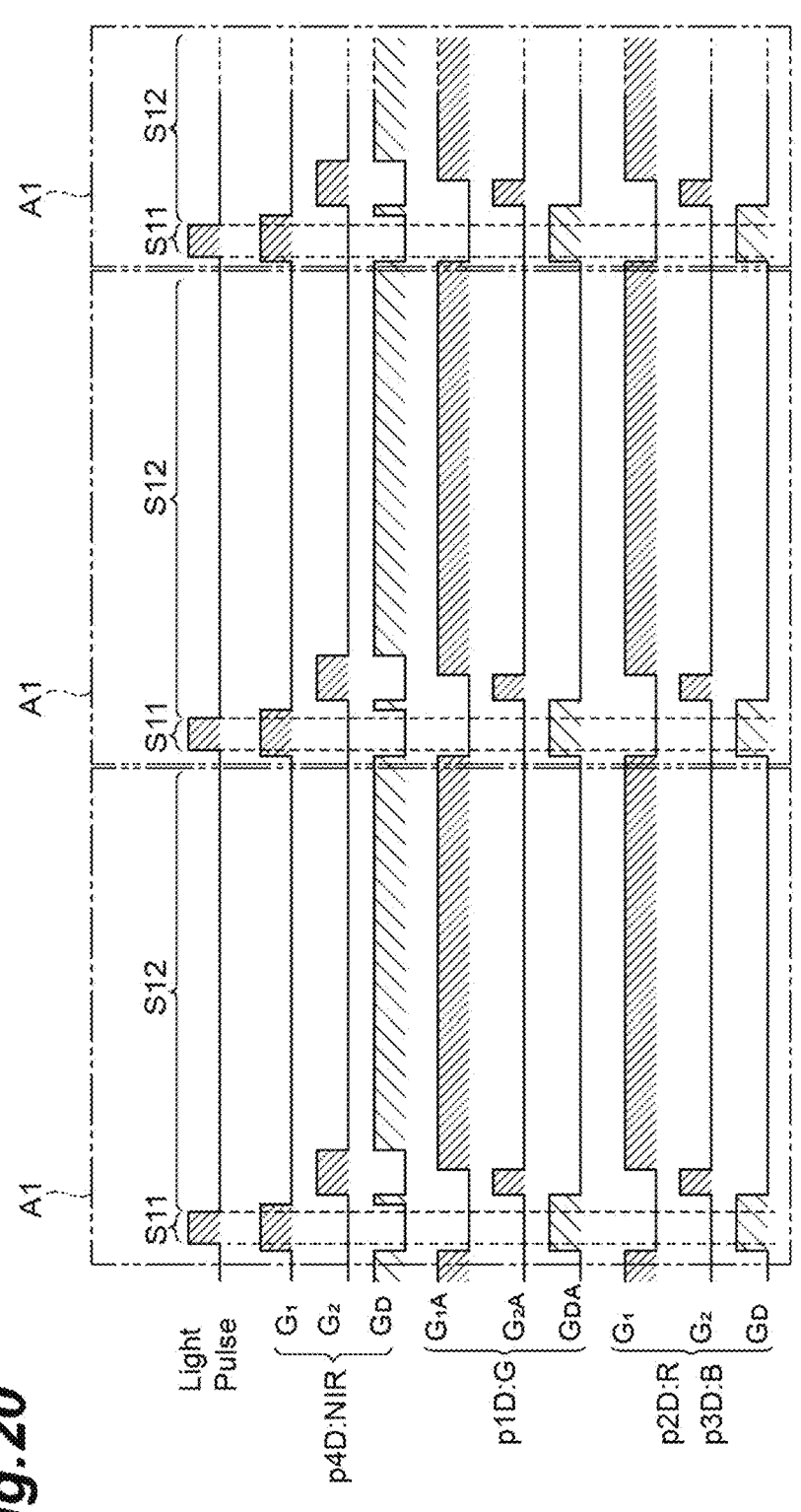
FIG. 20 is a timing chart illustrating a control pulse provided to the pixel array according to the fourth embodiment.

FIG. 20 illustrates pulses output from the gate driver circuit 32 for the first charge acquisition operation A1. The first charge acquisition operation A1 is the same as the operation of the solid-state imaging device 1C of the third embodiment illustrated in FIG. 17. The gate driver circuit 32 outputs the first transfer control pulse $G_{1A}$, the second transfer control pulse $G_{2A}$, and a discharge control pulse $G_{DA}$ illustrated in FIG. 20 to the green pixel p1D.

Figure 21:
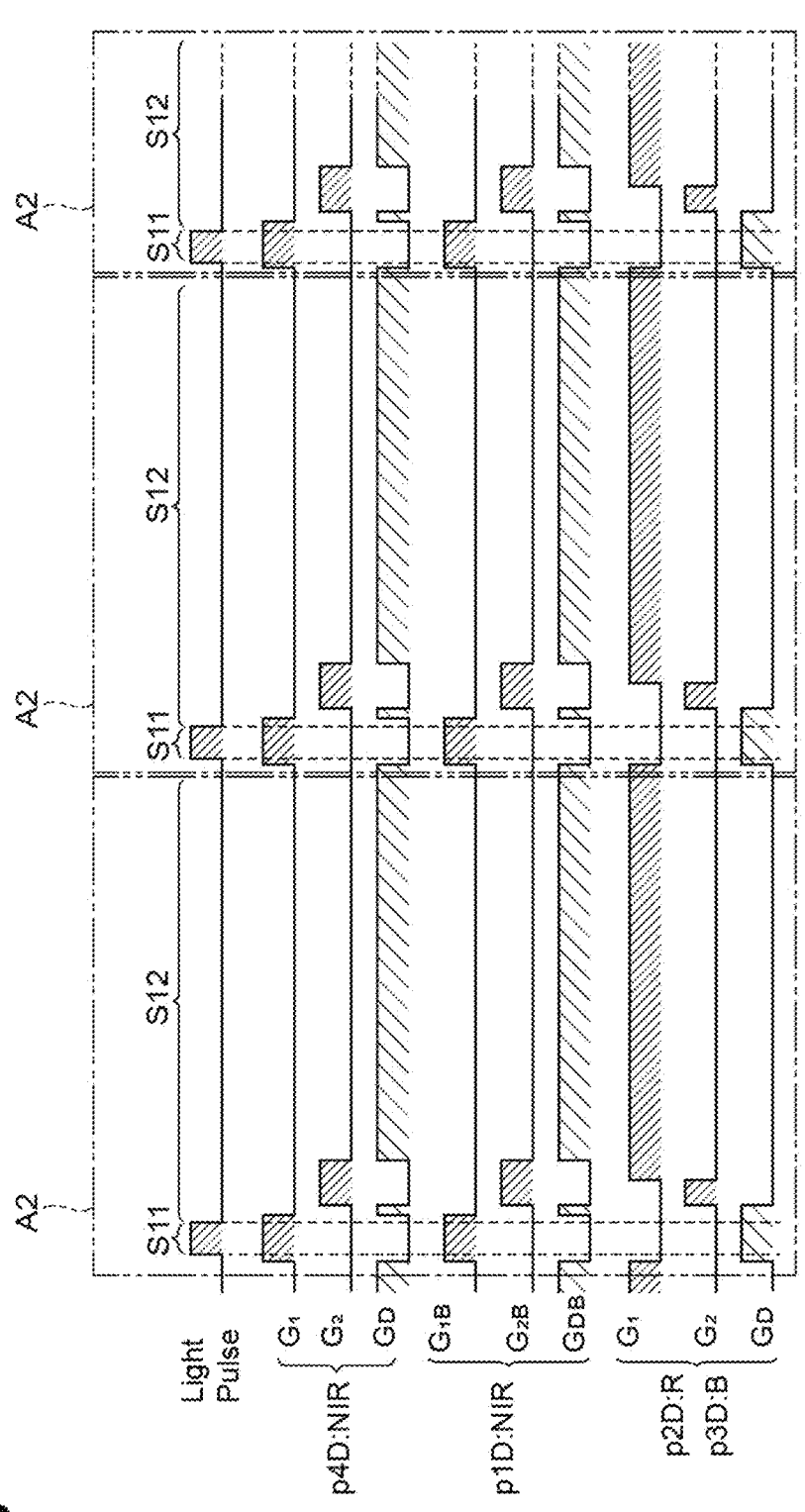
FIG. 21 is a timing chart illustrating another control pulse provided to the pixel array according to the fourth embodiment.

FIG. 21 illustrates pulses output from the gate driver circuit 32 for the second charge acquisition operation A2. In the second charge acquisition operation A2, the gate driver circuit 32 outputs the same pulse as that in the first charge acquisition operation A1 to the red pixel p2D, the blue pixel p3D, and the near-infrared pixel p4D. In the second charge acquisition operation A2, the gate driver circuit 32 outputs a pulse different from that in the first charge acquisition operation A1 to the green pixel p1D. The gate driver circuit 32 outputs the first transfer control pulse $G_{1B}$, the second transfer control pulse $G_{2B}$, and a discharge control pulse $G_{DB}$ illustrated in FIG. 20 to the green pixel p1D. The first transfer control pulse $G_{1B}$, the second transfer control pulse $G_{2B}$, and the discharge control pulse $G_{DB}$ are the same as the pulses output to the near-infrared pixel p4D.

[Operation and Effect]

In a solid-state imaging device 1D that acquires the visible light image 201 and the near-infrared light image 202 using four pixels, the four pixels are separately driven. The near-infrared pixel p4D performs control so as to acquire a detection signal in which noise caused by the background light is canceled with respect to the near-infrared auxiliary light by lock-in. The visible light pixel performs control so as to send charges to the first charge reading region $22_1$ and the second charge reading region $22_2$ at different times. The visible light pixel acquires red, green, and blue signal components with a wide dynamic range (WDR). Among the four pixels, in some pixels (for example, the green pixel p1D), a first function of acquiring a near-infrared signal by lock-in and a second function of acquiring red, green, and blue signals in a wide dynamic range are selected and used.

Similarly to the solid-state imaging device 1A of the first embodiment, the solid-state imaging device 1D can simultaneously capture the visible light image 201 and the near-infrared light image 202.

Similarly to the solid-state imaging device 1B of the second embodiment, the solid-state imaging device 1D can obtain the near-infrared light image 202 from which background light noise has been removed.

The solid-state imaging device 1D can expand the dynamic range of the visible light image 201.

The solid-state imaging device 1D can obtain the near-infrared light image 202 by the first charge acquisition operation A1 and obtain the near-infrared light image 202 by the second charge acquisition operation A2.

Fifth Embodiment

Figure 22:
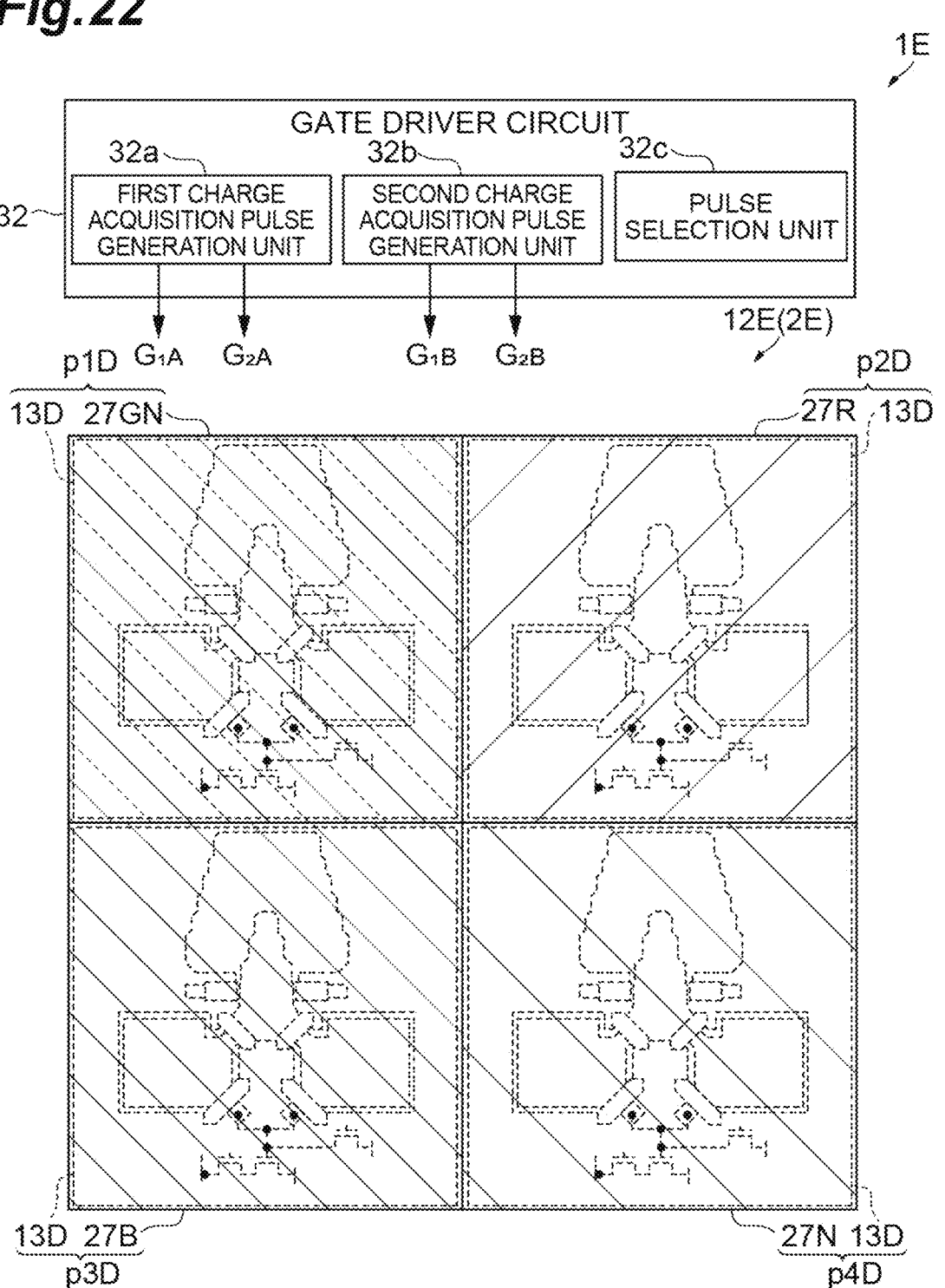
FIG. 22 is a plan view illustrating a pixel array according to a fifth embodiment.

A solid-state imaging device 1E of a fifth embodiment illustrated in FIG. 22 simultaneously captures the visible light image 201 and the near-infrared light image 202. Similarly to the first embodiment, the S/N ratio of the visible light image 201 output from the solid-state imaging device 1E is favorable. Similarly to the second embodiment, the near-infrared light image 202 output from the solid-state imaging device 1E does not include the influence of the background light. As in the third embodiment, the dynamic range of the visible light image is expanded.

A physical configuration of the solid-state imaging device 1E of the fifth embodiment is the same as that of the solid-state imaging device 1C of the third embodiment. On the other hand, the operation of the solid-state imaging device 1E is different from that of the solid-state imaging device 1C of the third embodiment. Similarly to the fourth embodiment, the solid-state imaging device 1E of the fifth embodiment has a function of switching between an operation (first charge acquisition operation) in which the green pixel p1D obtains a charge based on visible light and an operation (second charge acquisition operation) in which the green pixel p1D obtains a charge based on near-infrared light.

In the solid-state imaging device 1E of the fifth embodiment, similarly to the green pixel p1D, the red pixel p2D and the blue pixel p3D also have a function of switching between an operation of obtaining a charge based on visible light and an operation of obtaining a charge based on near-infrared light. In the solid-state imaging device 1E of the fifth embodiment, the near-infrared pixel p4D also has a function of switching between an operation of obtaining a charge based on visible light (first charge acquisition operation) and an operation of obtaining a charge based on near-infrared light (second charge acquisition operation).

Similarly to the fourth embodiment, the gate driver circuit 32 switches between the first charge acquisition operation and the second charge acquisition operation. The gate driver circuit 32 may include the first charge acquisition pulse generation unit 32a and the second charge acquisition pulse generation unit 32b. The first charge acquisition pulse generation unit 32a outputs the first transfer control pulse $G_{1A}$ and the second transfer control pulse $G_{2A}$ for the first charge acquisition operation. The second charge acquisition pulse generation unit 32b outputs the first transfer control pulse $G_{1B}$ and the second transfer control pulse $G_{2B}$ for the second charge acquisition operation. The gate driver circuit 32 may include a pulse selection unit 32c. The pulse selection unit 32c selects which one of the first transfer control pulse $G_{1A}$ and the second transfer control pulse $G_{2A}$ for the first charge acquisition operation or the first transfer control pulse $G_{1B}$ and the second transfer control pulse $G_{2B}$ for the second charge acquisition operation is output to each pixel.

According to the pulse selection unit 32c, the charge acquired by each pixel can take any one of the following sets. For example, an alphabet (G) shown in parentheses indicates obtaining a charge based on the green component of visible light. Similarly, an alphabet (R) corresponds to the red component and an alphabet (B) corresponds to the blue component. An alphabet (N) corresponds to near-infrared light.

First set: green pixel p1D(G): red pixel p2D(R): blue pixel p3D(B): near-infrared pixel p4D(N)

Second set: green pixel p1D(N): red pixel p2D(R): blue pixel p3D(B): near-infrared pixel p4D(G)

Third set: green pixel p1D(G): red pixel p2D(N): blue pixel p3D(B): near-infrared pixel p4D(G)

Fourth set: green pixel p1D(G): red pixel p2D(R): blue pixel p3D(N): near-infrared pixel p4D(G)

Fifth set: green pixel p1D(G): red pixel p2D(R): blue pixel p3D(B): near-infrared pixel p4D(G)

Sixth set: green pixel p1D(N): red pixel p2D(N): blue pixel p3D(N): near-infrared pixel p4D(N)

For example, the first set, the second set, the third set, and the fourth set obtain charges caused by near-infrared light in at least one pixel among the four pixels. When the operation for these sets is executed, the effect of the operation of discharging the charges generated in the green pixel p1D, the red pixel p2D, and the blue pixel p3D to the charge discharging region 23 during the irradiation operation of the irradiation pulsed light $L_P$ is exerted. The first set is the same as the first charge acquisition operation A1 in the fourth embodiment. The second set is the same as the second charge acquisition operation A2 in the fourth embodiment.

In the fifth set, charges due to visible light are obtained in all four pixels. In the fifth set, no charge due to near-infrared light is acquired. In the sixth set, charges due to near-infrared light are obtained in all four pixels. In the sixth set, no charge due to visible light is acquired.

[Operation/Timing Chart]

Figure 23:
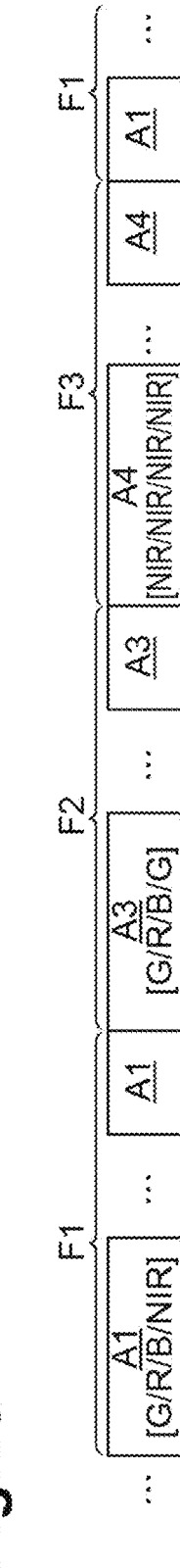
FIG. 23 is a diagram illustrating an operation of a solid-state imaging device according to the fifth embodiment.

FIG. 23 is a diagram conceptually illustrating an example of the operation of the solid-state imaging device 1E. As illustrated in FIG. 23, the solid-state imaging device 1E repeatedly executes the first charge acquisition operation A1 in the first frame F1. In the first charge acquisition operation A1, each pixel acquires the charge shown in the first set.

Therefore, in the first frame F1, the visible light image 201 and the near-infrared light image 202 can be simultaneously obtained.

The solid-state imaging device 1E repeatedly executes an operation corresponding to the fifth set in the second frame F2. The operation corresponding to the fifth set is referred to as a third charge acquisition operation A3. The solid-state imaging device 1E repeatedly executes the third charge acquisition operation A3 in the second frame F2. Therefore, in the second frame F2, the visible light image 201 can be obtained.

The solid-state imaging device 1E repeatedly executes an operation corresponding to the sixth set in the third frame F3. The operation corresponding to the sixth set is referred to as a fourth charge acquisition operation A4. In the third frame F3, the solid-state imaging device 1E repeatedly executes the fourth charge acquisition operation A4. Therefore, in the third frame F3, the near-infrared light image 202 can be obtained.

Figure 24:
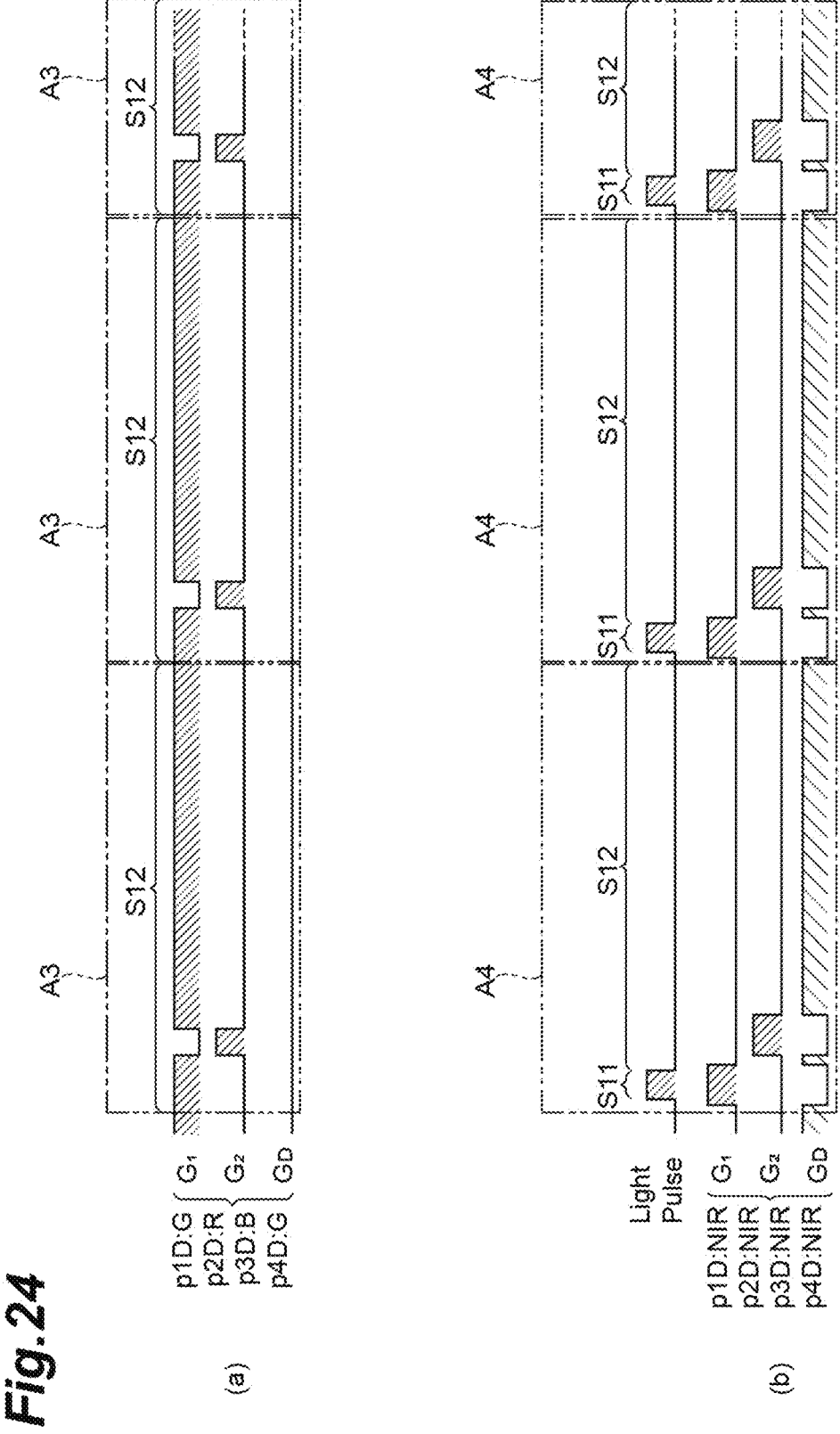
FIG. 24(*a*) is a timing chart illustrating a control pulse provided to the pixel array according to the fifth embodiment.

FIG. 24(*a*) illustrates a pulse output from the gate driver circuit 32 for the third charge acquisition operation A3. The pulse output from the gate driver circuit 32 in the third charge acquisition operation A3 is the same as the pulse output to the green pixel p1D or the like in the operation of the fourth embodiment illustrated in FIG. 20. In the third charge acquisition operation A3, since the charge caused by the near-infrared light is not acquired, the light source 11 does not emit the irradiation pulsed light $L_P$.

FIG. 24(*b*) illustrates a pulse output by the gate driver circuit 32 for the fourth charge acquisition operation A4. The pulse output from the gate driver circuit 32 in the fourth charge acquisition operation A4 is the same as the pulse output to the near-infrared pixel p4D in the operation of the fourth embodiment illustrated in FIG. 20.

[Operation and Effect]

In the solid-state imaging device 1E that acquires the visible light image 201 and the near-infrared light image 202 using the four pixels, the four pixels are separately driven. The near-infrared pixel p4D performs control so as to acquire a detection signal in which noise caused by the background light is canceled with respect to the near-infrared auxiliary light by lock-in. The visible light pixel performs control so as to send charges to the first charge reading region $22_1$ and the second charge reading region $22_2$ at different times. The visible light pixel acquires red, green, and blue signal components of a wide dynamic range (WDR). For all the pixels of the four pixels, a first function of acquiring a near-infrared signal by lock-in and a second function of acquiring red, green, and blue signals in a wide dynamic range are selected and used.

Similarly to the solid-state imaging device 1A of the first embodiment, the solid-state imaging device 1E can simultaneously capture the visible light image 201 and the near-infrared light image 202.

Similarly to the solid-state imaging device 1B of the second embodiment, the solid-state imaging device 1E can obtain the near-infrared light image 202 from which background light noise has been removed.

The solid-state imaging device 1E can expand the dynamic range of the visible light image 201.

Modification of Fifth Embodiment

Figure 25:
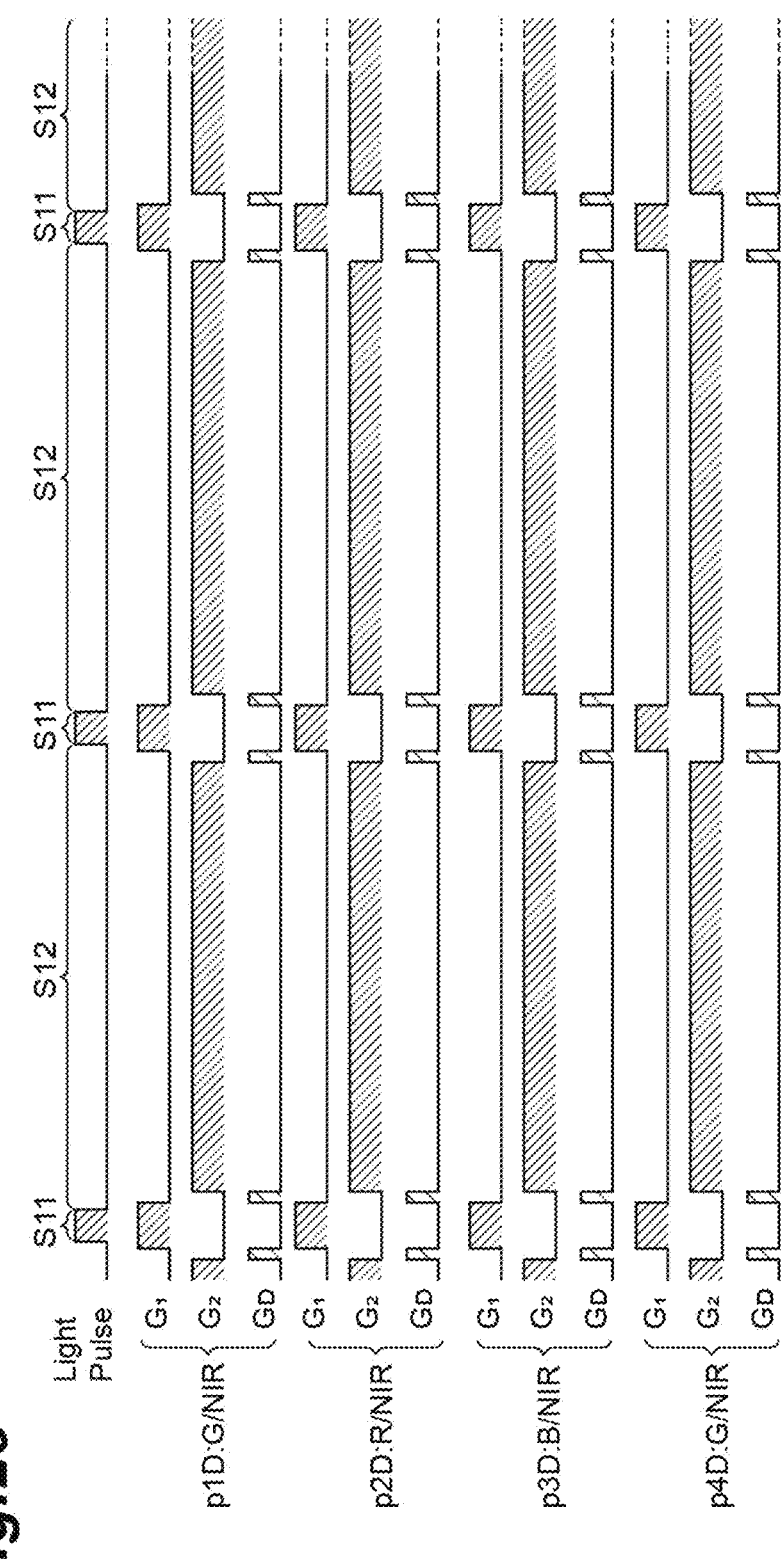
FIG. 25 is a timing chart illustrating another control pulse provided to the pixel array according to the fifth embodiment.

The solid-state imaging device 1E of the fifth embodiment can also execute an operation illustrated in a timing chart of FIG. 25. According to the operation illustrated in FIG. 25, the visible light image 201 and the near-infrared light image

202 can be obtained in one frame. In the operation illustrated in the timing chart of FIG. 25, for each pixel, charges due to near-infrared light are accumulated in the first charge reading region $22_1$ a plurality of times, and charges due to visible light are accumulated in the second charge reading region $22_2$ a plurality of times. The first transfer control pulse $G_1$, the second transfer control pulse $G_2$, and the discharge control pulse $G_D$ output from the gate driver circuit 32 to each pixel are the same. Therefore, the pulse output to the green pixel p1D will be described as an example.

At a certain timing before an irradiation period S11, the gate driver circuit 32 outputs the first transfer control pulse $G_1(L)$, the second transfer control pulse $G_2(H)$, and the discharge control pulse $G_D(L)$ to the green pixel p1D.

After a predetermined time has elapsed from a certain timing before the irradiation period S11, the gate driver circuit 32 outputs the first transfer control pulse $G_1(L)$, the second transfer control pulse $G_2(L)$, and the discharge control pulse $G_D(H)$ to the green pixel p1D. The gate driver circuit 32 switches the discharge control pulse $G_D$ from low to high.

In the period before the irradiation period S11, after the predetermined time has further elapsed, the gate driver circuit 32 outputs the first transfer control pulse $G_1(H)$, the second transfer control pulse $G_2(L)$, and the discharge control pulse $G_D(L)$ to the green pixel p1D. The gate driver circuit 32 switches the first transfer control pulse $G_1$ from low to high. The gate driver circuit 32 switches the discharge control pulse $G_D$ from high to low. The timing of switching the first transfer control pulse $G_1$ may be the same timing as the timing of switching the discharge control pulse $G_D$.

After the predetermined time has further elapsed, the emission of the irradiation pulsed light $L_P$ starts. In the entire irradiation period S11, the gate driver circuit 32 outputs the first transfer control pulse $G_1(H)$, the second transfer control pulse $G_2(L)$, and the discharge control pulse $G_D(L)$ to the green pixel p1D. With this operation, the charge caused by the irradiation pulsed light $L_P$ is accumulated in the first charge reading region $22_1$.

When the irradiation period S11 ends and the period is switched to a non-irradiation period S12, the gate driver circuit 32 outputs the first transfer control pulse $G_1(H)$, the second transfer control pulse $G_2(L)$, and the discharge control pulse $G_D(L)$ to the green pixel p1D. The gate driver circuit 32 maintains the signal level of the pulse output in the irradiation period S11.

After the switching to the non-irradiation period S12 and after a predetermined time has elapsed, the gate driver circuit 32 outputs the first transfer control pulse $G_1(L)$, the second transfer control pulse $G_2(L)$, and the discharge control pulse $G_D(H)$ to the green pixel p1D. The gate driver circuit 32 switches the first transfer control pulse $G_1$ from high to low. The gate driver circuit 32 switches the discharge control pulse $G_D$ from low to high. The timing of switching the first transfer control pulse $G_1$ may be the same timing as the timing of switching the discharge control pulse $G_D$.

After the predetermined time has further elapsed, the gate driver circuit 32 outputs the first transfer control pulse $G_1(L)$, the second transfer control pulse $G_2(H)$, and the discharge control pulse $G_D(L)$ to the green pixel p1D. The gate driver circuit 32 switches the second transfer control pulse $G_2$ from low to high. The gate driver circuit 32 switches the discharge control pulse $G_D$ from high to low. The timing of switching the second transfer control pulse $G_2$ may be the same timing as the timing of switching the discharge control pulse $G_D$. With this operation, the charge caused by the green component of the visible light is accumulated in the second charge reading region $22_2$.

Also by the operation of the modification of the fifth embodiment, similarly to the solid-state imaging device 1A of the first embodiment, the solid-state imaging device 1E can simultaneously capture the visible light image 201 and the near-infrared light image 202.

According to the operation of the modification of the fifth embodiment, the effect of expanding the dynamic range in the visible light image 201 cannot be obtained. Similarly, according to the operation of the modification of the fifth embodiment, the effect of removing background light noise in the near-infrared light image 202 cannot be obtained.

Sixth Embodiment

Figure 26:
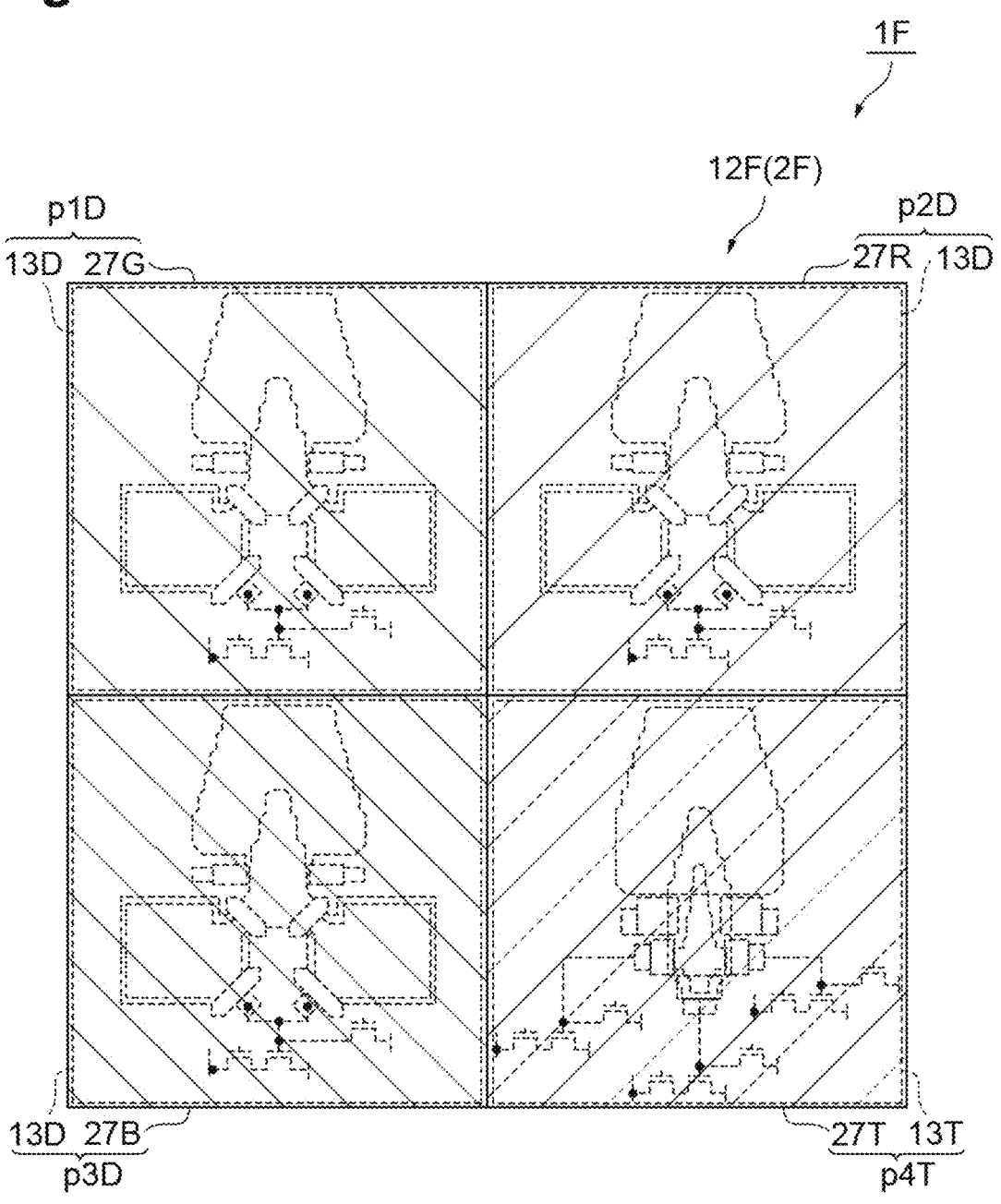
FIG. 26 is a plan view illustrating a pixel array according to a sixth embodiment.

A solid-state imaging device 1F according to a sixth embodiment illustrated in FIG. 26 simultaneously captures the visible light image 201 and the near-infrared light image 202. Similarly to the first embodiment, the S/N ratio of the visible light image 201 output from the solid-state imaging device 1F is favorable. The near-infrared light image 202 output from the solid-state imaging device 1F of the sixth embodiment does not include the influence of background light. The near-infrared light image 202 output from the solid-state imaging device 1F of the sixth embodiment includes distance information.

Figure 27:
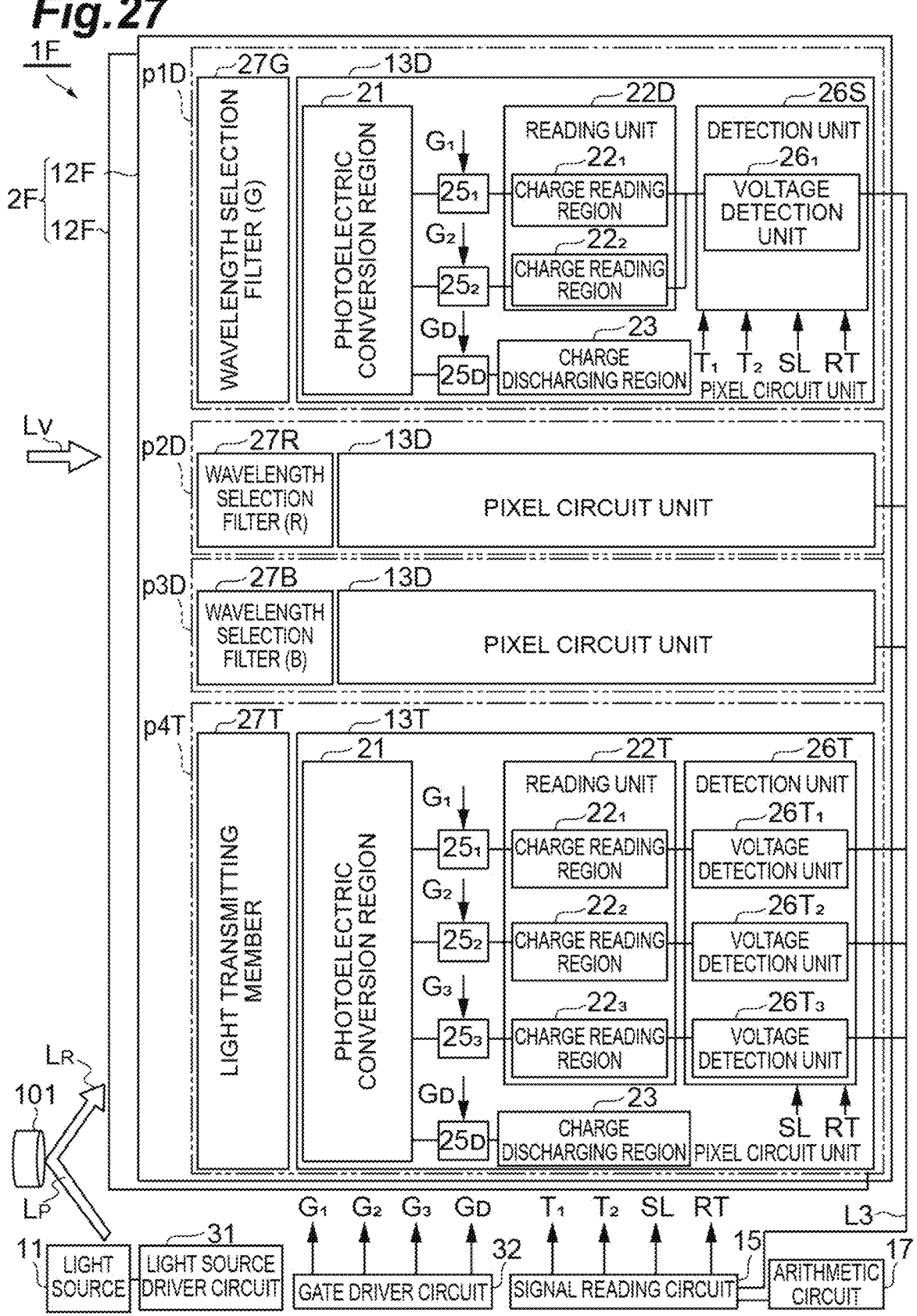
FIG. 27 is a block diagram illustrating a configuration of a solid-state imaging device according to the sixth embodiment in detail.

As illustrated in FIG. 27, the solid-state imaging device 1F includes the light source 11, a pixel panel 2F, and the peripheral circuit 4. The pixel panel 2F includes a plurality of pixel arrays 12F. The arrangement of the plurality of pixel arrays 12F is the same as that in the first embodiment.

In the pixel array 12F constituting the solid-state imaging device 1F of the sixth embodiment, a near-infrared pixel p4T is different from the near-infrared pixel p4S of the first embodiment and the near-infrared pixel p4D of the second embodiment. The near-infrared pixel p4T constituting the pixel array 12F includes a first charge reading region $22_1$, a second charge reading region $22_2$, and a third charge reading region $22_3$. A first voltage detection unit $26T_1$, a second voltage detection unit $26T_2$, and a third voltage detection unit $26T_3$ are respectively connected to the first charge reading region $22_1$, the second charge reading region $22_2$, and the third charge reading region $22_3$. A detection unit 26T in a pixel circuit unit 13T of the near-infrared pixel p4T includes three voltage detection units.

Figure 28:
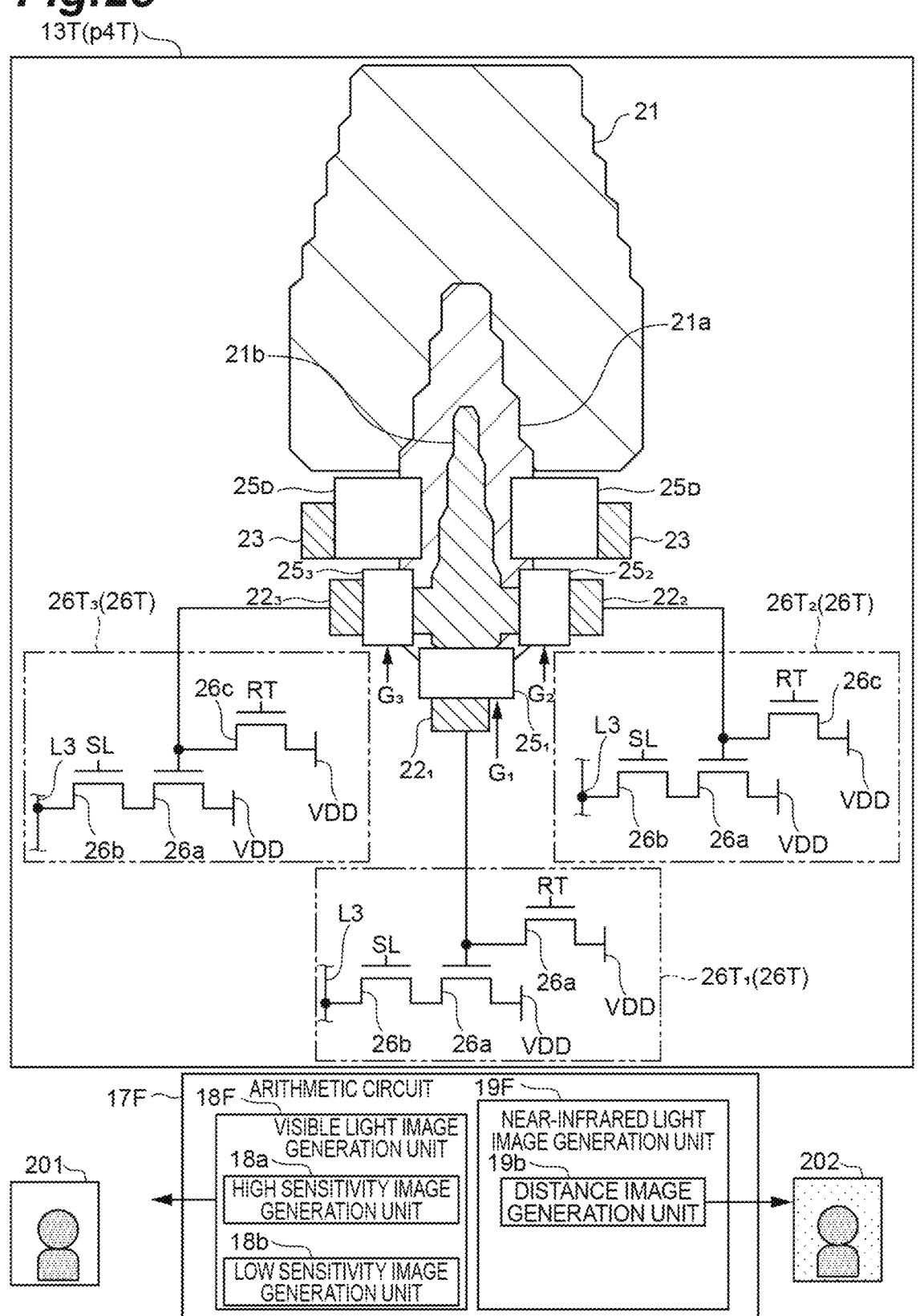
FIG. 28 is a plan view illustrating a pixel circuit unit included in a near-infrared pixel according to the sixth embodiment in detail.

As illustrated in FIG. 28, the first charge reading region $22_1$ is connected to the photoelectric conversion region 21 via the first transfer control gate $25_1$. The input end of the first voltage detection unit $26T_1$ is connected to the first charge reading region $22_1$. In the pixel circuit unit 13T, the first charge reading region $22_1$ also functions as a floating diffusion region. The pixel circuit unit 13T does not include a floating diffusion region provided separately from the charge reading region. Therefore, the pixel circuit unit 13T does not include a reading control gate for controlling transfer of a charge from the charge reading region to the floating diffusion region. The second charge reading region $22_2$ and the third charge reading region $22_3$ also have the same configuration as the first charge reading region $22_1$.

An arithmetic circuit 17F includes a visible light image generation unit 18F and a near-infrared light image generation unit 19F. Since the visible light image generation unit 18F is the same as the visible light image generation unit 18C of the third embodiment, the description thereof will be omitted. The near-infrared light image generation unit 19F includes a distance image generation unit 19b. The distance image generation unit 19b obtains distance information using charges accumulated in the first charge reading region $22_1$ and charges accumulated in the first charge reading region $22_1$. A ratio between the amount of charges accumulated in the first charge reading region $22_1$ and the amount of charges accumulated in the first charge reading region $22_1$ corresponds to a delay time from the emission of the irradiation pulsed light $L_P$ to the incidence of the reflected pulsed light $L_R$ on the pixel array 12F. This time is related to the sum of a distance from the light source 11 to the imaging subject 101 and a distance from the imaging subject 101 to the pixel array 12F. Therefore, by obtaining a ratio of the charge amount, a distance from the solid-state imaging device 1F to the imaging subject 101 can be obtained. When the ratio of the charge amount is obtained, a noise component caused by the background light is removed using the charge amount accumulated in the third charge reading region $22_3$.

For example, when the distance to the imaging subject 101 is short, the delay time is short. In this case, the charge amount accumulated in the first charge reading region $22_1$ is larger than the charge amount accumulated in the second charge reading region $22_2$. For example, when the distance to the imaging subject 101 is long, the delay time is long. In this case, the charge amount accumulated in the second charge reading region $22_2$ is larger than the charge amount accumulated in the first charge reading region $22_1$.

[Operation/Timing Chart]

The operation of the solid-state imaging device 1F will be described with reference to a timing chart illustrated in FIG. 29. Similarly to the first embodiment, in the following description, attention is particularly paid to the operation of the pixel array 12F.

Figure 29:
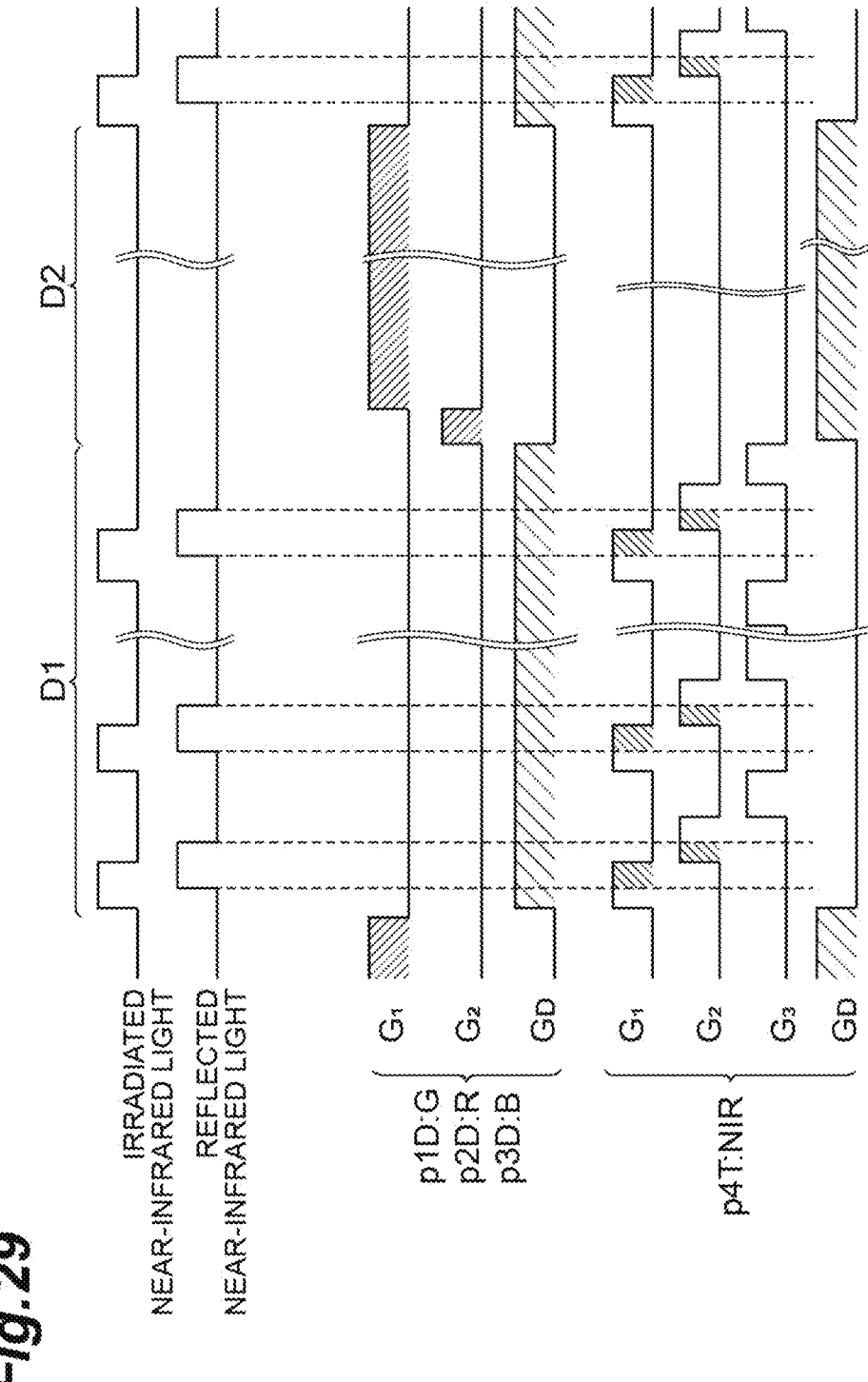
FIG. 29 is a timing chart illustrating a control pulse provided to the pixel array according to the sixth embodiment.

As illustrated in FIG. 29, the solid-state imaging device 1F includes an operation of obtaining the near-infrared light image 202 including distance information (a distance image acquisition operation D1) and an operation of obtaining the visible light image 201 (a visible light image acquisition operation D2). In one frame period, the distance image acquisition operation D1 and the visible light image acquisition operation D2 are alternately executed a plurality of times.

Specifically, the distance image acquisition operation D1 is performed as follows.

In the distance image acquisition operation D1, the pixel array 12F does not acquire the visible light image 201. Therefore, the gate driver circuit 32 outputs the first transfer control pulse $G_1(L)$, the second transfer control pulse $G_2(L)$, and the discharge control pulse $G_D(H)$ to the green pixel p1D, the red pixel p2D, and the blue pixel p3D. In the distance image acquisition operation D1, the green pixel p1D, the red pixel p2D, and the blue pixel p3D of the pixel array 12F prohibit transfer of a charge to the first charge reading region $22_1$ and the second charge reading region $22_2$. In the distance image acquisition operation D1, the green pixel p1D, the red pixel p2D, and the blue pixel p3D of the pixel array 12F permit discharge of a charge to the charge discharging region 23.

In the distance image acquisition operation D1, the gate driver circuit 32 outputs the following control pulses. According to these control pulses, the near-infrared pixel p4D prohibits transfer of a charge to the first charge reading region $22_1$, the second charge reading region $22_2$, and the third charge reading region $22_3$. According to these control pulses, the near-infrared pixel p4D permits discharge of a charge to the charge discharging region 23.

First transfer control pulse $G_1$: (L)
Second transfer control pulse $G_2$: (L)
Third transfer control pulse $G_3$: (L)
Discharge control pulse $G_D$: (H)

After the predetermined time elapses, the light source driver circuit 31 starts the irradiation of the irradiation pulsed light $L_P$. The gate driver circuit 32 outputs the following control pulses. According to these control pulses, the near-infrared pixel p4D permits transfer of a charge to the first charge reading region $22_1$. According to these control pulses, the near-infrared pixel p4D prohibits transfer of a charge to the second charge reading region $22_2$ and the third charge reading region $22_3$. According to these control pulses, the near-infrared pixel p4D prohibits discharge of a charge to the charge discharging region 23.

First transfer control pulse $G_1$: (H)
Second transfer control pulse $G_2$: (L)
Third transfer control pulse $G_3$: (L)
Discharge control pulse $G_D$: (L)

A timing at which the gate driver circuit 32 starts the output of the control pulse may be the same timing as a timing at which the irradiation of the irradiation pulsed light $L_P$ starts. A timing at which the gate driver circuit 32 starts outputting the following control pulses may be set to be slightly later than a timing at which the irradiation of the irradiation pulsed light $L_P$ starts.

The irradiation pulsed light $L_P$ is reflected by the imaging subject 101 and then becomes reflected pulsed light $L_R$ to be incident on the solid-state imaging device 1F. Therefore, a timing at which the reflected pulsed light $L_R$ is received is delayed from a timing at which the irradiation pulsed light $L_P$ is emitted. This delay depends on a distance from the light source 11 to the imaging subject 101 and a distance from the imaging subject 101 to the pixel array 12F.

Immediately after transfer of a charge to the first charge reading region $22_1$ is permitted, the reflected pulsed light $L_R$ has not reached the pixel array 12F, and thus no charge is generated in the photoelectric conversion region 21. Therefore, the charge is not transferred to the first charge reading region $22_1$. A situation that "no charge is generated in the photoelectric conversion region 21" here means that no charge is generated due to the reflected pulsed light $L_R$. Even when the reflected pulsed light $L_R$ is not incident, the photoelectric conversion region 21 generates a charge caused by background light. The charge caused by the background light is transferred to the first charge reading region $22_1$. After a predetermined time has elapsed, the reflected pulsed light $L_R$ is incident on the pixel array 12F. As a result, a charge is generated in the photoelectric conversion region 21, and the generated charge is transferred to the first charge reading region $22_1$. A period during which transfer of a charge to the first charge reading region $22_1$ is permitted includes a period during which transfer of a charge to the first charge reading region $22_1$ does not occur and a period during which transfer of a charge to the first charge reading region $22_1$ occurs. In FIG. 29, a period during which transfer of a charge occurs is indicated by hatching.

After the predetermined irradiation period S11 has elapsed, the light source driver circuit 31 stops the irradiation of the irradiation pulsed light $L_P$. The gate driver circuit 32 outputs the following control pulses. According to these control pulses, the near-infrared pixel p4D prohibits transfer of a charge to the first charge reading region $22_1$ and the third charge reading region $22_3$. According to these control pulses, the near-infrared pixel p4D permits transfer of a charge to the second charge reading region $22_2$. According to these control pulses, the near-infrared pixel p4D prohibits discharge of a charge to the charge discharging region 23.

First transfer control pulse $G_1$: (L)
Second transfer control pulse $G_2$: (H)
Third transfer control pulse $G_3$: (L)
Discharge control pulse $G_D$: (L)

Immediately after transfer of a charge to the second charge reading region $22_2$ is permitted, the reflected pulsed light $L_R$ continues to be incident onto the pixel array 12F, and thus a charge is generated in the photoelectric conversion region 21. Therefore, the charge is transferred to the second charge reading region $22_2$. A region to which the charge is transferred from the photoelectric conversion region 21 is switched from the first charge reading region $22_1$ to the second charge reading region $22_2$. When the incidence of the reflected pulsed light $L_R$ on the pixel array 12F ends, no charge is generated in the photoelectric conversion region 21. Therefore, transfer of a charge to the second charge reading region $22_2$ ends.

After the incidence of the reflected pulsed light $L_R$ on the pixel array 12F ends, the gate driver circuit 32 outputs the following control pulses. According to these control pulses, the near-infrared pixel p4D prohibits transfer of a charge to the first charge reading region $22_1$ and the second charge reading region $22_2$. According to these control pulses, the near-infrared pixel p4D permits transfer of a charge to the third charge reading region $22_3$. According to these control pulses, the near-infrared pixel p4D prohibits discharge of a charge to the charge discharging region 23.

First transfer control pulse $G_1$: (L)
Second transfer control pulse $G_2$: (L)
Third transfer control pulse $G_3$: (H)
Discharge control pulse $G_D$: (L)

According to the control pulse, a charge not caused by the reflected pulsed light $L_R$ is transferred to the third charge reading region $22_3$. The charge transferred to the third charge reading region $22_3$ is used to remove background light noise.

In the distance image acquisition operation D1, the light source driver circuit 31 emits the irradiation pulsed light $L_P$ a plurality of times. The gate driver circuit 32 also performs transfer of a charge to the first charge reading region $22_1$, transfer of a charge to the second charge reading region $22_2$, and transfer of a charge to the third charge reading region $22_3$ a plurality of times according to the irradiation of the irradiation pulsed light $L_P$.

Specifically, the visible light image acquisition operation D2 is as performed as follows.

In the visible light image acquisition operation D2, the pixel array 12F does not acquire the near-infrared light image 202. Therefore, the gate driver circuit 32 outputs the first transfer control pulse $G_1$(L), the second transfer control pulse $G_2$(L), the third transfer control pulse $G_3$(L), and the discharge control pulse $G_D$(H) to the near-infrared pixel p4D. In the visible light image acquisition operation D2, the near-infrared pixel p4D of the pixel array 12F prohibits transfer of a charge to the first charge reading region $22_1$, the second charge reading region $22_2$, and the third charge reading region $22_3$. In the visible light image acquisition operation D2, the near-infrared pixel p4D of the pixel array 12F permits discharge of a charge to the charge discharging region 23.

In the visible light image acquisition operation D2, the gate driver circuit 32 outputs the first transfer control pulse $G_1$(L), the second transfer control pulse $G_2$(H), and the discharge control pulse $G_D$(L) to the green pixel p1D, the red pixel p2D, and the blue pixel p3D. In the visible light image acquisition operation D2, the green pixel p1D, the red pixel p2D, and the blue pixel p3D of the pixel array 12F prohibit transfer of a charge to the first charge reading region $22_1$, permit transfer of a charge to the second charge reading region $22_2$, and prohibit discharge of a charge to the charge discharging region 23. According to this operation, charges for the visible light image 201 having lows sensitivity can be accumulated in the second charge reading region $22_2$.

After the predetermined time has elapsed, the gate driver circuit 32 outputs the first transfer control pulse $G_1(H)$, the second transfer control pulse $G_2(L)$, and the discharge control pulse $G_D(L)$ to the green pixel p1D, the red pixel p2D, and the blue pixel p3D. The gate driver circuit 32 switches the first transfer control pulse $G_1$ from low to high. The gate driver circuit 32 switches the second transfer control pulse $G_2$ from high to low. The gate driver circuit 32 maintains the signal level of the discharge control pulse $G_D$. The time for maintaining the first transfer control pulse $G_1(H)$ is longer than the time for maintaining the second transfer control pulse $G_2(H)$. Therefore, according to this operation, charges for the visible light image 201 having high sensitivity can be accumulated in the first charge reading region $22_1$.

[Operation and Effect]

Similarly to the solid-state imaging device 1A of the first embodiment, the solid-state imaging device 1F can simultaneously capture the visible light image 201 and the near-infrared light image 202.

The solid-state imaging device 1F can obtain the near-infrared light image 202 from which background light noise is removed and which includes distance information.

Embodiments of the solid-state imaging device are not limited to the above-described examples.

First Modification

Figure 30:
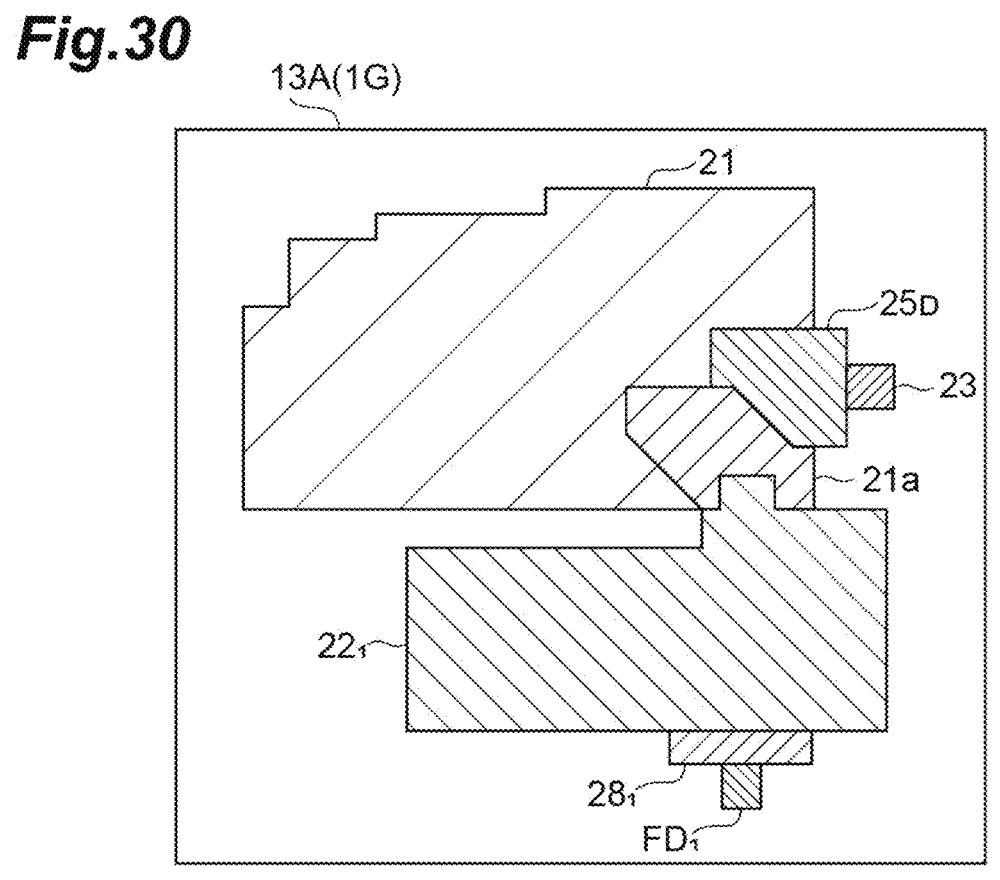

FIG. 30 illustrates a pixel circuit unit 13A included in a solid-state imaging device 1G of a first modification. The pixel circuit unit 13A includes one photoelectric conversion region 21. The photoelectric conversion region 21 is connected to the first charge reading region $22_1$ via the charge collection region 21a. The pixel circuit unit 13A does not include a transfer control gate for permitting or prohibiting transfer of a charge from the photoelectric conversion region 21 to the first charge reading region $22_1$. The photoelectric conversion region 21 is also connected to the charge discharging region 23 via the discharge control gate $25_D$. The first charge reading region $22_1$ is connected to the first floating diffusion region $FD_1$ via the first reading control gate $28_1$.

According to the pixel circuit unit 13A of the first modification, the structure of the pixel can be simplified. According to the pixel circuit unit 13A of the first modification, the area of the pixel can be reduced.

The pixel circuit unit 13A of the first modification is applicable to the green pixel p1D, the red pixel p2D, the blue pixel p3D, and the near-infrared pixel p4D of the first embodiment. The pixel circuit unit 13A of the first modification is also applicable to the green pixel p1D, the red pixel p2D, and the blue pixel p3D of the second embodiment.

Second Modification

Figure 31:
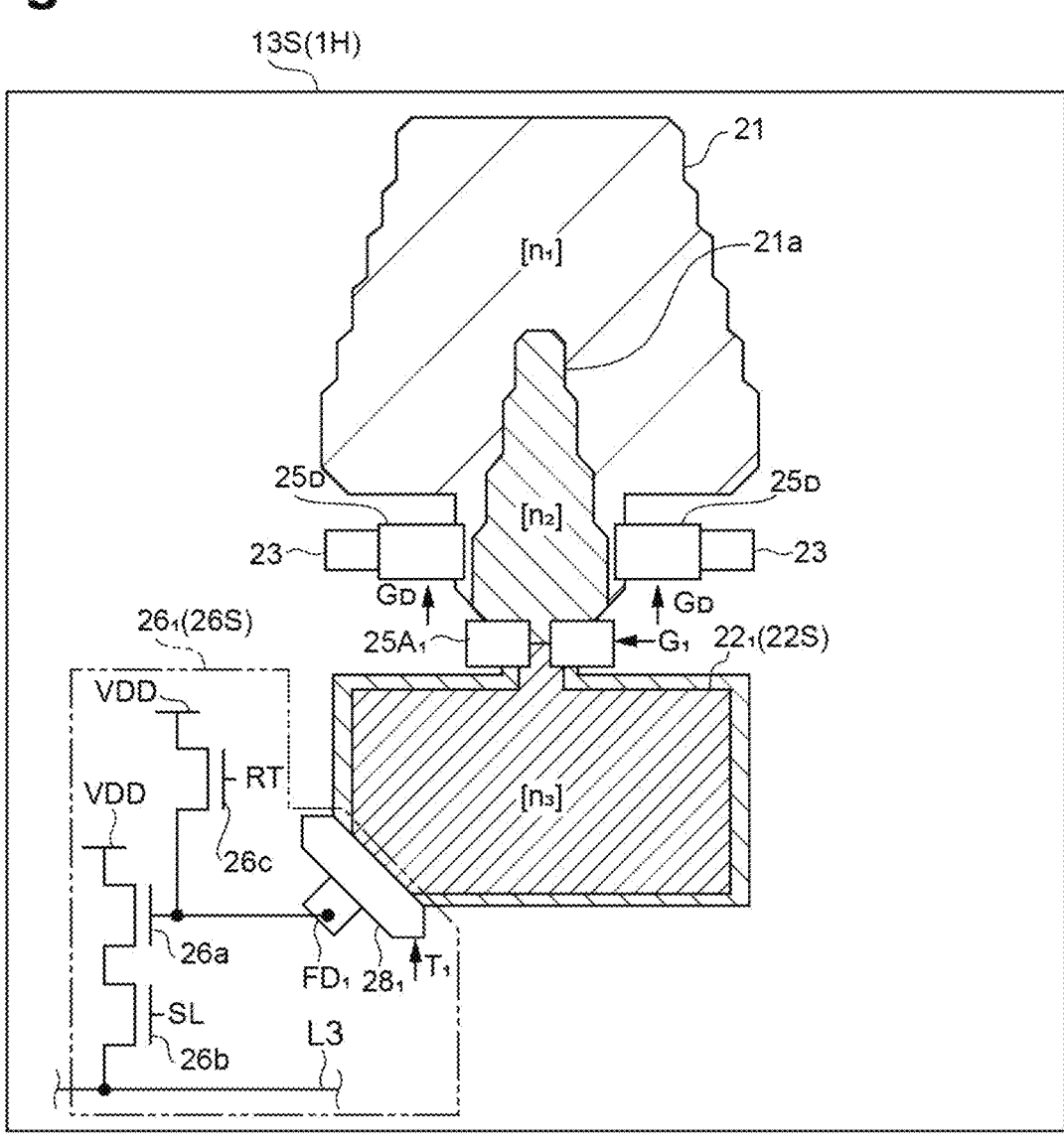
FIG. 31 is a plan view illustrating a pixel circuit unit included in a solid-state imaging device according to a second modification.

FIG. 31 illustrates a pixel circuit unit 13S included in a solid-state imaging device 1H of a second modification. The pixel circuit unit 13S includes the first charge reading region $22_1$. The pixel circuit unit 13S is different from the pixel circuit unit 13S of the first embodiment in the structure of the first transfer control gate $25A_1$. The first transfer control gate $25A_1$ of the pixel circuit unit 13S of the second modification has a structure based on the principle of a lateral electric field controlled charge modulator (LEFM) developed by the present inventors. The lateral electric field controlled charge modulator performs electric field control of a charge transport path by a lateral electric field by a plurality of gates provided on a side surface of the charge transport path. As a result, high-speed electron transport control can be performed.

The pixel circuit unit 13S of the second modification is applicable to the green pixel p1D, the red pixel p2D, the blue pixel p3D, and the near-infrared pixel p4D of the first embodiment. The pixel circuit unit 13S of the second modification is also applicable to the green pixel p1D, the red pixel p2D, and the blue pixel p3D of the second embodiment.

Third Modification

Figure 32:
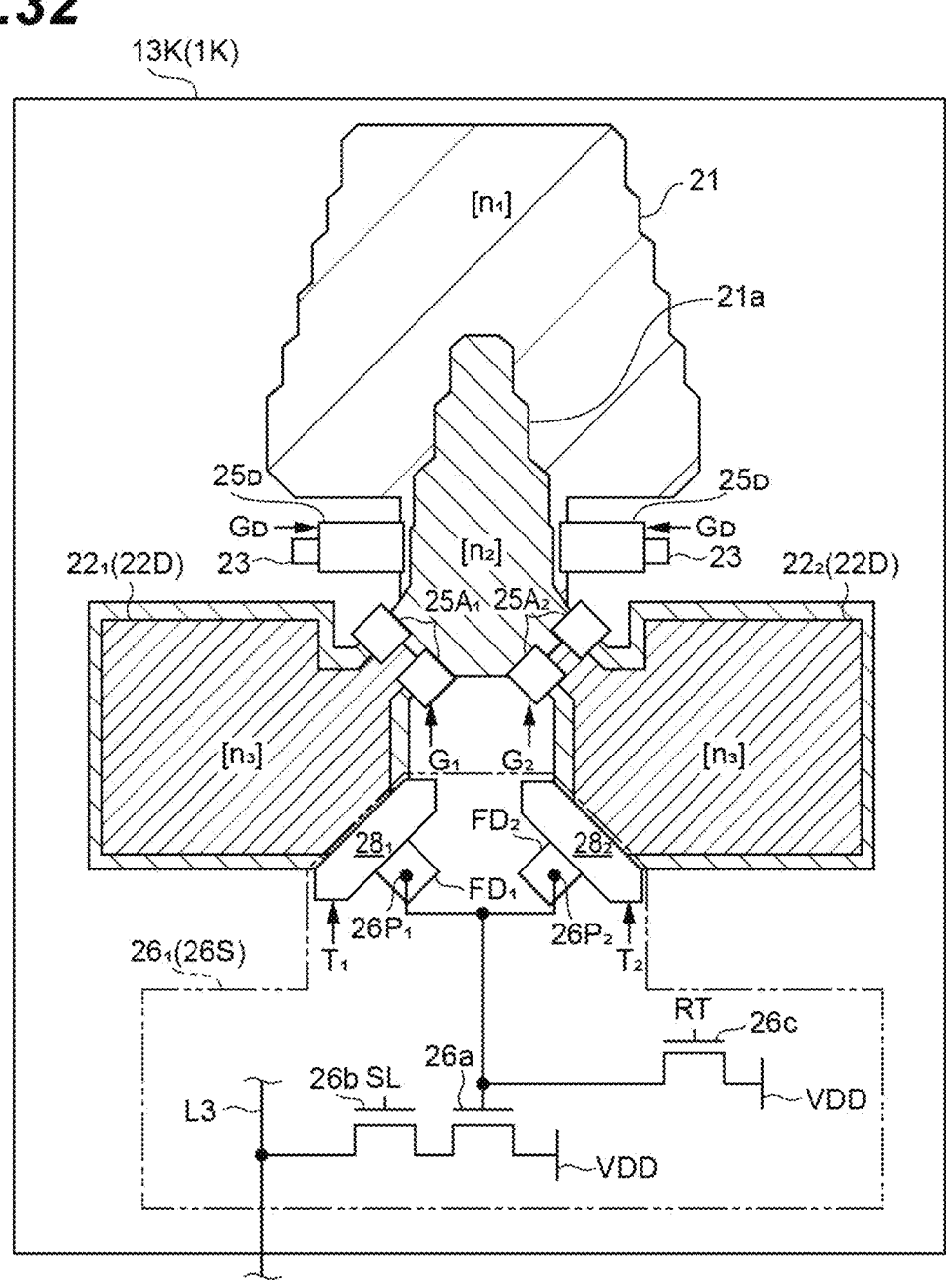
FIG. 32 is a plan view illustrating a pixel circuit unit included in a solid-state imaging device according to a third modification.

FIG. 32 illustrates a pixel circuit unit 13K included in a solid-state imaging device 1K of a third modification. The pixel circuit unit 13K includes the first charge reading region $22_1$ and the second charge reading region $22_2$. The pixel circuit unit 13K is different from the pixel circuit unit 13D of the second embodiment in the structures of a first transfer control gate $25A_1$ and a second transfer control gate $25A_2$ as in the second modification. The first transfer control gate $25A_1$ and the second transfer control gate $25A_2$ of the pixel circuit unit 13K of the third modification also adopt the structure of the lateral electric field controlled charge modulator.

The pixel circuit unit 13K of the third modification is applicable to the near infrared pixel p4D of the second to fifth embodiments. The pixel circuit unit 13K of the third modification is also applicable to the green pixel p1D, the red pixel p2D, and the blue pixel p3D of the third to fifth embodiments.

Fourth to Sixth Modification: Wavelength Selection Structure

A modification of the wavelength selection structure including the wavelength selection filters 27G, 27R, and 27B will be described.

Fourth Modification

Figure 33:
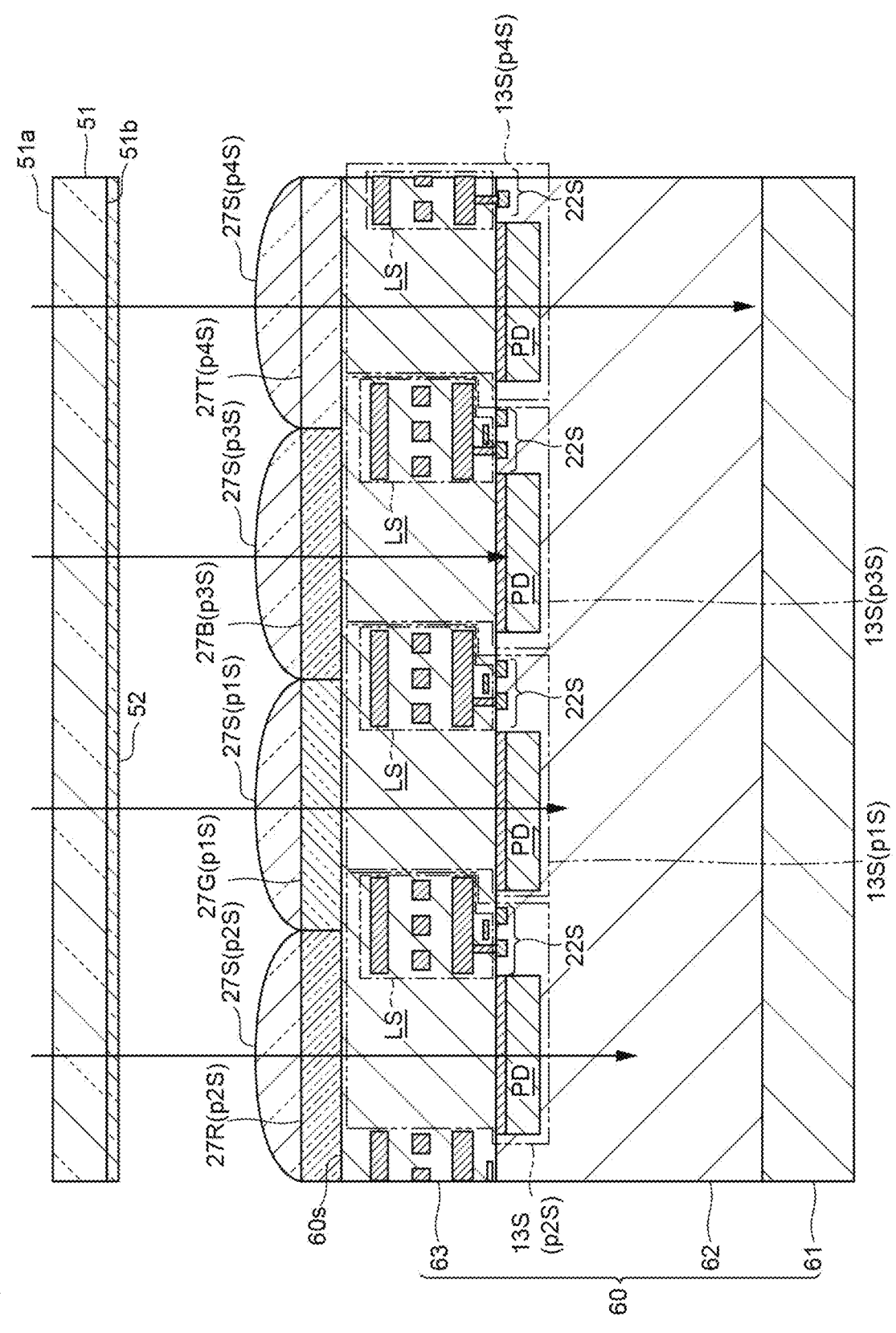
FIG. 33 is a cross-sectional view illustrating a structure of a pixel array included in a solid-state imaging device according to a fourth modification.
Figure 37:
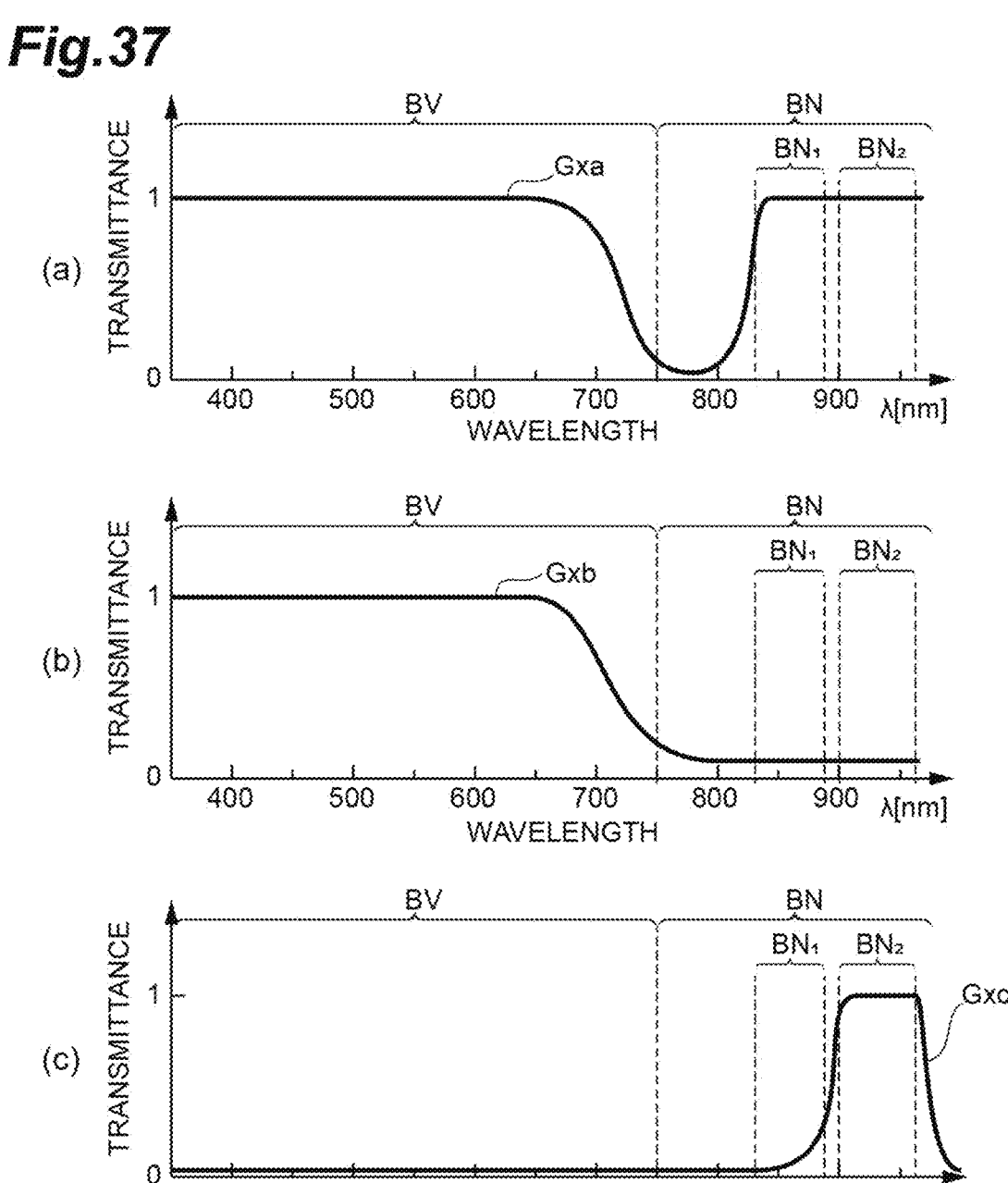
FIGS. 37(*a*), 37(*b*), and 37(*c*) are graphs illustrating characteristics of a wavelength selection filter.

FIG. 33 illustrates a modification of the cross-sectional structure. The solid-state imaging device 1A of the first embodiment includes the cover glass 51. Nothing is provided on a cover main surface 51a and a cover back surface 51b of the cover glass 51 of the first embodiment. In the fourth modification, a near-infrared band elimination filter (NIR Band Elimination Filter: BEF Filter) 52 is provided on the cover back surface 51b of the cover glass 51. The cover back surface 51b of the cover glass 51 is a surface facing the semiconductor multilayer substrate 60. The characteristics of the near-infrared band elimination filter 52 are as indicated by a graph Gxa in FIG. 37(a). According to the graph Gxa, the near-infrared band elimination filter 52 transmits a band BV of visible light. The near-infrared band elimination filter 52 transmits a band $BN_1$ (860±30 nanometers) and a band $BN_2$ (930±30 nanometers) adopted as the wavelength of the irradiation pulsed light $L_P$ in the band BN of the near-infrared light. For example, the near-infrared band elimination filter 52 inhibits transmission of light from the visible light band BV to the band $BN_1$ of the near-infrared light band BN. The near-infrared band elimination filter 52 transmits the irradiation pulsed light $L_P$ among the near-infrared light. The near-infrared band elimination filter 52 does not transmit light which is not the irradiation pulsed light $L_P$ among the near-infrared light. Therefore, generation of noise included in the near-infrared light image 202 can be suppressed.

In order to reduce a near-infrared component taken into the visible light pixel, the near-infrared band elimination filter (NIR-BEF) for eliminating the near-infrared component other than the wavelength band of the near-infrared auxiliary light (for example, 860 nm±30 nm, 930 nm±30 nm) is provided. The band elimination filter may be formed on the cover glass 51. The band elimination filter may be provided only in the near-infrared pixel p4S on-chip.

The wavelength selection structure of the fourth modification is applicable to any of the solid-state imaging device 1A of the first embodiment, the solid-state imaging device 1B of the second embodiment, the solid-state imaging device 1C of the third embodiment, the solid-state imaging device 1D of the fourth embodiment, the solid-state imaging device 1F of the fifth embodiment, and the solid-state imaging device 1G of the sixth embodiment.

Fifth Modification

Figure 34:
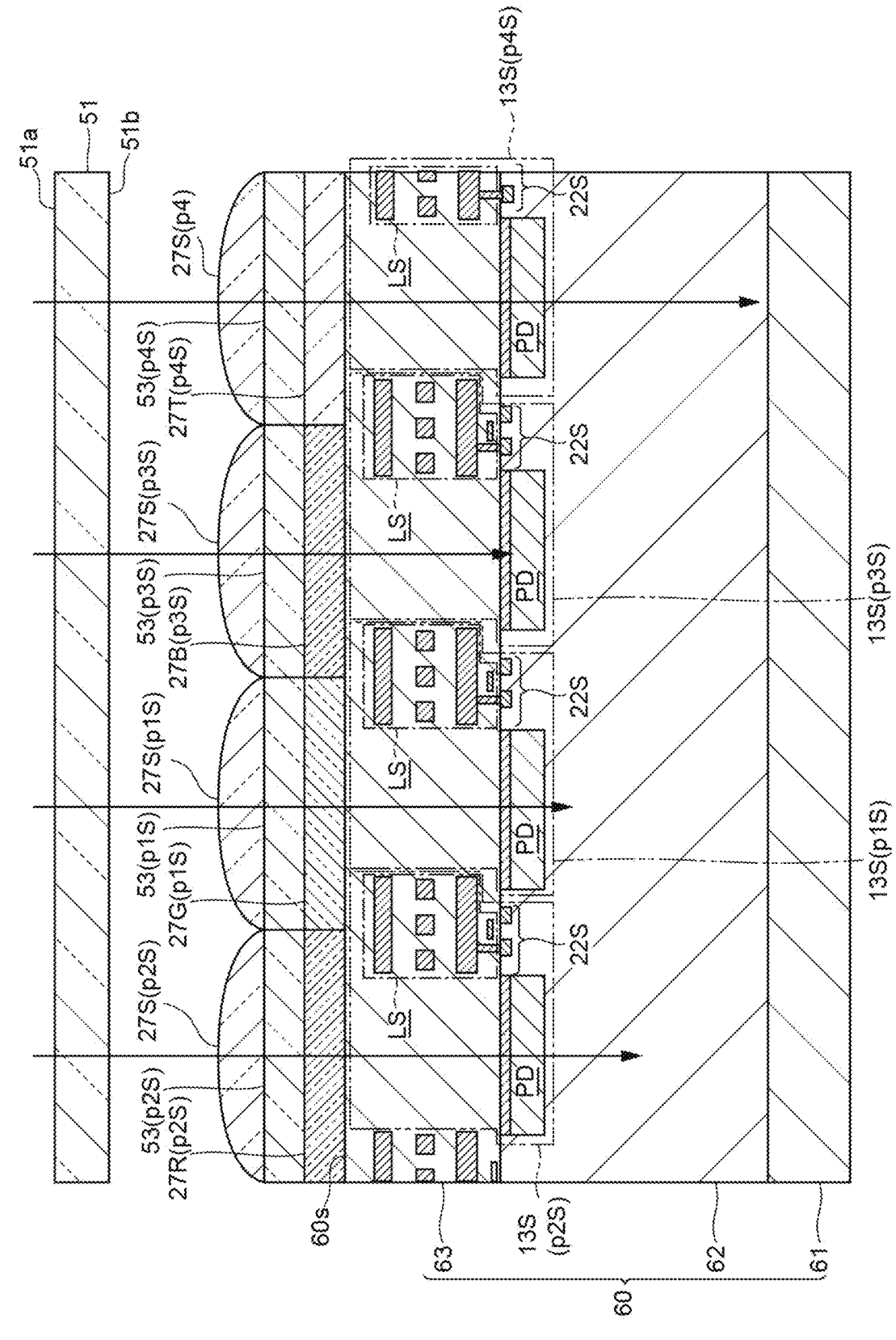
FIG. 34 is a cross-sectional view illustrating a structure of a pixel array included in a solid-state imaging device according to a fifth modification.

As illustrated in FIG. 34, for example, a near-infrared band cut filter 53 (NIR cut filter) that inhibits transmission of near-infrared light may be provided between the wavelength selection filters 27R, 27G, and 27B, which are visible light filters, and the lens 27S. The near-infrared band cut filter 53 has a light transmission characteristic illustrated in FIG. 37(*b*). The near-infrared band cut filter 53 transmits light shorter than 760 nanometers (band BV of visible light). The near-infrared band cut filter 53 prevents transmission of light having a wavelength longer than 760 nanometers (band BN of near-infrared light). According to the configuration illustrated in FIG. 34, light passes through the cover glass 51, the lens 27S, the near-infrared band cut filter 53, and the wavelength selection filters 27R, 27G, and 27B, which are visible light filters, in this order, and enters the photodiode PD. Such a structure is applied to the green pixel p1D, the red pixel p2D, and the blue pixel p3D. Such a structure is not applied to the near-infrared pixel p4D. The near-infrared pixel p4D includes the light transmitting member 27T having no wavelength selectivity instead of the wavelength selection filters 27R, 27G, and 27B and the near-infrared band cut filter 53.

The wavelength selection structure of the fifth modification is applicable to the solid-state imaging device 1A of the first embodiment, the solid-state imaging device 1B of the second embodiment, the solid-state imaging device 1C of the third embodiment, and the solid-state imaging device 1G of the sixth embodiment.

Sixth Modification

Figure 35:
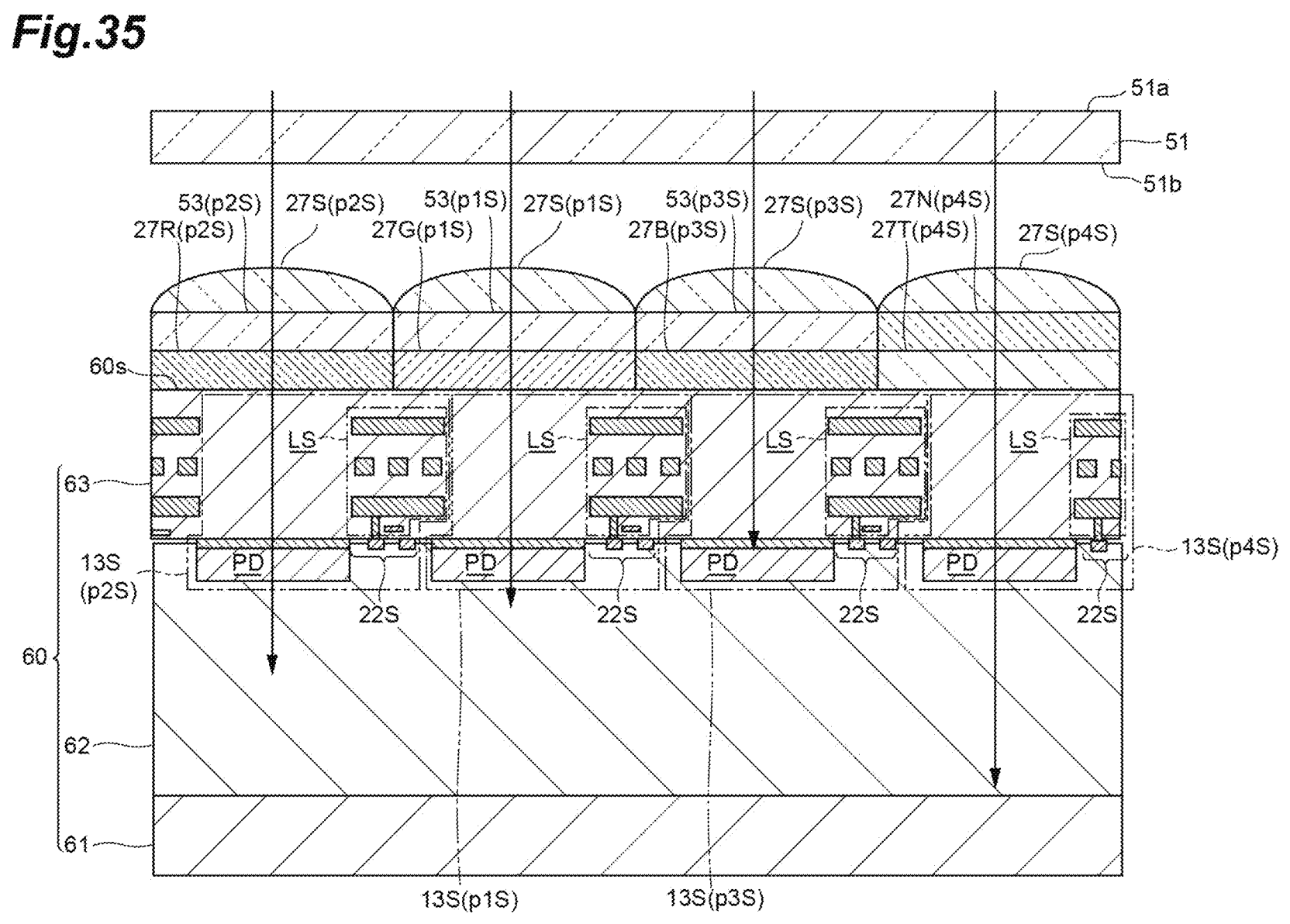

In the fifth modification, the near-infrared pixel p4D does not include an optical component having wavelength selectivity. For example, as illustrated in FIG. 35, the near-infrared pixel p4D may include a near-infrared bandpass filter 27N (NIR Bandpass Filter). The near-infrared bandpass filter 27N has a light transmission characteristic illustrated in FIG. 37(*c*). The near-infrared bandpass filter 27N transmits a wavelength in the vicinity of 930 nanometers.

The near-infrared bandpass filter 27N prevents transmission of light in the band BV of visible light.

The wavelength selection structure of the sixth modification is applicable to the solid-state imaging device 1A of the first embodiment, the solid-state imaging device 1B of the second embodiment, the solid-state imaging device 1C of the third embodiment, and the solid-state imaging device 1G of the sixth embodiment.

Seventh Modification

Figure 36:
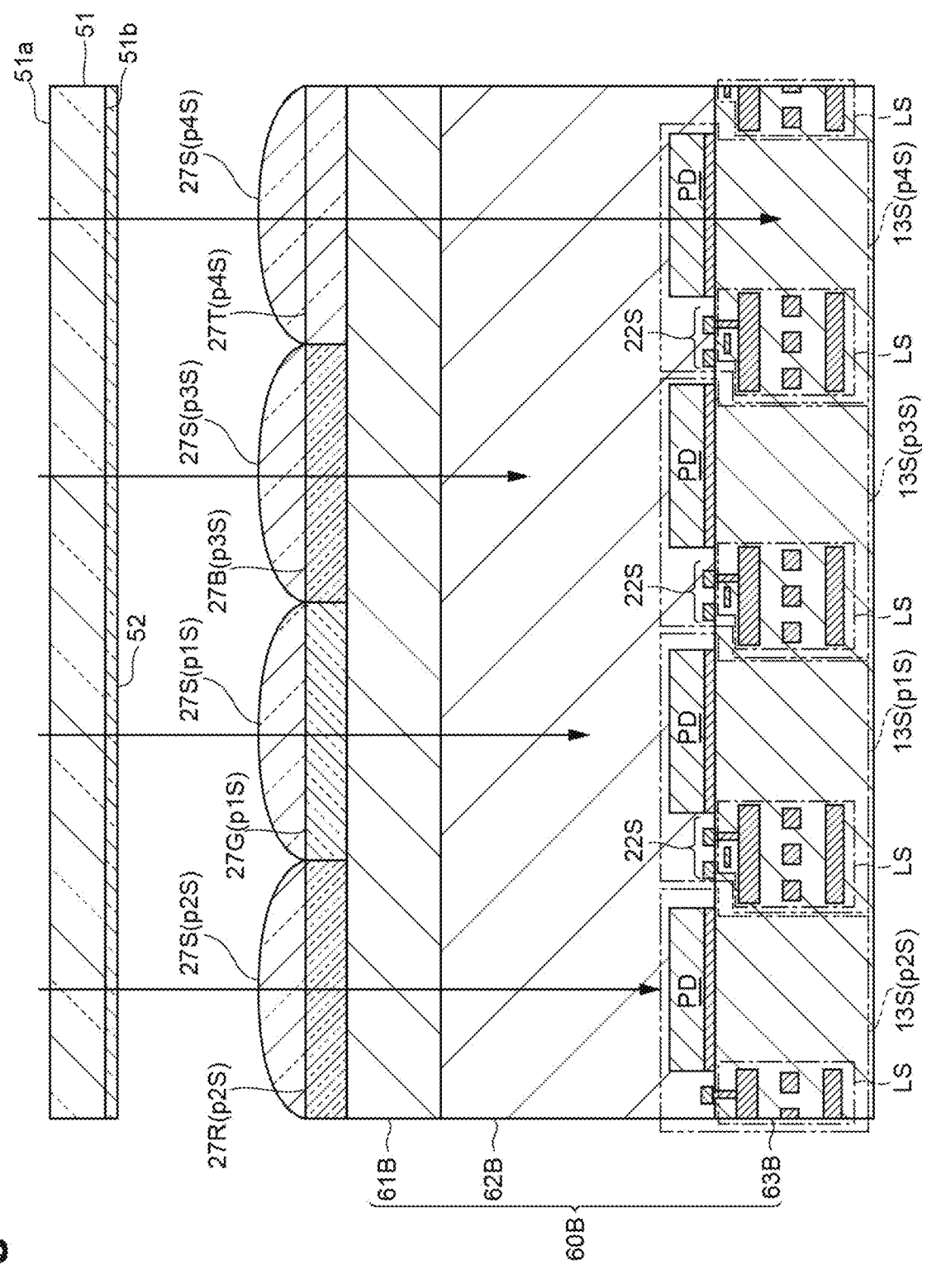
FIG. 36 is a cross-sectional view illustrating a structure of a pixel array included in a solid-state imaging device according to a seventh modification.

As illustrated in FIG. 36, the solid-state imaging device may include a semiconductor multilayer substrate 60B adopting a so-called back surface irradiation type structure. The structure illustrated in FIG. 36 is applicable to the solid-state imaging device 1A of the first embodiment, the solid-state imaging device 1B of the second embodiment, the solid-state imaging device 1C of the third embodiment, the solid-state imaging device 1D of the fourth embodiment, the solid-state imaging device 1E of the fifth embodiment, and the solid-state imaging device 1F of the sixth embodiment.

In order to use the solid-state imaging devices 1A to 1F for measuring a biological signal, a configuration in which two bands of near-infrared light are used as a lock-in detection signal and a configuration in which one band of near-infrared light is used and one band of visible light is used may be combined with each other. In the case of the configuration in which two bands of near-infrared light are used, three charge reading regions are provided in the near-infrared pixel p4D. The even-numbered column pixels are set as a first band of near-infrared light. The odd-numbered column pixels are set as a second band of near-infrared light. When the configuration in which the near-infrared light has one band and the visible light has one band is adopted, the near-infrared pixel is provided with two charge reading regions, and the visible light pixel is also provided with two charge reading regions.

Seventh Embodiment

The solid-state imaging device 1A of the first embodiment described above discharges charges generated in the photoelectric conversion regions 21 of the green pixels p1S and p4S, the red pixel p2S, and the blue pixel p3S to the charge discharging region 23 in the period overlapping with the irradiation period of the irradiation pulsed light $L_P$. As a result, the solid-state imaging device 1A of the first embodiment can obtain the visible light image 201 in which the influence of the near-infrared light is suppressed. The same applies to the solid-state imaging devices of the second to sixth embodiments. The solid-state imaging device of the seventh embodiment obtains the visible light image 201 in which the influence of near-infrared light is suppressed by a method different from this.

The solid-state imaging device according to the seventh embodiment simultaneously acquires an image of visible light and an image of near-infrared light. An object of the solid-state imaging device of the seventh embodiment is to obtain the image of visible light in which the influence of near-infrared light is suppressed.

Outline of Solid-State Imaging Device of Seventh Embodiment

The solid-state imaging device of the seventh embodiment includes: a light source that generates pulsed light having a wavelength component of near-infrared light; a pixel array including a plurality of pixels that generate a visible light charge corresponding to visible light and generates a near-infrared light charge corresponding to light having the wavelength component of the near-infrared light resulting from the pulsed light; and a charge transfer control unit configured to supply a control pulse for controlling transfer of the visible light charge and the near-infrared light charge to the pixels. Each of the plurality of pixels includes: a photoelectric conversion region that generates the visible light charge and the near-infrared light charge; at least one visible light charge reading region that receives the transfer of the visible light charge from the photoelectric conversion region in response to the control pulse; at least two near-infrared light charge reading regions that receive the transfer of the near-infrared light charge from the photoelectric conversion region in response to the control pulse; and a charge discharging region that discharges the visible light charge and the near-infrared light charge from the photoelectric conversion region in response to the control pulse. The charge transfer control unit performs a first operation of supplying, to the pixels, a control pulse for distributing the near-infrared light charge from the photoelectric conversion region to each of at least two near-infrared light charge reading regions, a second operation of supplying, to the pixels, a control pulse for discharging the visible light charge and/or the near-infrared light charge from the photoelectric conversion region after the first operation, and a third operation of supplying, to the pixels, a control pulse for transferring the visible light charge from the photoelectric conversion region to the visible light charge reading region after the second operation.

The solid-state imaging device of the seventh embodiment can obtain, by the first operation, a distance image including distance information to an imaging subject. The solid-state imaging device of the seventh embodiment can obtain a visible light image of the imaging subject by the third operation. Therefore, the solid-state imaging device of the seventh embodiment can simultaneously acquire an image of the visible light and an image of the near-infrared light. Between the first operation and the third operation, the second operation of discharging a charge generated in the photoelectric conversion region is performed. A predetermined standby time is provided between the first operation of obtaining the distance image and the third operation of obtaining the visible light image. According to this standby time, the pulsed light generated for the first operation is sufficiently attenuated until the third operation is performed. Therefore, the solid-state imaging device can obtain an image of the visible light in which an influence of the near-infrared light is suppressed.

The pixel array of the solid-state imaging device of the seventh embodiment may include a first pixel, a second pixel, a third pixel, and a fourth pixel. The first pixel may include a first filter configured to transmit the wavelength component of the near-infrared light and to transmit only a first wavelength component among the wavelength components included in the visible light. The second pixel may include a second filter configured to transmit the wavelength component of the near-infrared light and to transmit only a second wavelength component shorter than the first wavelength component among the wavelength components included in the visible light. The third pixel may include a third filter configured to transmit the wavelength component of the near-infrared light and to transmit only a third wavelength component shorter than the second wavelength component among the wavelength components included in the visible light. The fourth pixel may include any one of the first filter, the second filter, and the third filter. Also with this configuration, the solid-state imaging device can obtain an image of the visible light in which an influence of the near-infrared light is suppressed.

The pixel array of the solid-state imaging device of the seventh embodiment may include a first pixel, a second pixel, a third pixel, and a fourth pixel. The first pixel may include a first filter configured to transmit the wavelength component of the near-infrared light and to transmit only a first wavelength component among the wavelength components included in the visible light. The second pixel may include a second filter configured to transmit the wavelength component of the near-infrared light and to transmit only a second wavelength component shorter than the first wavelength component among the wavelength components included in the visible light. The third pixel may include a third filter configured to transmit the wavelength component of the near-infrared light and to transmit only a third wavelength component shorter than the second wavelength component among the wavelength components included in the visible light. The fourth pixel may include a near-infrared light selection filter configured to selectively transmit only light having the wavelength component of the near-infrared light. According to this configuration, since the fourth pixel selectively transmits only the light having the wavelength component of the near-infrared light caused by the pulsed light, resistance to disturbance light can be enhanced.

Effects of Solid-State Imaging Device of Seventh Embodiment

According to the solid-state imaging device of the seventh embodiment, it is possible to simultaneously acquire an image of visible light and an image of near-infrared light. According to the solid-state imaging device of the seventh embodiment, it is possible to obtain an image of the visible light in which an influence of the near-infrared light is suppressed.

Figure 38:
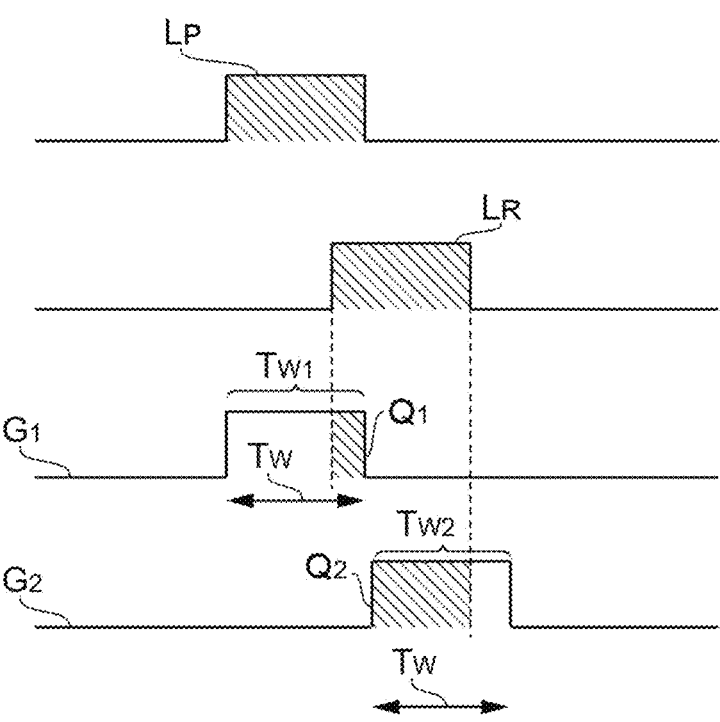
FIG. 38 is a diagram illustrating a principle of a solid-state imaging device according to a seventh embodiment.

Specific Configuration Example of Solid-State Imaging Device of Seventh Embodiment The principle of distance measurement will be described. FIG. 38 is a diagram illustrating the principle of a solid-state imaging device 1Q. The solid-state imaging device 1Q indirectly measures a light flight time. The solid-state imaging device 1Q has a plurality of regions that store charges. The solid-state imaging device 1Q distributes a charge generated in the photoelectric conversion region 21 by the incidence of light to each reading region. This distribution is performed by a gate that controls transfer of a charge from the photoelectric conversion region 21 to the reading region. Charge is transferred to a first reading region in a first period $TW_1$. In the first period $TW_1$, no charge is transferred to a second reading region. In a second period $TW_2$ subsequent to the first period $TW_1$, the transfer of the charge to the first reading region is stopped, and the charge is transferred to the second reading region. The light flight time can be obtained by using a ratio of a first charge amount $Q_1$ of the first reading region to a second charge amount $Q_2$ of the second reading region, and a time width TW of the first period $TW_1$ and the second period $TW_2$. The light flight time can be converted into distance information.

Figure 39:
FIG. 39 is a plan view of a pixel panel included in the solid-state imaging device according to the seventh embodiment.

FIG. 39 is a plan view of a pixel panel 2Q included in the solid-state imaging device 1Q of the seventh embodiment.

The pixel panel 2Q includes a pixel array 12Q. The pixel array 12Q includes a green pixel p1Q, a red pixel p2Q, a blue pixel p3Q, and a green pixel p4Q. The green pixels p1Q and p4Q obtain charges corresponding to light including a wavelength corresponding to green among visible light. The red pixel p2Q obtains a charge corresponding to light including a wavelength corresponding to red among visible light. The blue pixel p3Q obtains a charge corresponding to light including a wavelength corresponding to blue among visible light. The green pixel p1Q, the red pixel p2Q, the blue pixel p3Q, and the green pixel p4Q are used to obtain the visible light image 201.

Each of the green pixel p1Q, the red pixel p2Q, the blue pixel p3Q, and the green pixel p4Q obtains a charge corresponding to the reflected pulsed light $L_R$. The green pixel p1Q, the red pixel p2Q, the blue pixel p3Q, and the green pixel p4Q are also used to obtain distance image 203.

Figure 40:
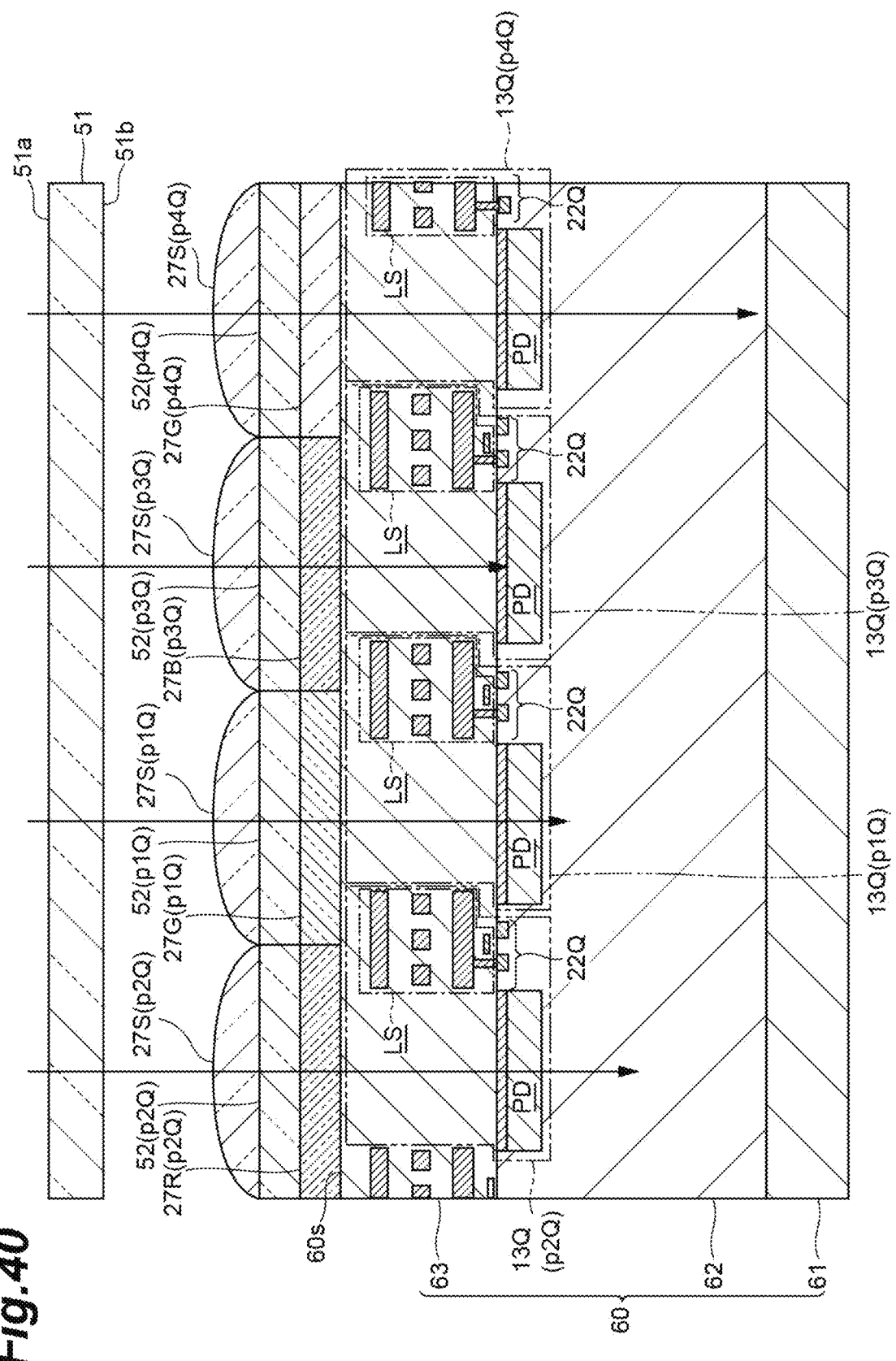
FIG. 40 is a cross-sectional view illustrating a structure of a pixel array according to the seventh embodiment.

FIG. 40 is a cross-sectional view illustrating a structure of the pixel array 12Q of the seventh embodiment. As illustrated in FIG. 40, the green pixels p1Q and p4Q include the wavelength selection filter 27G and the near-infrared band elimination filter 52. Light of a green wavelength component (wavelength 550-50 nanometers) and the reflected pulsed light $L_R$ (wavelength 860±30 nanometers and wavelength 930±30 nanometers) are provided to the photoelectric conversion regions 21 of the green pixels p1Q and p4Q.

The red pixel p2Q includes the wavelength selection filter 27R and the near-infrared band elimination filter 52. Light of a red wavelength component (wavelength 650-50 nanometers) and the reflected pulsed light $L_R$ (wavelength 860-30 nanometers and wavelength 930±30 nanometers) are provided to the photoelectric conversion region 21 of the red pixel p2Q.

The blue pixel p3Q includes the wavelength selection filter 27B and the near-infrared band elimination filter 52. Light of a blue wavelength component (wavelength 450±50 nanometers) and the reflected pulsed light $L_R$ (wavelength 860±30 nanometers and wavelength 930±30 nanometers) are provided to the photoelectric conversion regions 21 of the blue pixel p3Q.

Figure 41:
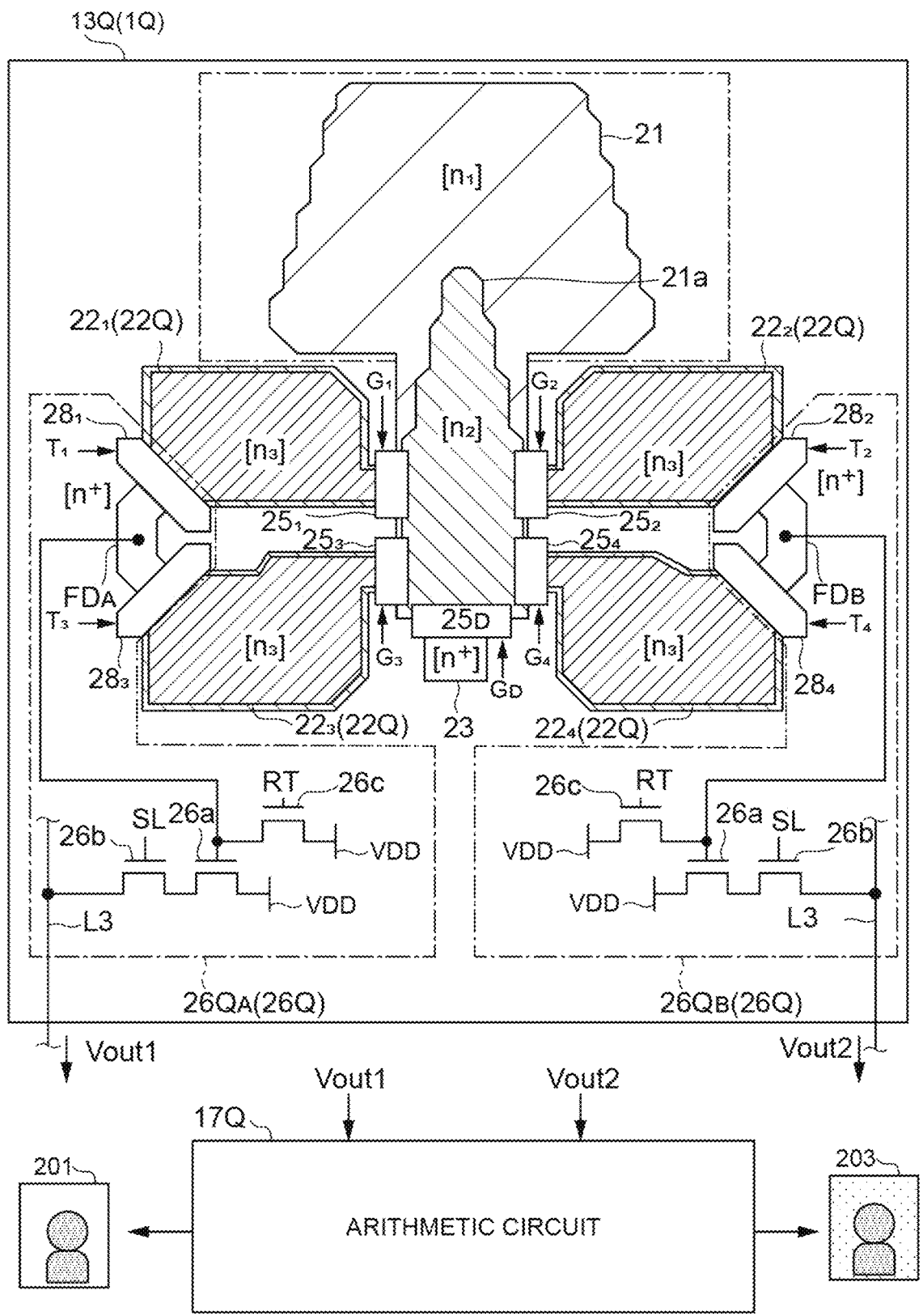
FIG. 41 is a plan view illustrating a pixel circuit unit according to the seventh embodiment in detail.

FIG. 41 is a plan view illustrating a pixel circuit unit 13Q of the seventh embodiment in detail. In the solid-state imaging device 1Q of the seventh embodiment, an arithmetic circuit 17Q receives voltages Vout1 and Vout2 output from the pixel circuit unit 13Q. The arithmetic circuit 17Q outputs the distance image 203 including distance information to the imaging subject 101 and the visible light image 201 of the imaging subject 101. The distance image 203 includes distance information obtained using a flight time of the irradiation pulsed light $L_P$ and the reflected pulsed light $L_R$.

The reading unit 22Q of the pixel circuit unit 13Q includes the first charge reading region $22_1$, the second charge reading region $22_2$, the third charge reading region $22_3$, and a fourth charge reading region 224. The first charge reading region $22_1$, the second charge reading region $22_2$, and the third charge reading region $22_3$ accumulate near-infrared light charges for obtaining the distance image 203. The fourth charge reading region $22_4$ accumulates visible light charges for obtaining the visible light image 201.

The pixel circuit unit 13Q includes the first transfer control gate $25_1$, the second transfer control gate $25_2$, a third transfer control gate $25_3$, and a fourth transfer control gate 254. The first transfer control gate $25_1$ permits or prohibits transfer of a charge from the photoelectric conversion region 21 to the first charge reading region $22_1$. The second transfer control gate $25_2$, the third transfer control gate $25_3$, and the fourth transfer control gate 254 permit or prohibit transfer of charges from the photoelectric conversion region 21 to the second charge reading region $22_2$, the third charge reading region $22_3$, and the fourth charge reading region $22_4$, respectively. The permission and prohibition of the charge transfer by the first transfer control gate $25_1$, the second transfer control gate $25_2$, the third transfer control gate $25_3$, and the fourth transfer control gate 254 are controlled by the first transfer control pulse $G_1$, the second transfer control pulse $G_2$, the third transfer control pulse $G_3$, and a fourth transfer control pulse $G_4$.

The pixel circuit unit 13Q includes a discharge control gate 25D. The discharge control gate 25D permits or prohibits transfer from the photoelectric conversion region 21 to the charge discharging region 23. The permission and prohibition of the charge transfer by the discharge control gate 25D are controlled by the discharge control pulse $G_D$.

The pixel circuit unit 13Q includes a detection unit 26Q. The detection unit 26Q includes a first voltage detection unit $26Q_A$ and a second voltage detection unit $26Q_B$. The first voltage detection unit $26Q_A$ reads a voltage based on charges accumulated in the first charge reading region $22_1$ or a voltage based on charges accumulated in the third charge reading region $22_3$. The second voltage detection unit $26Q_B$ reads a voltage based on charges accumulated in the second charge reading region $22_2$ or a voltage based on charges accumulated in the fourth charge reading region $22_4$.

The first voltage detection unit $26Q_A$ includes the first reading control gate $28_1$, a third reading control gate 283, and a first floating diffusion region $FD_A$. The first reading control gate $28_1$ permits or prohibits transfer of a charge from the first charge reading region $22_1$ to the first floating diffusion region $FD_A$. The third reading control gate 283 permits or prohibits transfer of a charge from the third charge reading region $22_3$ to the first floating diffusion region $FD_A$. The first charge reading region $22_1$ and the third charge reading region $22_3$ share the first floating diffusion region $FD_A$ for reading a voltage. The permission and prohibition of the charge transfer by the first reading control gate $28_1$ and the third reading control gate 283 are controlled by the first reading signal $T_1$ and a third reading signal $T_3$.

A reading circuit including the reading transistor 26a, the selection transistor 26b, and the reset transistor 26c is connected to the first floating diffusion region $FD_A$. Since the configuration of the reading circuit is the same as that of the solid-state imaging device 1A illustrated in FIG. 7 and the like, detailed description thereof is omitted.

The second voltage detection unit $26Q_B$ includes a second reading control gate $28_2$, a fourth reading control gate $28_4$, and a second floating diffusion region $FD_B$. The second reading control gate $28_2$ permits or prohibits transfer of a charge from the second charge reading region $22_2$ to the second floating diffusion region $FD_B$. The fourth reading control gate $28_4$ permits or prohibits transfer of a charge from the fourth charge reading region $22_4$ to the second floating diffusion region $FD_B$. The second charge reading region $22_2$ and the fourth charge reading region $22_4$ share the second floating diffusion region $FD_B$ for reading a voltage. The permission and prohibition of the charge transfer by the second reading control gate $28_2$ and the fourth reading control gate $28_4$ are controlled by the second reading signal $T_2$ and a fourth reading signal $T_4$.

A reading circuit including the reading transistor 26a, the selection transistor 26b, and the reset transistor 26c is connected to the second floating diffusion region $FD_B$. A detailed description of the configuration of the reading circuit will be omitted.

Figure 42:
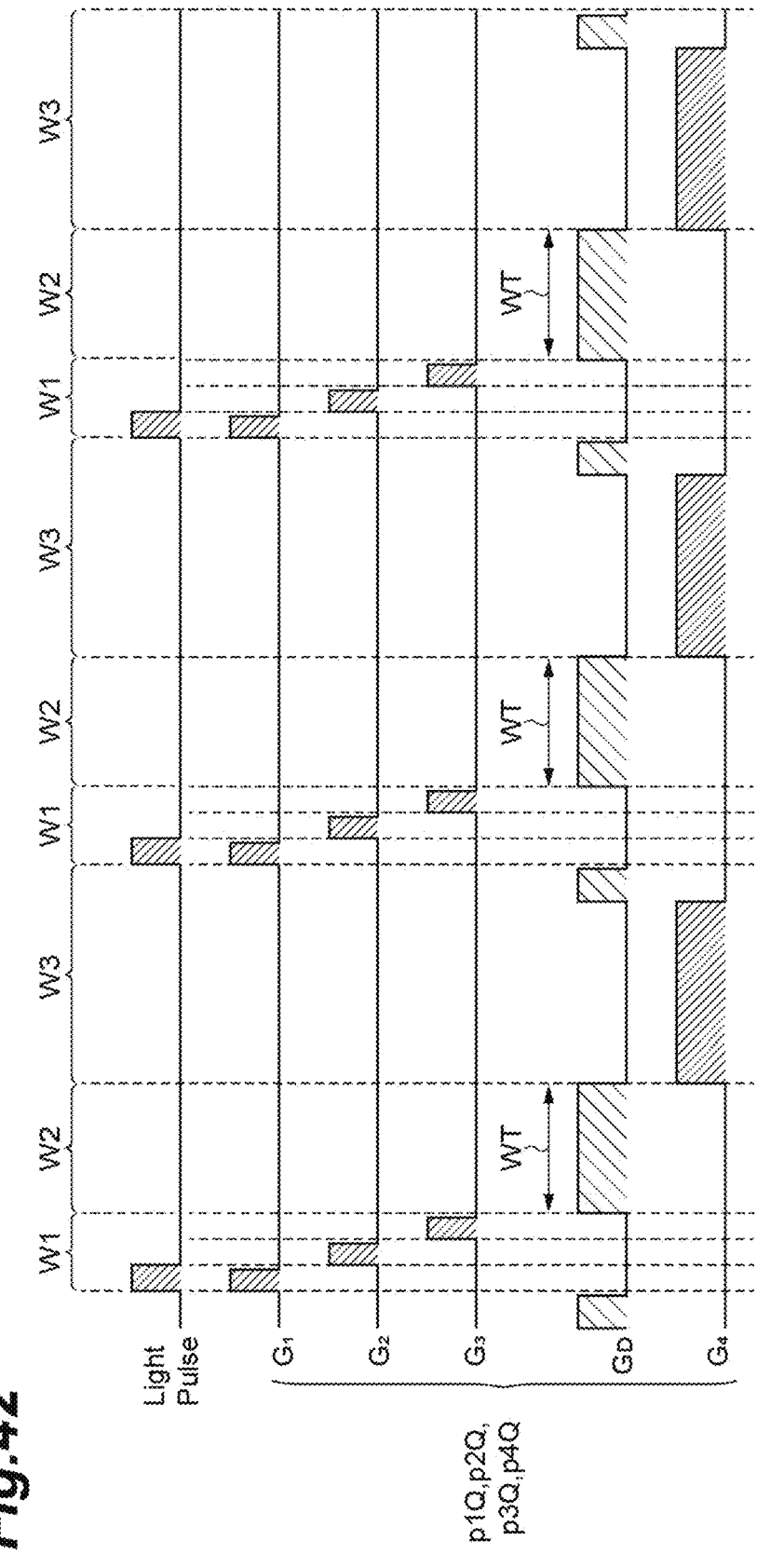
FIG. 42 is a timing chart illustrating a control pulse provided to the pixel array according to the seventh embodiment.

FIG. 42 is a timing chart illustrating a control pulse provided to the pixel array 12Q of the seventh embodiment. The pixel array 12Q includes a green pixel p1Q, a red pixel p2Q, a blue pixel p3Q, and a green pixel p4Q. Each of the green pixel p1Q, the red pixel p2Q, the blue pixel p3Q, and the green pixel p4Q receives a control pulse illustrated in FIG. 42. The control pulses respectively received by the green pixel p1Q, the red pixel p2Q, the blue pixel p3Q, and the green pixel p4Q are the same.

Operation of Solid-State Imaging Device of Seventh Embodiment

The gate driver circuit 32 of the seventh embodiment performs a first operation W1, a second operation W2, and a third operation W3. The gate driver circuit 32 executes the first operation W1, the second operation W2, and the third operation W3 in this order. The gate driver circuit 32 executes the first operation W1. The gate driver circuit 32 executes the second operation W2 after executing the first operation W1. The gate driver circuit 32 executes the third operation W3 after executing the second operation W2. The gate driver circuit 32 executes the first operation W1 again.

The first operation W1 obtains the distance image 203. The light source driver circuit 31 starts emission of the irradiation pulsed light $L_P$. The gate driver circuit 32 switches the first transfer control pulse $G_1$ from low to high. A timing at which the first transfer control pulse $G_1$ is switched from low to high may coincide with a timing at which the emission of the irradiation pulsed light $L_P$ starts. After the predetermined period has elapsed, the gate driver circuit 32 switches the first transfer control pulse $G_1$ from high to low. Thereafter, the light source driver circuit 31 stops the emission of the irradiation pulsed light $L_P$. A period during which the first transfer control pulse $G_1$ is high may be slightly shorter than the emission period of the irradiation pulsed light $L_P$.

Next, the gate driver circuit 32 switches the second transfer control pulse $G_2$ from low to high. A timing at which the second transfer control pulse $G_2$ is switched from low to high may coincide with a timing at which the light source driver circuit 31 stops the emission of the irradiation pulsed light $L_P$. The time from the timing at which the first transfer control pulse $G_1$ switches from low to high to the timing at which the second transfer control pulse $G_2$ switches from low to high may be the same as the emission period of the irradiation pulsed light $L_P$.

The gate driver circuit 32 keeps the second transfer control pulse $G_2$ high as long as the first transfer control pulse $G_1$ is high. Thereafter, the gate driver circuit 32 switches the second transfer control pulse $G_2$ from high to low.

Next, the gate driver circuit 32 switches the third transfer control pulse $G_3$ from low to high. The gate driver circuit 32 keeps the third transfer control pulse $G_3$ high as long as the first transfer control pulse $G_1$ is high. Thereafter, the gate driver circuit 32 switches the third transfer control pulse $G_3$ from high to low.

The second operation W2 is securing a standby time WT. Since light enters the photoelectric conversion region 21 also during the standby time WT, a charge is generated. However, this charge is not accumulated. The charge generated during the standby time WT is discharged to the charge discharging region 23. The charge generated during the waiting time WT is not used for generating the visible light image 201 or for generating the distance image 203. For example, the standby time WT may be longer than the time of the first operation W1. The standby time WT may be shorter than the time of the third operation W3.

The waiting time WT is for reducing the influence of the reflected pulsed light $L_R$ on the visible light image 201. As will be described later, in the third operation W3, the visible light image 201 is obtained. The charge for obtaining the visible light image 201 is accumulated in the fourth charge reading region 22₄. Ideally, the charge accumulated in the fourth charge reading region 22₄ is generated only by a component of visible light. When the charge generated by the reflected pulsed light $L_R$ is accumulated in the fourth charge reading region 22₄, it becomes noise. Therefore, a sufficient time is provided between the emission of the irradiation pulsed light $L_P$ and the accumulation of the charge caused by the visible light. The reflected pulsed light $L_R$ reflected by an object at a very long distance is incident on the photoelectric conversion region 21. However, while the reflected pulsed light $L_R$ travels a long distance, the reflected pulsed light $L_R$ is sufficiently attenuated. Therefore, in the third operation W3, the influence of the charge caused by the reflected pulsed light $L_R$ on the charge caused by the visible light is slight. In the third operation W3, it can also be considered that the reflected pulsed light $L_R$ is not substantially incident on the photoelectric conversion region 21. As a result, the influence of the reflected pulsed light $L_R$ received by the visible light image 201 is suppressed.

In the second operation W2, the gate driver circuit 32 switches the discharge control pulse $G_D$ from low to high. The gate driver circuit 32 maintains a state in which the discharge control pulse $G_D$ is high for a predetermined time. The time during which the discharge control pulse $G_D$ maintains a high state is the above-described waiting time WT.

The third operation W3 obtains the visible light image 201. The gate driver circuit 32 switches the discharge control pulse $G_D$ from high to low. The gate driver circuit 32 switches the fourth transfer control pulse $G_4$ from low to high. The gate driver circuit 32 maintains a state in which the fourth transfer control pulse $G_4$ is high for a predetermined time.

The gate driver circuit 32 switches the fourth transfer control pulse $G_4$ from high to low. The gate driver circuit 32 switches the discharge control pulse $G_D$ from low to high.

Action and Effect of Solid-State Imaging Device of Seventh Embodiment

The solid-state imaging device 1Q according to the seventh embodiment includes: the light source 11 that generates the irradiation pulsed light $L_P$ having a wavelength component of near-infrared light; the pixel array 12Q that generates a visible light charge corresponding to visible light and includes a plurality of pixels p1Q, p2Q, p3Q, and p4Q that generate a near-infrared light charge corresponding to the reflected pulsed light $L_R$ having the wavelength component of the near-infrared light resulting from the irradiation pulsed light $L_P$; and the gate driver circuit 32 that supplies, to the pixels p1Q, p2Q, p3Q, and p4Q, the transfer control pulses $G_1$, $G_2$, $G_3$, and $G_4$ that control transfer of the visible light charge and the near-infrared light charge, and the discharge control pulse $G_D$. Each of the plurality of pixels p1Q, p2Q, p3Q, and p4Q includes: the photoelectric conversion region 21 that generates the visible light charge and the near-infrared light charge; the charge reading region 22₄ that receives the visible light charge from the photoelectric conversion region 21 in response to the transfer control pulse $G_4$; the charge reading regions 22₁, 22₂, and 22₃ that receive the near-infrared light charge from the photoelectric conversion region 21 in response to the transfer control pulses $G_1$, $G_2$, and $G_3$, and the charge discharging region 23 that discharges the visible light charge and/or the near-infrared light charge from the photoelectric conversion region 21 in response to the discharge control pulse $G_D$. The gate driver circuit 32 performs the first operation W1 of applying transfer control pulses $G_1$, $G_2$, and $G_3$ for distributing the near-infrared light charge from the photoelectric conversion region 21 to the respective charge reading regions $22_1$, $22_2$, and $22_3$ to the pixels p1Q, p2Q, p3Q, and p4Q, the second operation W2 of applying the discharge control pulse $G_D$ for discharging the visible light charge and/or the near-infrared light charge from the photoelectric conversion region 21 to the pixels p1Q, p2Q, p3Q, and p4Q after the first operation W1, and the third operation W3 of applying the transfer control pulse $G_4$ for transferring the visible light charge from the photoelectric conversion region 21 to the charge reading region $22_4$ to the pixels p1Q, p2Q, p3Q, and p4Q after the second operation W2.

The solid-state imaging device 1Q can obtain the distance image 203 including the distance information to the imaging subject 101 by the first operation W1. The solid-state imaging device 1Q can obtain the visible light image 201 of the imaging subject 101 by the third operation W3. Therefore, the solid-state imaging device 1Q can simultaneously acquire the visible light image 201 and the distance image 203 based on the near-infrared light. Between the first operation W1 and the third operation W3, the second operation W2 for discharging a charge generated in the photoelectric conversion region 21 is performed. The predetermined standby time WT is provided between the first operation W1 for obtaining the distance image 203 and the third operation W3 for obtaining the visible light image 201. According to the standby time WT, the reflected pulsed light $L_R$ for the first operation W1 is sufficiently attenuated until the third operation W3 is performed. Therefore, the solid-state imaging device 1Q can obtain the visible light image 201 in which the influence of near-infrared light is suppressed.

The pixel array 12Q of the solid-state imaging device 1Q includes the green pixel p1Q, the red pixel p2Q, the blue pixel p3Q, and the green pixel p4Q. The red pixel p2Q includes the wavelength selection filter 27R (first filter) that transmits the reflected pulsed light $L_R$ and transmits the red wavelength component (first wavelength component) included in the visible light. The green pixels p1Q and p4Q include the wavelength selection filter 27G (second filter) that transmits the reflected pulsed light $L_R$ and transmits the green wavelength component (second wavelength component) shorter than the red wavelength component. The blue pixel p3Q includes the wavelength selection filter 27B (third filter) that transmits the reflected pulsed light $L_R$ and transmits the blue wavelength component (third wavelength component) shorter than the green wavelength component included in the visible light. Also with this configuration, the solid-state imaging device 1Q can obtain the visible light image 201 in which the influence of near-infrared light is suppressed.

Modification of Solid-State Imaging Device of Seventh Embodiment

A solid-state imaging device $1Q_1$ as a modification of the solid-state imaging device 1Q of the seventh embodiment will be described.

Figure 43:
FIG. 43 is a plan view illustrating a pixel panel included in a solid-state imaging device according to a modification of the seventh embodiment.
Figure 43:

FIG. 43 is a plan view illustrating a pixel array $12Q_1$ included in the solid-state imaging device $1Q_1$ of the modification of the seventh embodiment. The pixel array $12Q_1$ includes the green pixel p1Q, the red pixel p2Q, the blue pixel p3Q, and a near-infrared pixel $p4Q_1$. That is, the solid-state imaging device $1Q_1$ of the modification is obtained by replacing the green pixel p4Q of the seventh embodiment with the near-infrared pixel $p4Q_1$. The green pixel p1Q, the red pixel p2Q, and the blue pixel p3Q included in the solid-state imaging device $1Q_1$ of the modification are the same as the green pixel p1Q, the red pixel p2Q, and the blue pixel p3Q included in the solid-state imaging device 1Q of the seventh embodiment.

Figure 44:
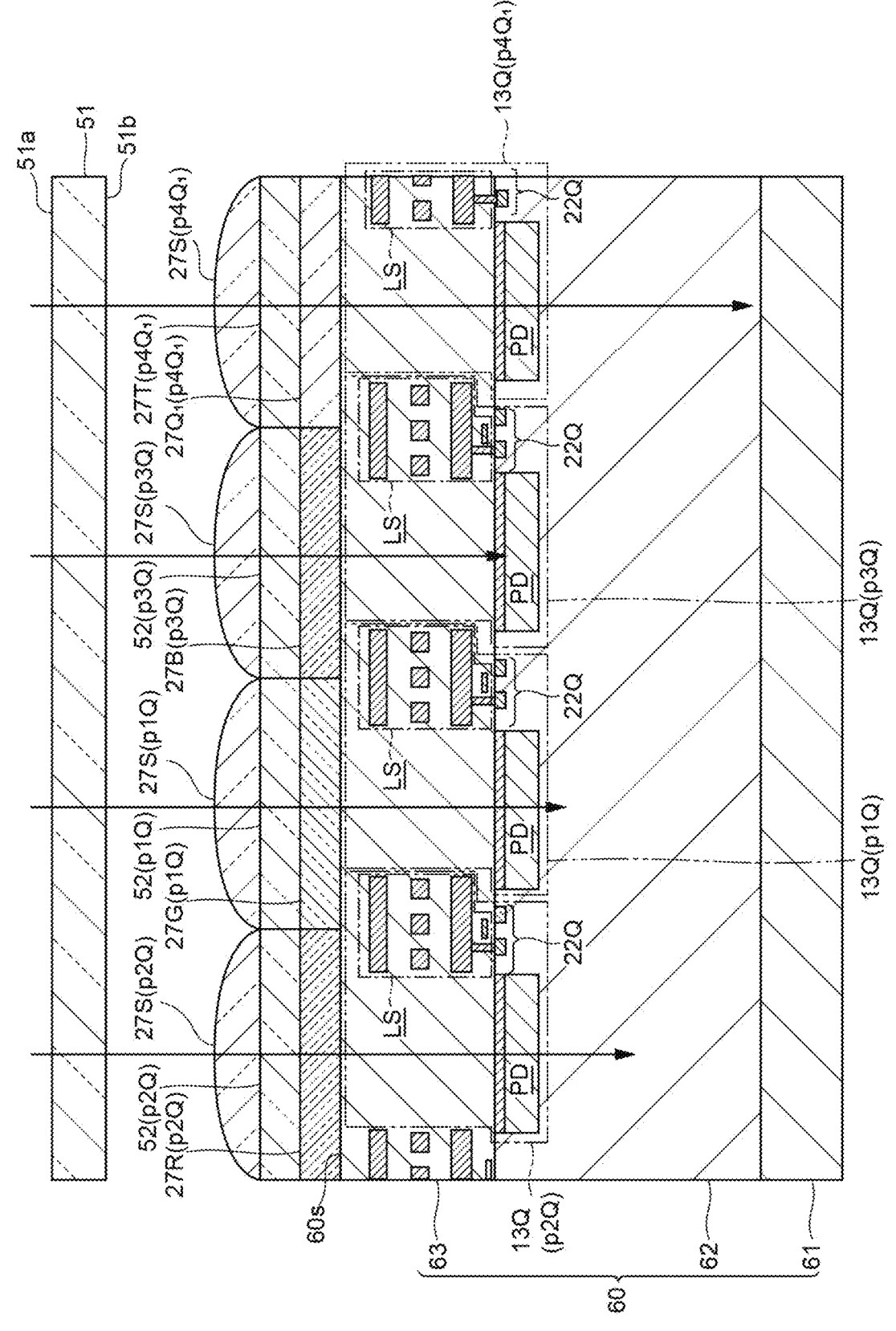
FIG. 44 is a cross-sectional view illustrating a structure of a pixel array according to the modification of the seventh embodiment.
Figure 45:
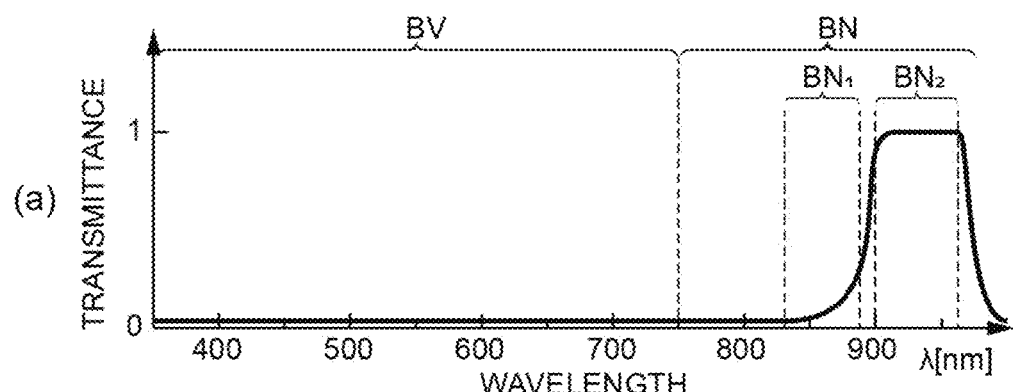
FIGS. 45(*a*) and 45(*b*) are graphs illustrating characteristics of a near-infrared light selection filter included in the pixel array according to the modification of the seventh embodiment.
Figure 45:
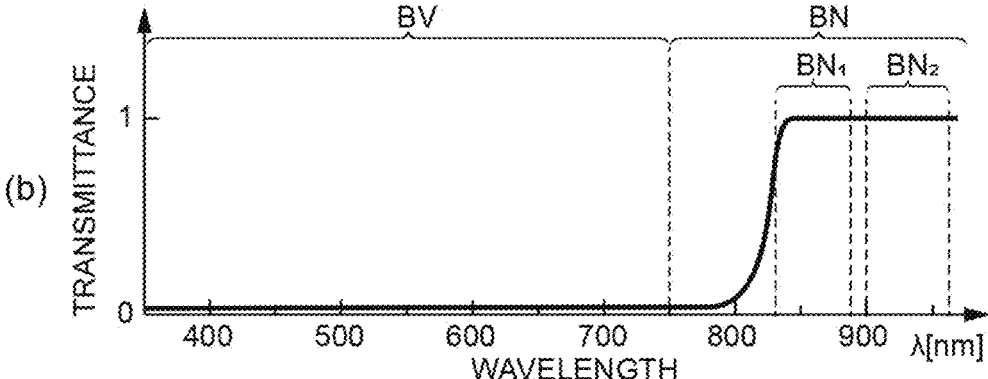

FIG. 44 is a cross-sectional view illustrating a structure of the pixel array $12Q_1$ of the modification of the seventh embodiment. As illustrated in FIG. 44, the near-infrared pixel $p4Q_1$ includes a near-infrared light selection filter $27Q_1$. The near-infrared light selection filter $27Q_1$ selectively transmits the reflected pulsed light $L_R$. For example, the near-infrared light selection filter $27Q_1$ may be, for example, a band pass filter (BPF) that allows only an optical component in an NIR band around 940 nm to pass therethrough (refer to FIG. 45($a$)). The near-infrared light selection filter $27Q_1$ may be, for example, a high-pass filter (HPF) that allows only light components in an NIR band of 860 nm or more to pass therethrough (refer to FIG. 45($b$)).

In the modification, similarly to the seventh embodiment, the green pixel p1Q, the red pixel p2Q, and the blue pixel p3Q constituting the pixel array $12Q_1$ receive the common control pulse from the gate driver circuit 32. In the near-infrared pixel p4Q1, the third operation W3 may not be performed, and the transfer control pulse G4 having the same pulse width as the transfer control pulses G1, G2, and G3 may be received following the transfer control pulse G3 in the first operation W1.

The pixel array $12Q_1$ of the solid-state imaging device $1Q_1$ includes the green pixel p1Q, the red pixel p2Q, the blue pixel p3Q, and the near-infrared pixel $p4Q_1$. The red pixel p2Q includes the wavelength selection filter 27R (first filter) that transmits the reflected pulsed light $L_R$ and transmits the red wavelength component (first wavelength component) included in the visible light. The green pixels p1Q and p4Q include the wavelength selection filter 27G (second filter) that transmits the reflected pulsed light $L_R$ and transmits the green wavelength component (second wavelength component) shorter than the red wavelength component. The blue pixel p3Q includes the wavelength selection filter 27B (third filter) that transmits the reflected pulsed light $L_R$ and transmits the blue wavelength component (third wavelength component) shorter than the green wavelength component included in the visible light. The near-infrared pixel $p4Q_1$ includes the near-infrared light selection filter $27Q_1$ that selectively transmits only the reflected pulsed light $L_R$. According to this configuration, since the near-infrared pixel $p4Q_1$ selectively transmits only the reflected pulsed light $L_R$, resistance to disturbance light can be enhanced.

REFERENCE SIGNS LIST

1A, 1B, 1C, 1D, 1E, 1F, 1G, 1H, 1K, 1Q, $1Q_1$ SOLID-STATE IMAGING DEVICE
11 LIGHT SOURCE
12A, 12B, 12C, 12F, 12Q, $12Q_1$ PIXEL ARRAY
13S, 13D, 13T, 13Q PIXEL CIRCUIT UNIT (FIRST PIXEL CIRCUIT UNIT, SECOND PIXEL CIRCUIT UNIT)
17, 17B, 17C, 17F, 17Q ARITHMETIC CIRCUIT

21 PHOTOELECTRIC CONVERSION REGION (PD)
22 READING UNIT (SD)
$22_1$ FIRST CHARGE READING REGION
$22_2$ SECOND CHARGE READING REGION
$22_3$ THIRD CHARGE READING REGION
$22_4$ FOURTH CHARGE READING REGION
22S, 22D, 22Q READING UNIT
23 CHARGE DISCHARGING REGION
27R WAVELENGTH SELECTION FILTER (FIRST FIL-
TER)
27G WAVELENGTH SELECTION FILTER (SECOND
FILTER)
27B WAVELENGTH SELECTION FILTER (THIRD
FILTER)
$27Q_1$ NEAR-INFRARED LIGHT SELECTION FILTER
(NEAR-INFRARED LIGHT SELECTION FILTER)
$L_R$ REFLECTED PULSED LIGHT

The invention claimed is:

1. A solid-state imaging device comprising:
a light source configured to generate pulsed light having a wavelength component of near-infrared light;
a first pixel configured to receive first light including at least a wavelength component of visible light so as to generate, by a first pixel circuit unit, a charge corresponding to the first light;
a second pixel configured to receive second light including at least the wavelength component of the near-infrared light so as to generate, by a second pixel circuit unit, a charge corresponding to the second light; and
a charge transfer control unit configured to supply, to the first pixel and the second pixel, a control pulse to control transfer of the charge, wherein
each of the first pixel circuit unit and the second pixel circuit unit includes a photoelectric conversion region configured to generate the charge, a reading unit configured to receive the transfer of the charge from the photoelectric conversion region in response to the control pulse, and a charge discharging region configured to discharge the charge from the photoelectric conversion region in response to the control pulse, and
the charge transfer control unit is configured to supply, to the first pixel circuit unit, the control pulse to discharge the charge from the photoelectric conversion region of the first pixel circuit unit to the charge discharging region of the first pixel circuit unit in an entire period overlapping with an irradiation period of the pulsed light.

2. The solid-state imaging device according to claim 1, wherein
the reading unit of the first pixel circuit unit includes a first charge reading region and a second charge reading region, and
the charge transfer control unit is configured to
after supplying, to the first pixel circuit unit, the control pulse to transfer the charge from the photoelectric conversion region of the first pixel circuit unit to the first charge reading region of the first pixel circuit unit in a period not overlapping with the irradiation period of the pulsed light, supply, to the first pixel circuit unit, the control pulse to transfer the charge from the photoelectric conversion region of the first pixel circuit unit to the second charge reading region of the first pixel circuit unit.

3. The solid-state imaging device according to claim 2, wherein one of a period of the control pulse to transfer the charge from the photoelectric conversion region of the first pixel circuit unit to the first charge reading region of the first pixel circuit unit and a period of the control pulse to transfer the charge from the photoelectric conversion region of the first pixel circuit unit to the second charge reading region of the first pixel circuit unit is shorter than the other period.

4. The solid-state imaging device according to claim 2, further comprising
an arithmetic circuit configured to obtain an image based on the charge, wherein
the arithmetic circuit is configured to obtain at least one of a first image based on the charge accumulated in the first charge reading region or a second image based on the charge accumulated in the second charge reading region.

5. The solid-state imaging device according to claim 1, wherein
the reading unit of the second pixel circuit unit includes a first charge reading region and a second charge reading region, and
the charge transfer control unit is configured to:
supply, to the second pixel circuit unit, the control pulse to transfer the charge from the photoelectric conversion region of the second pixel circuit unit to the first charge reading region of the second pixel circuit unit in the period overlapping with the irradiation period of the pulsed light; and
supply, to the second pixel circuit unit, the control pulse to transfer the charge from the photoelectric conversion region of the second pixel circuit unit to the second charge reading region of the second pixel circuit unit in the period not overlapping with the irradiation period of the pulsed light.

6. The solid-state imaging device according to claim 5, wherein a period of the control pulse to transfer the charge from the photoelectric conversion region of the second pixel circuit unit to the first charge reading region of the second pixel circuit unit is equal to a period of the control pulse to transfer the charge from the photoelectric conversion region of the second pixel circuit unit to the charge discharging region of the second pixel circuit unit.

7. The solid-state imaging device according to claim 6, further comprising
an arithmetic circuit configured to obtain an image based on the charge, wherein
the arithmetic circuit is configured to use the charge accumulated in the second charge reading region so as to remove a component corresponding to background light included in the charge accumulated in the first charge reading region.

8. The solid-state imaging device according to claim 1, wherein
the light source is configured to irradiate an object with the pulsed light,
the reading unit of the second pixel circuit unit includes a first charge reading region and a second charge reading region, and
the charge transfer control unit is configured to
after supplying, to the second pixel circuit unit, the control pulse to transfer the charge from the photoelectric conversion region of the second pixel circuit unit to the first charge reading region of the second pixel circuit unit so as to include a period during which reflected pulsed light from the object is incident, supply, to the second pixel circuit unit, the control pulse to transfer the charge from the photoelectric conversion region of the second pixel circuit unit to the second charge reading region of the second pixel circuit unit.

9. The solid-state imaging device according to claim 8, wherein the reading unit of the second pixel circuit unit further includes a third charge reading region, and the charge transfer control unit is configured to supply, to the second pixel circuit unit, the control pulse to transfer the charge from the photoelectric conversion region of the second pixel circuit unit to the third charge reading region of the second pixel circuit unit in a period during which the reflected pulsed light from the object is not incident.

10. The solid-state imaging device according to claim 8, further comprising an arithmetic circuit configured to obtain an image based on the charge, wherein the charge accumulated in the first charge reading region and the charge accumulated in the second charge reading region are used to obtain a distance to the object.

11. The solid-state imaging device according to claim 1, wherein the reading unit of the first pixel circuit unit includes a first charge reading region and a second charge reading region, the charge transfer control unit is configured to selectively perform a first operation and a second operation, the first operation is configured to:

supply, to the first pixel circuit unit, the control pulse to transfer the charge from the photoelectric conversion region of the first pixel circuit unit to the charge discharging region of the first pixel circuit unit in the period overlapping with the irradiation period of the pulsed light; and supply, to the first pixel circuit unit, the control pulse to transfer the charge from the photoelectric conversion region of the first pixel circuit unit to the first charge reading region of the first pixel circuit unit, and then to transfer the charge from the photoelectric conversion region of the first pixel circuit unit to the second charge reading region of the first pixel circuit unit in a period not overlapping with the irradiation period of the pulsed light, and the second operation is configured to:

supply, to the first pixel circuit unit, the control pulse to transfer the charge from the photoelectric conversion region of the first pixel circuit unit to the first charge reading region of the first pixel circuit unit in the period overlapping with the irradiation period of the pulsed light; and supply, to the first pixel circuit unit, the control pulse to transfer the charge from the photoelectric conversion region of the first pixel circuit unit to the second charge reading region of the first pixel circuit unit in the period not overlapping with the irradiation period of the pulsed light.

12. The solid-state imaging device according to claim 1, wherein the first pixel generates a visible light charge corresponding to the first light and also generates a near-infrared light charge corresponding to the second light, the second pixel generates the near-infrared light charge corresponding to the second light and also generates the visible light charge corresponding to the first light, the charge transfer control unit is configured to supply, to the first pixel and the second pixel, the control pulse to control transfer of the visible light charge and the near-infrared light charge, the photoelectric conversion region is configured to generate the visible light charge and the near-infrared light charge, the reading unit includes at least one visible light charge reading region configured to receive, from the photoelectric conversion region, the transfer of the visible light charge in response to the control pulse, and at least two near-infrared light charge reading regions configured to receive, from the photoelectric conversion region, the transfer of the near-infrared light charge in response to the control pulse, the charge discharging region is configured to discharge, from the photoelectric conversion region, the visible light charge and the near-infrared light charge in response to the control pulse, and the charge transfer control unit is configured to perform:

a first operation of supplying, to the first pixel and the second pixel, the control pulse to distribute the near-infrared light charge from the photoelectric conversion region to each of the at least two near-infrared light charge reading regions;

a second operation performed after the first operation and configured to supply, to the first pixel and the second pixel, the control pulse to discharge the visible light charge and/or the near-infrared light charge from the photoelectric conversion region; and a third operation performed after the second operation and configured to supply, to the first pixel and the second pixel, the control pulse to transfer the visible light charge from the photoelectric conversion region to the visible light charge reading region.

13. The solid-state imaging device according to claim 12, further comprising a third pixel and a fourth pixel configured to generate the visible light charge corresponding to the first light and to generate the near-infrared light charge corresponding to the second light, wherein the first pixel includes a first filter configured to transmit the wavelength component of the near-infrared light and to transmit only a first wavelength component among the wavelength components included in the visible light, the second pixel includes a second filter configured to transmit the wavelength component of the near-infrared light and to transmit only a second wavelength component shorter than the first wavelength component among the wavelength components included in the visible light, the third pixel includes a third filter configured to transmit the wavelength component of the near-infrared light and to transmit only a third wavelength component shorter than the second wavelength component among the wavelength components included in the visible light, and the fourth pixel includes any one of the first filter, the second filter, and the third filter.

14. The solid-state imaging device according to claim 12, further comprising a third pixel and a fourth pixel configured to generate the visible light charge corresponding to the first light and to generate the near-infrared light charge corresponding to the second light, wherein the first pixel includes a first filter configured to transmit the wavelength component of the near-infrared light and to transmit only a first wavelength component among the wavelength components included in the visible light, the second pixel includes a second filter configured to transmit the wavelength component of the near-infrared light and to transmit only a second wavelength component shorter than the first wavelength component among the wavelength components included in the visible light, the third pixel includes a third filter configured to transmit the wavelength component of the near-infrared light and to transmit only a third wavelength component shorter than the second wavelength component among the wavelength components included in the visible light, and the fourth pixel includes a near-infrared light selection filter configured to selectively transmit only light having the wavelength component of the near-infrared light.

15. A solid-state imaging device comprising:

a light source configured to generate pulsed light having a wavelength component of near-infrared light;

a first pixel configured to receive first light including at least a wavelength component of visible light so as to generate, by a first pixel circuit unit, a charge corresponding to the first light;

a second pixel configured to receive second light including at least the wavelength component of the near-infrared light so as to generate, by a second pixel circuit unit, a charge corresponding to the second light;

a charge transfer control unit configured to supply, to the first pixel and the second pixel, a control pulse to control transfer of the charge; and a light source driver circuit for the light source, wherein each of the first pixel circuit unit and the second pixel circuit unit includes a photoelectric conversion region configured to generate the charge, a reading unit configured to receive the transfer of the charge from the photoelectric conversion region in response to the control pulse, and a charge discharging region configured to discharge the charge from the photoelectric conversion region in response to the control pulse, the charge transfer control unit is configured to permit discharge of the charge from the photoelectric conversion region of the first pixel circuit unit to the charge discharging region of the first pixel circuit unit, the light source driver circuit starts irradiation of the pulsed light after the charge transfer control unit permits the discharge of the charge to the charge discharging region, the light source driver circuit stops the irradiation of the pulsed light after a predetermined period has elapsed from the start of the irradiation of the pulsed light, and the charge transfer control unit is configured to prohibit, after the light source driver circuit stops the irradiation of the pulsed light, the discharge of the charge from the photoelectric conversion region of the first pixel circuit unit to the charge discharging region of the first pixel circuit unit.

\*  \*  \*  \*  \*